United States Patent [19]

Pender

[11] 4,109,885
[45] Aug. 29, 1978

[54] VERTICAL TAKE-OFF AND LANDING AIRCRAFT

[76] Inventor: David R. Pender, 1018 Marion St., Columbia, S.C. 29201

[21] Appl. No.: 735,130

[22] Filed: Oct. 21, 1976

[51] Int. Cl.² ................. B64C 27/30; B64C 27/50
[52] U.S. Cl. ...................... 244/7 R; 244/118 R; 244/130; 244/207; 244/209; 244/137 R; 416/20 R; 416/142
[58] Field of Search ............. 244/7 R, 7 A, 42 CC, 244/42 CF, 42 CE, 118 R, 118 P, 138 A, 139, 207, 208, 209, 212; 416/140, 142

[56] References Cited

U.S. PATENT DOCUMENTS

| | | | |
|---|---|---|---|
| 2,376,834 | 5/1945 | Thompson | 244/207 |
| 2,694,537 | 11/1954 | Reichert | 244/118 P |
| 2,751,168 | 6/1956 | Stalker | 244/42 CE |
| 3,582,021 | 6/1971 | Pender | 244/7 A |
| 3,604,661 | 9/1971 | Mayer | 244/118 P |
| 3,762,667 | 10/1973 | Pender | 244/7 A |
| 3,884,433 | 5/1975 | Alexander | 244/42 CC |
| 3,887,146 | 6/1975 | Bright | 244/42 CC |

FOREIGN PATENT DOCUMENTS 647,287  7/1937  Fed. Rep. of Germany ......... 416/142

*Primary Examiner*—Galen L. Barefoot
*Attorney, Agent, or Firm*—B. P. Fishburne, Jr.

[57] ABSTRACT

A vertical take-off and landing aircraft features an improved tail-lifting rotor and rotor directional controls. A new type of suction pressure jet-mechanical-flap rotor blade with a higher coefficient of lift is employed. The aircraft has a mechanism for loading and unloading passengers and a more efficient method of handling baggage and cargo. A much more efficient utilization of space in the fuselage is achieved through a reduced height passenger space and overhead rotor storage compartment.

8 Claims, 121 Drawing Figures

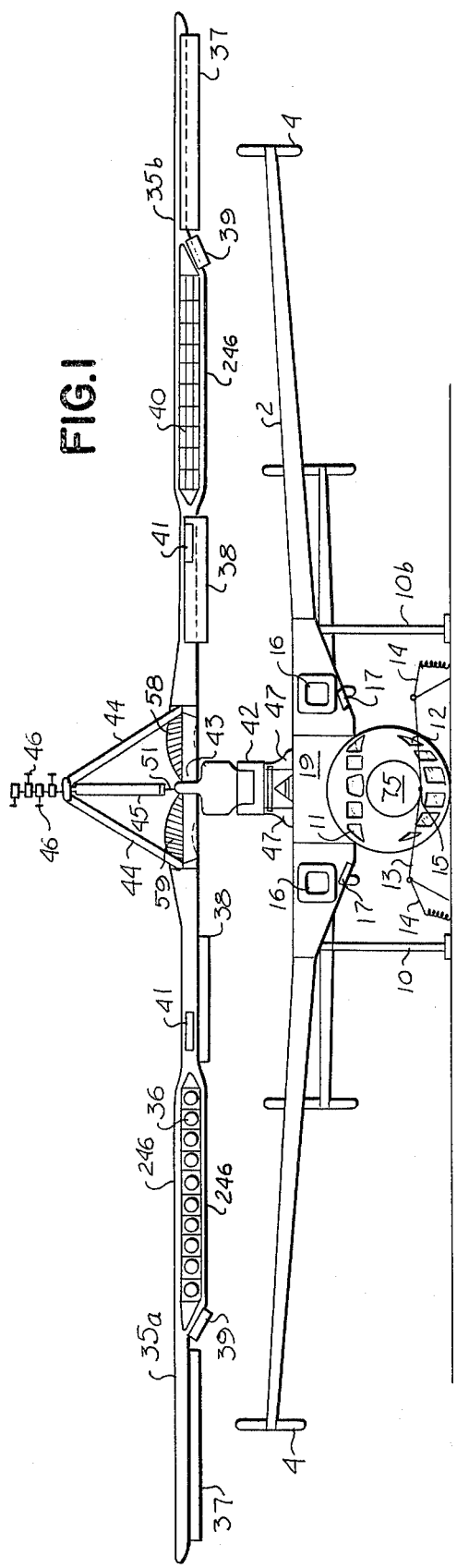
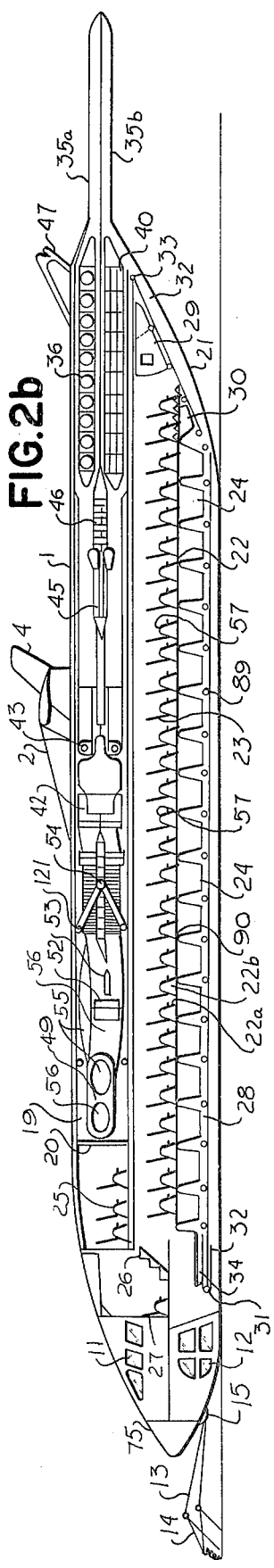
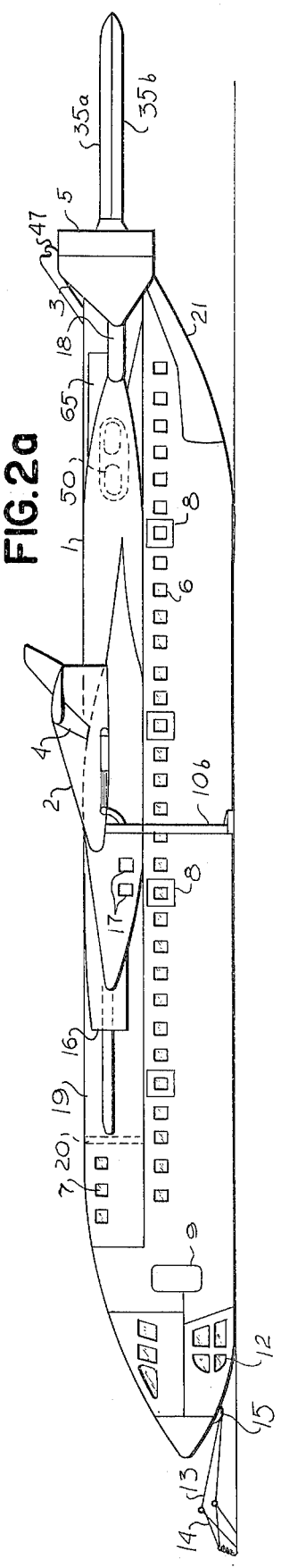

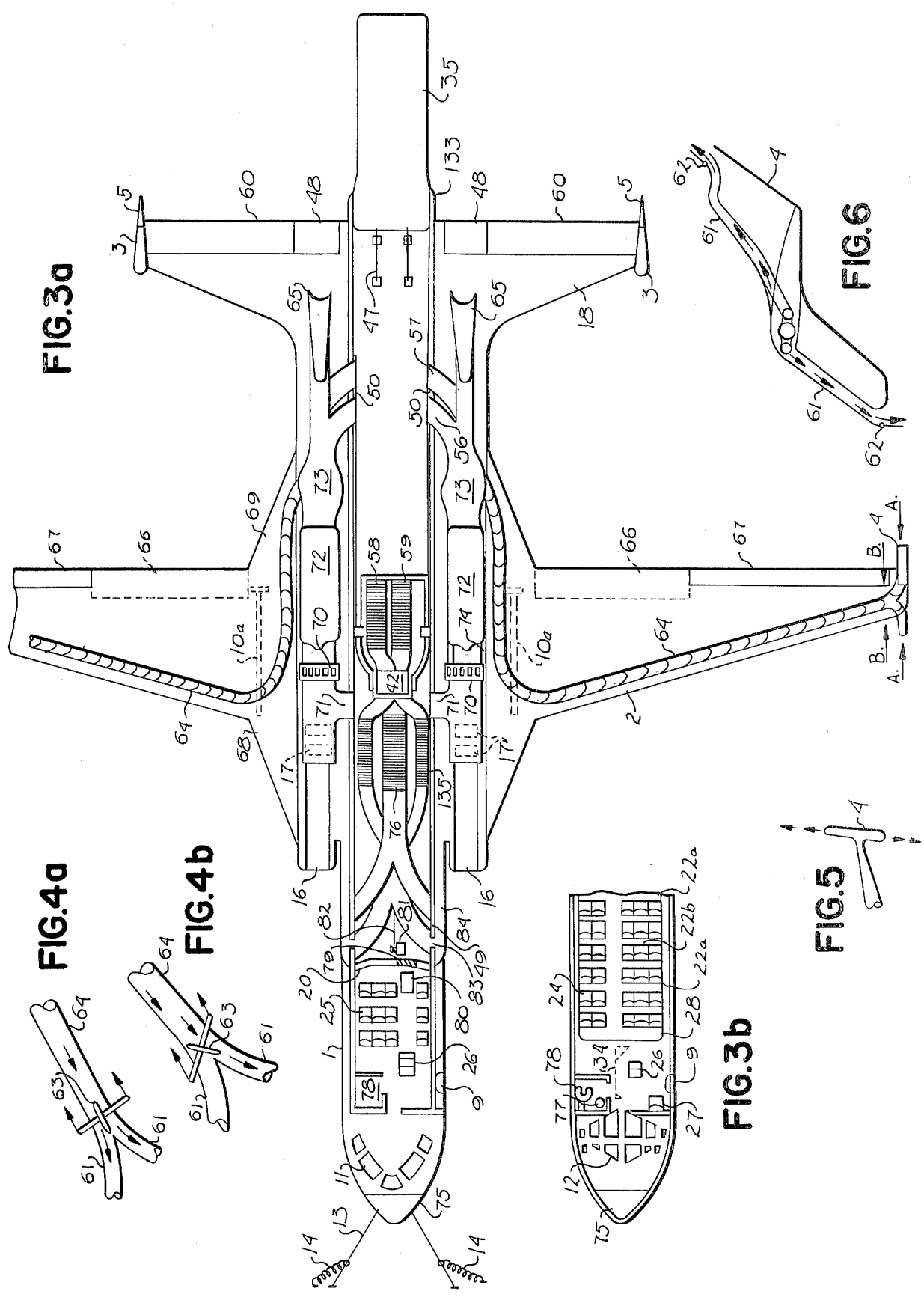

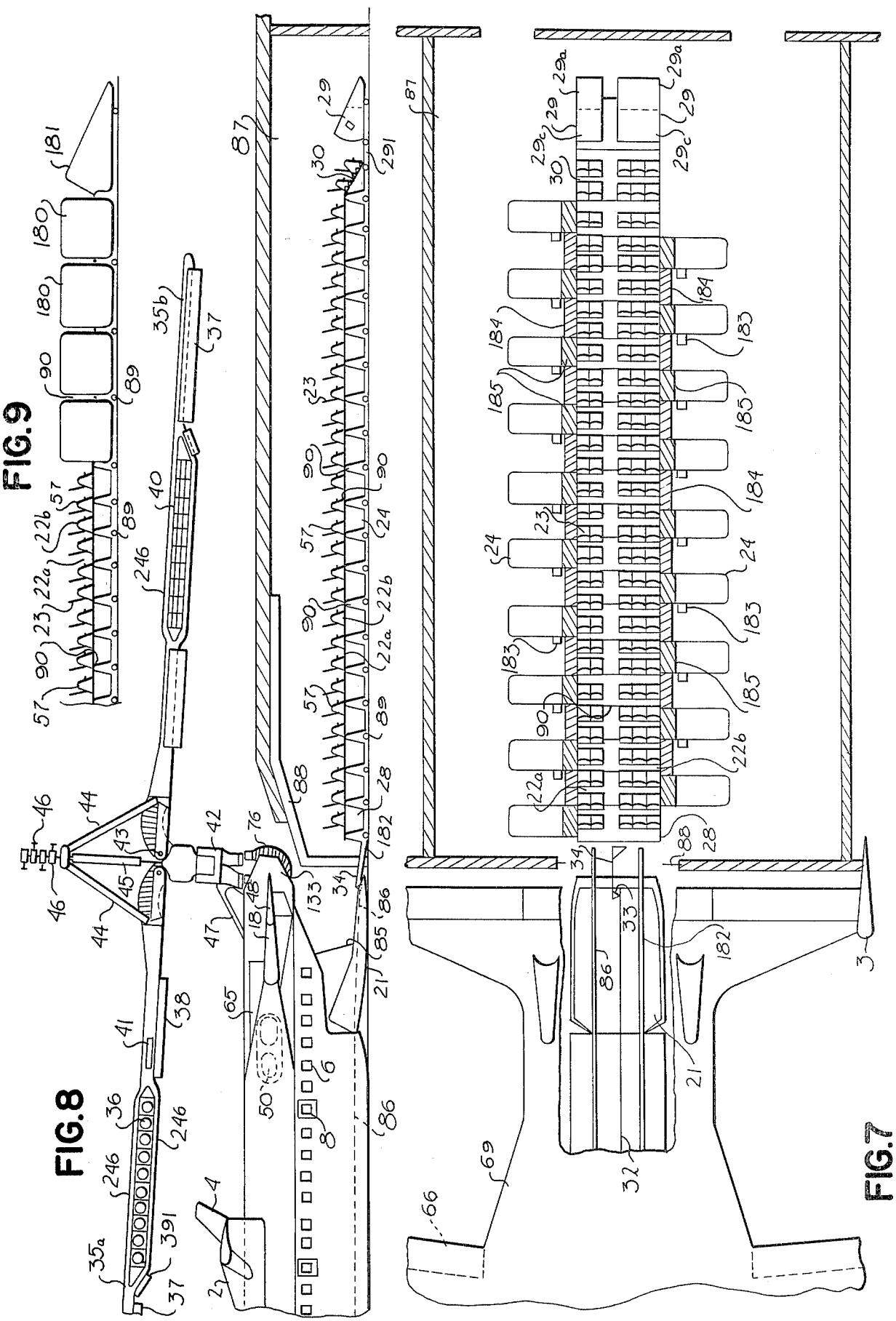

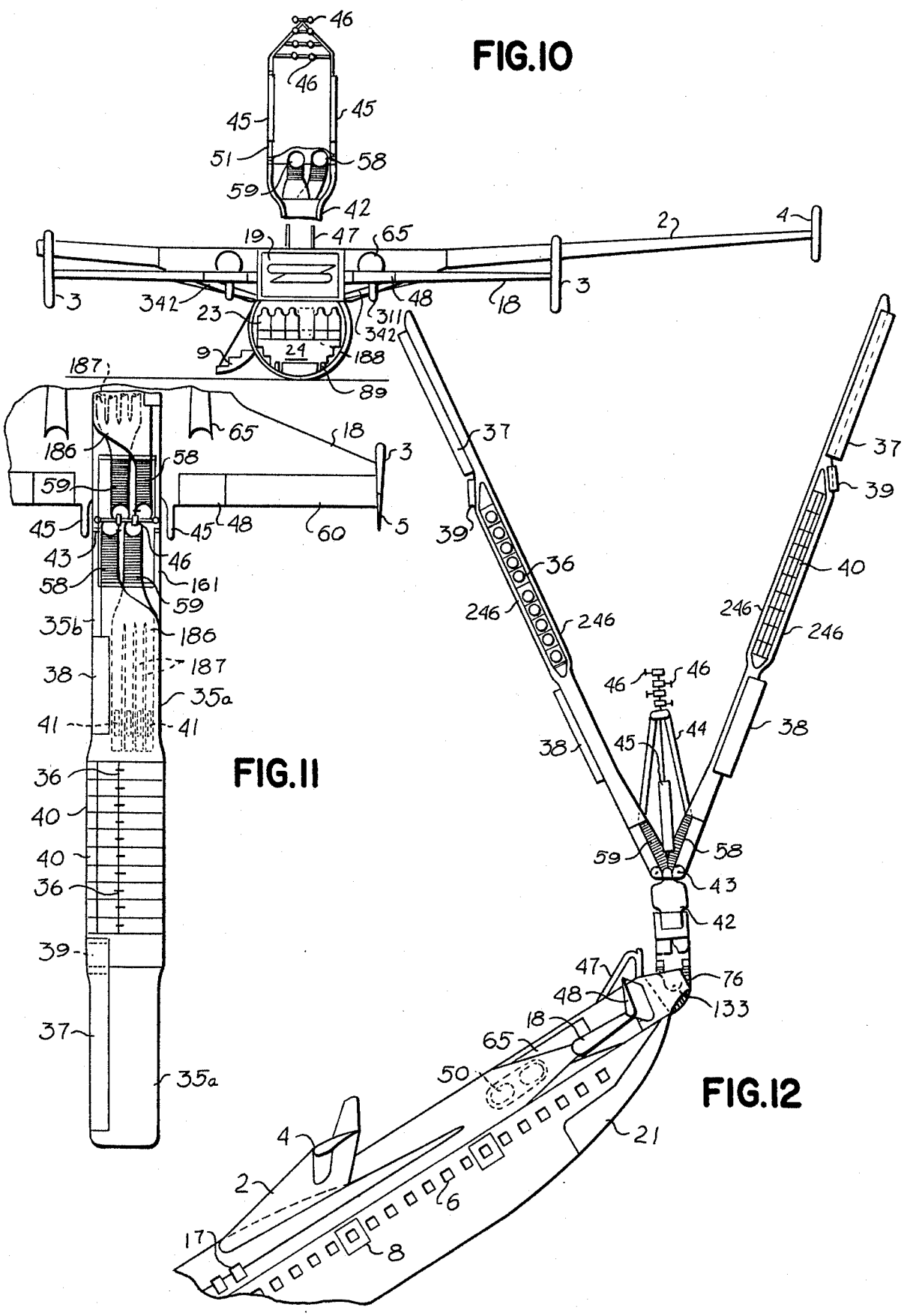

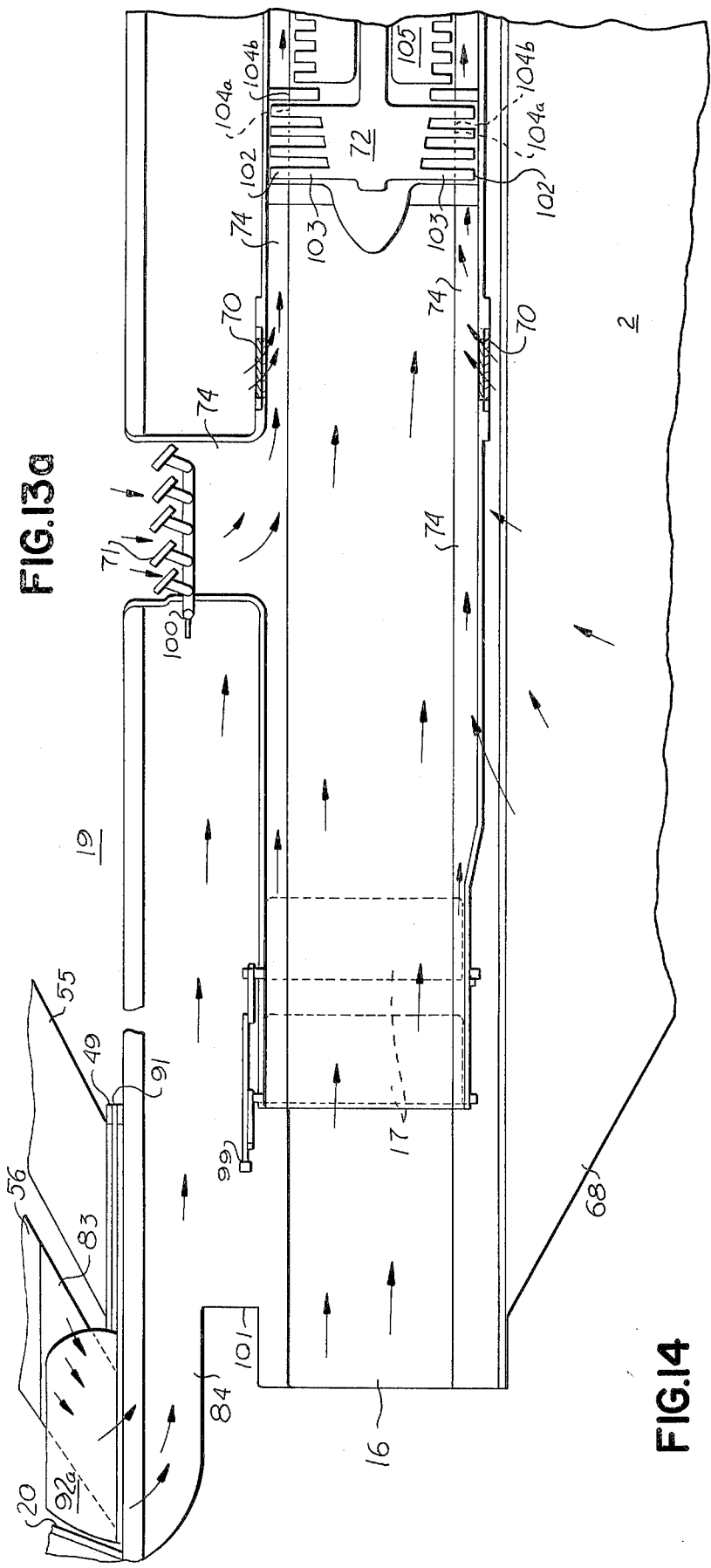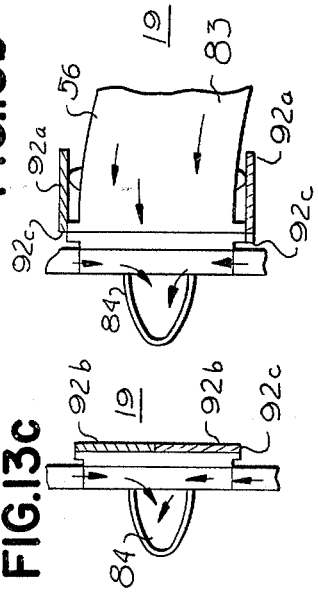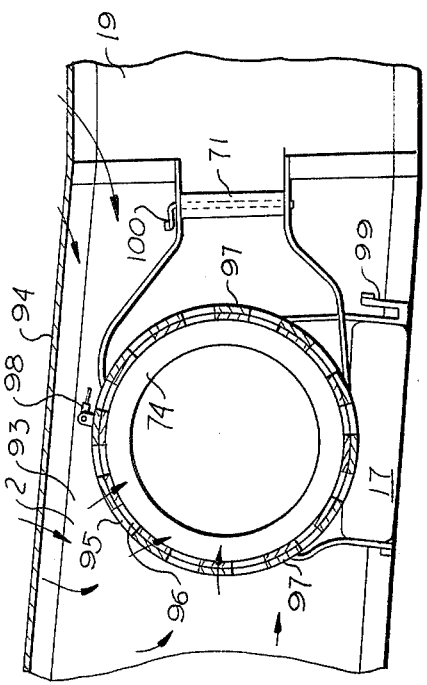

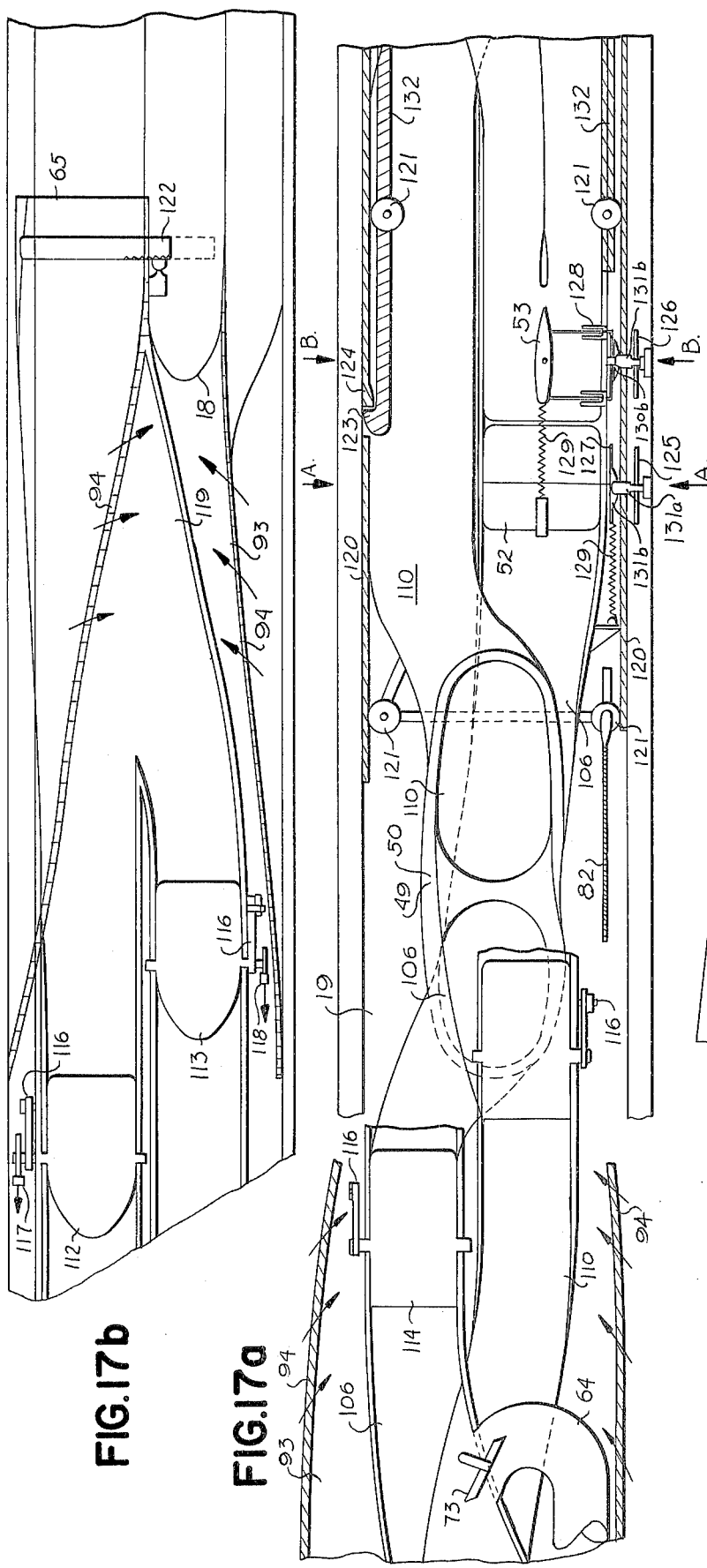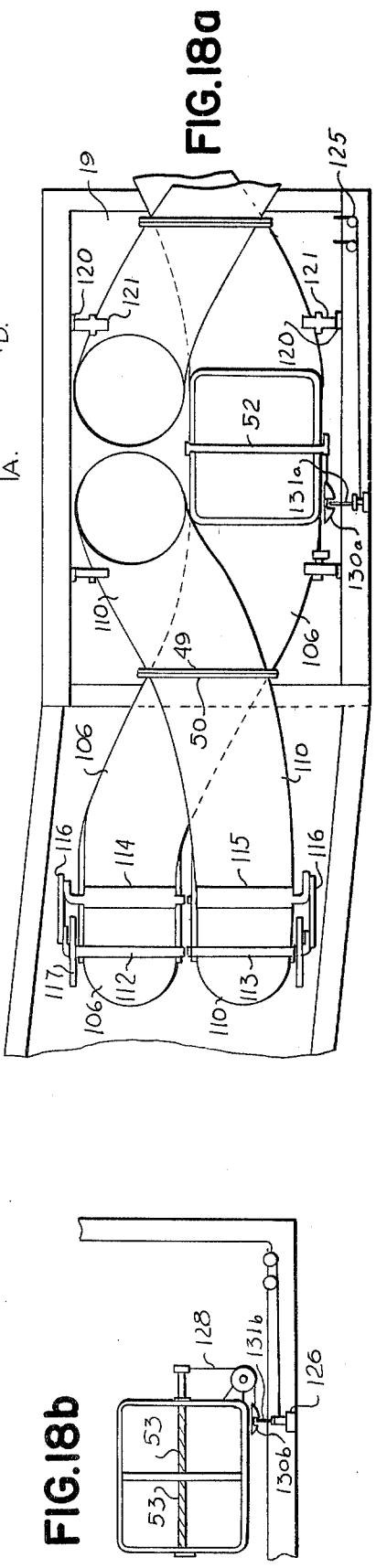

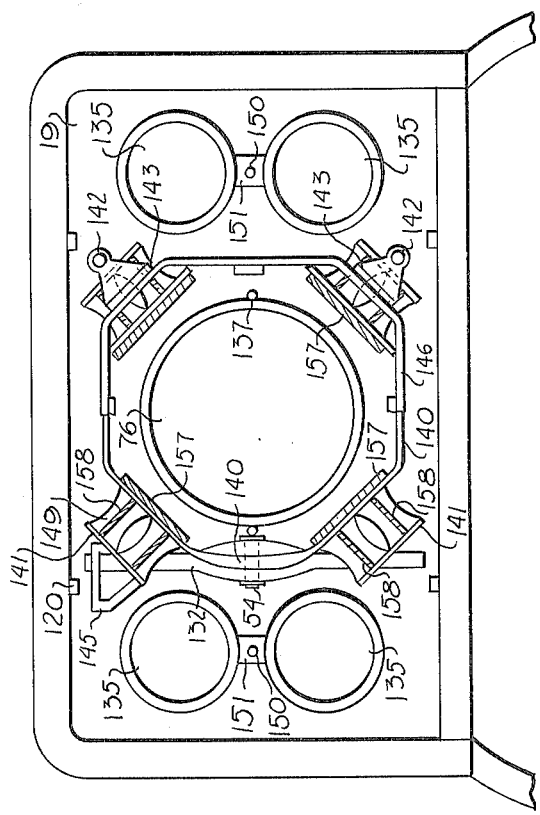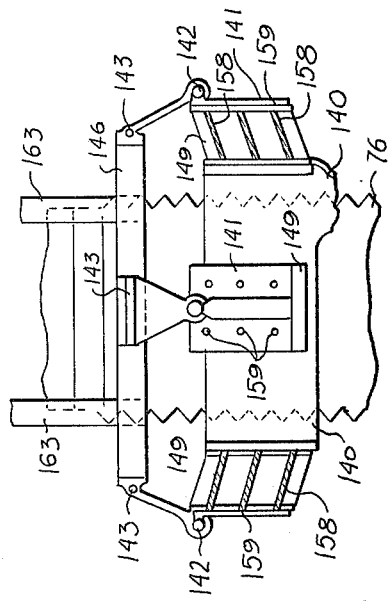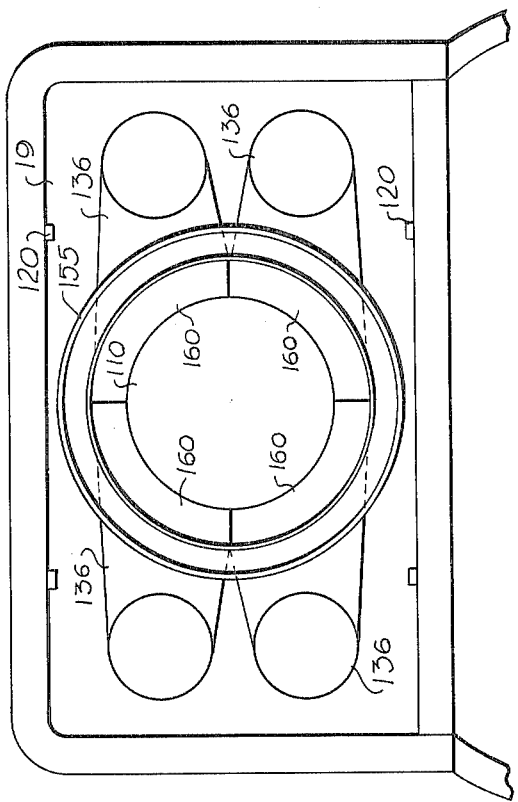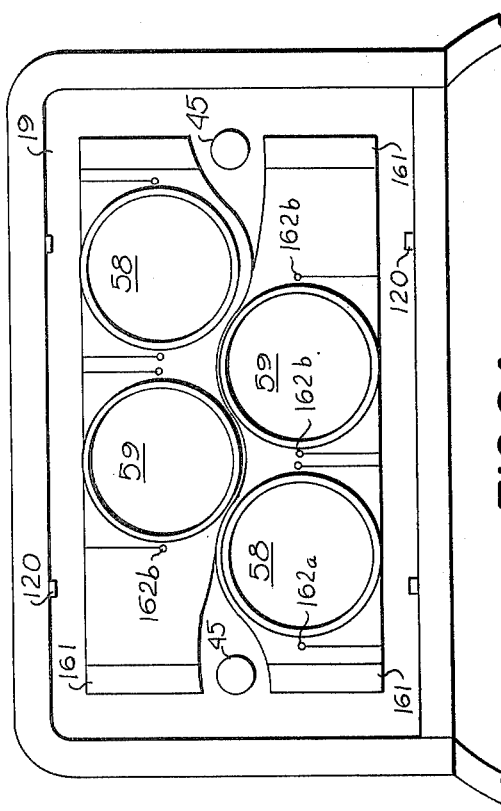

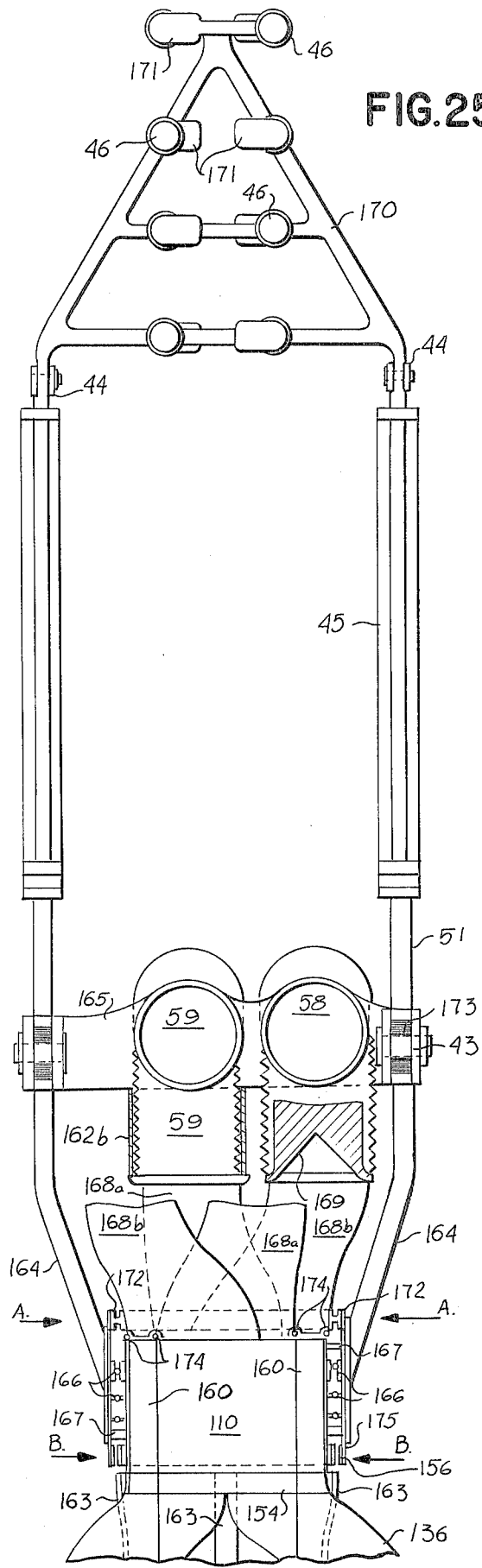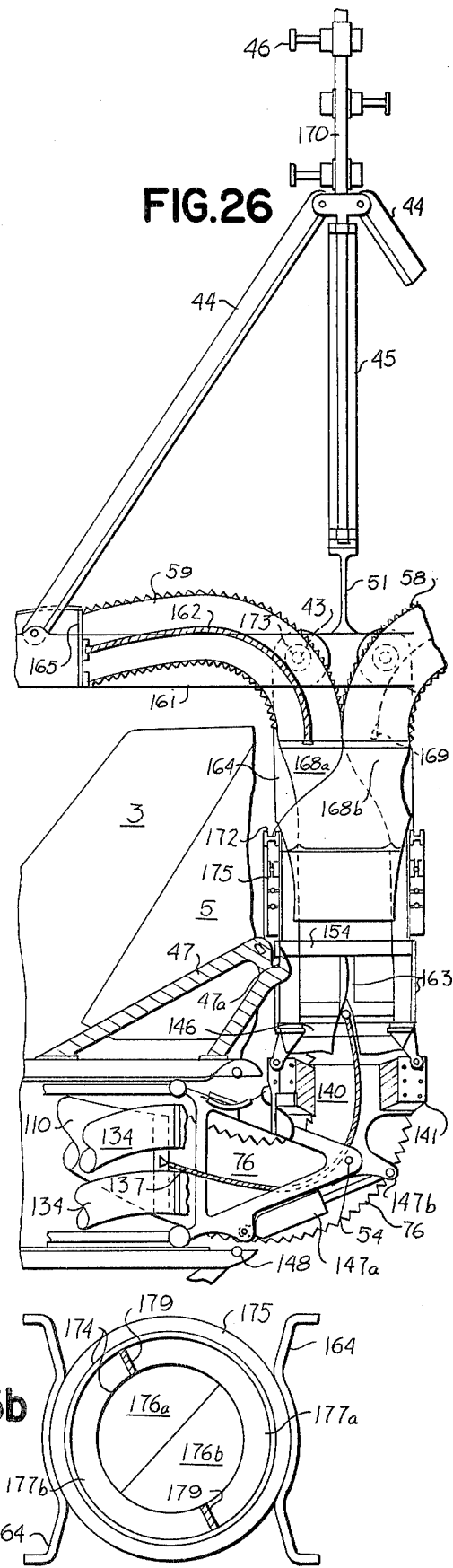

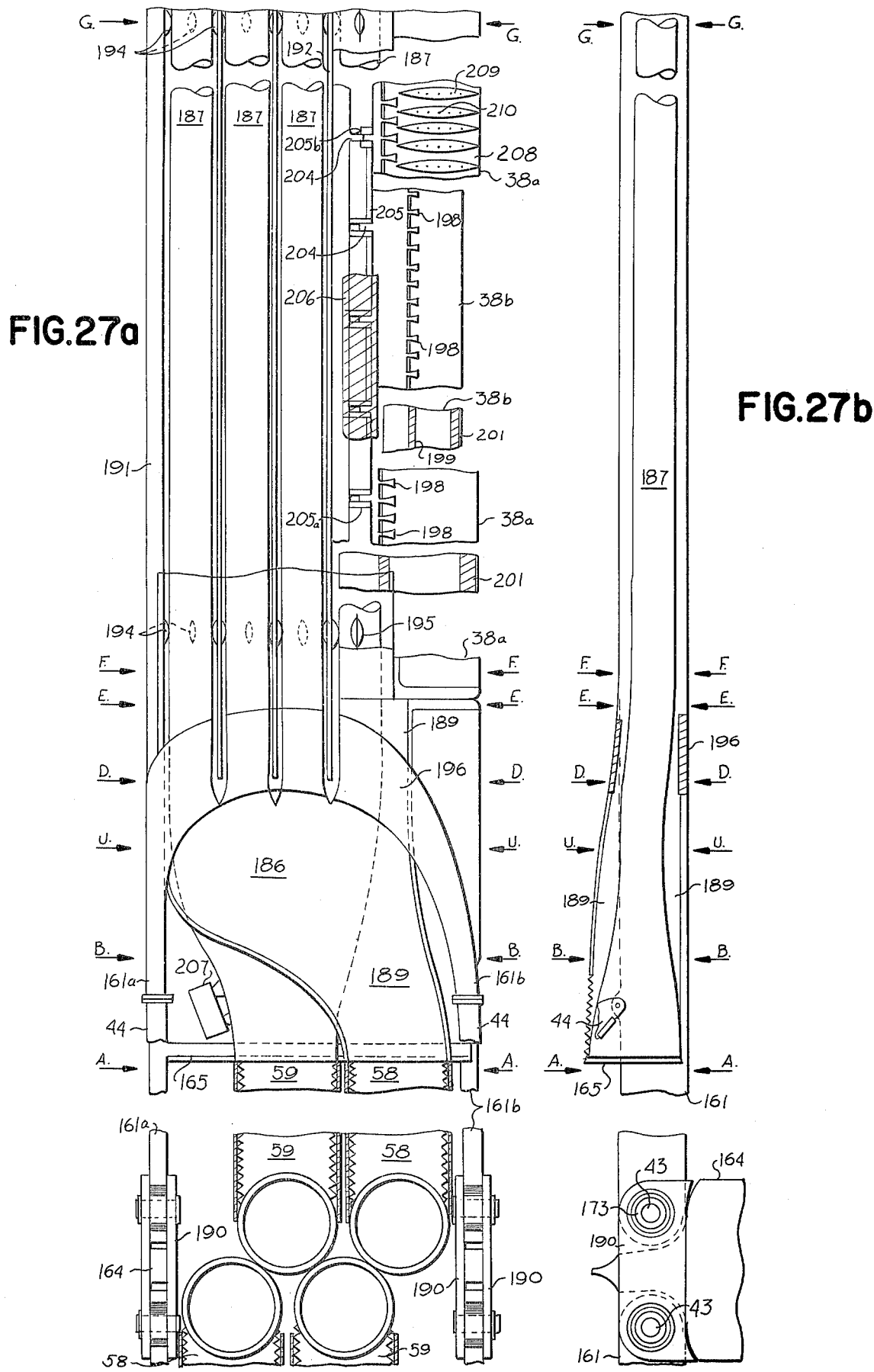

FIG. 28(A)
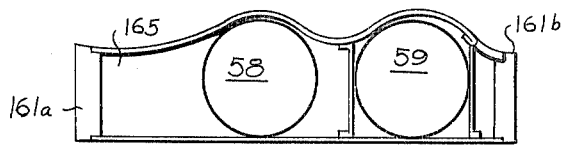
FIG. 29(B)
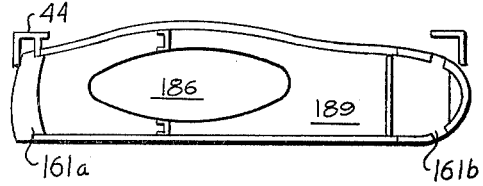
FIG. 30(C)
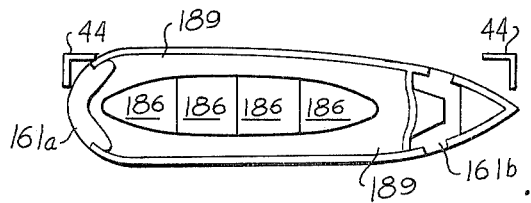
FIG. 31(D)
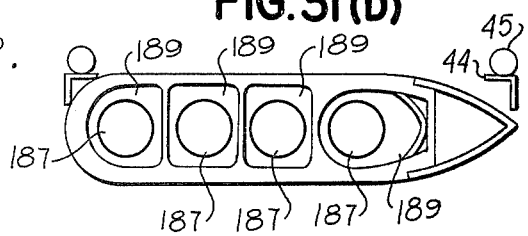
FIG. 32(E)
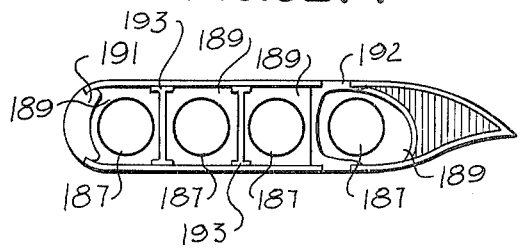
FIG. 33a(F)
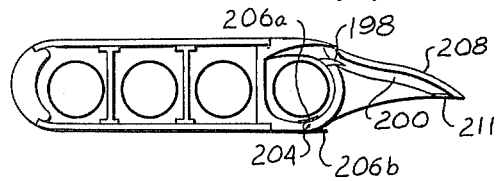
FIG. 33b(F₁)
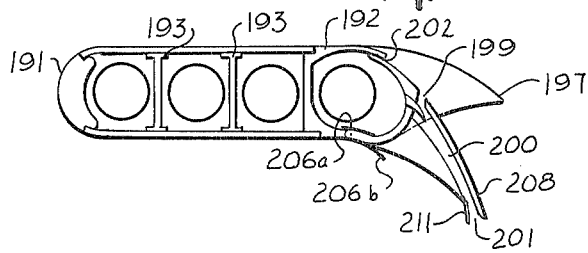
FIG. 34a(G)
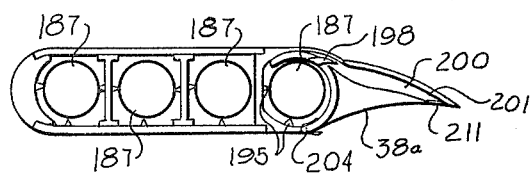
FIG. 34b(G₁)
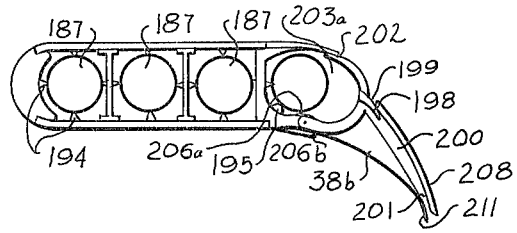

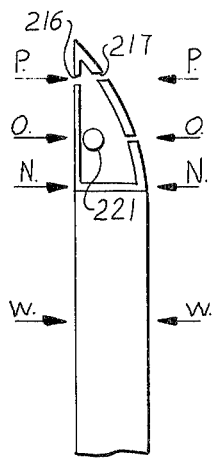
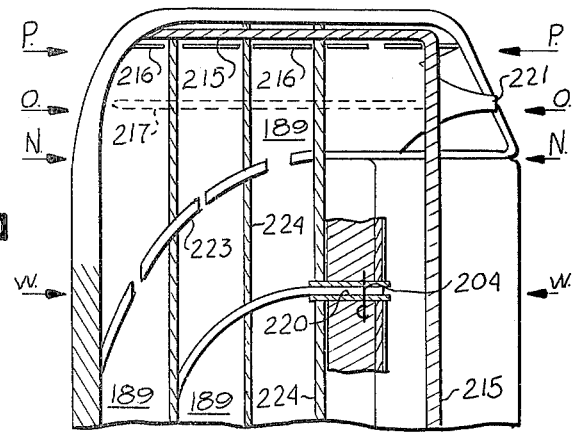
FIG.35a
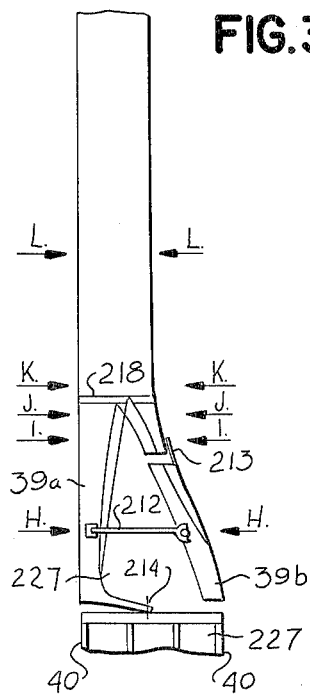
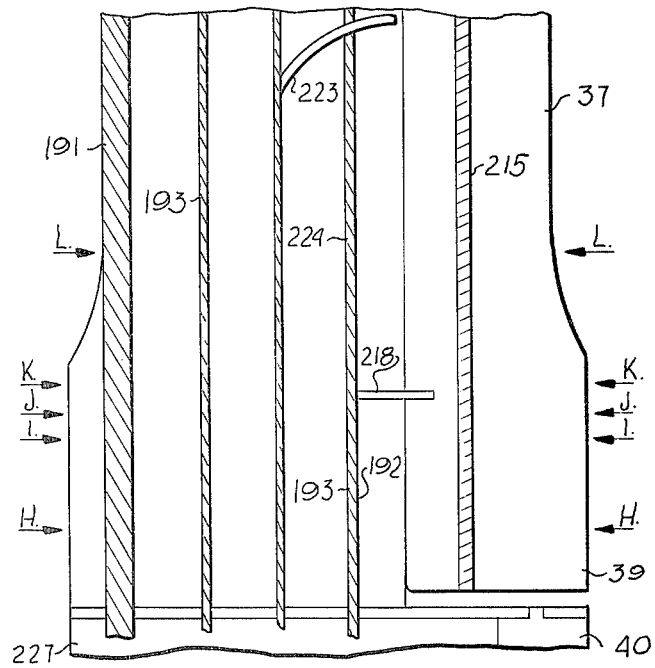
FIG.35b
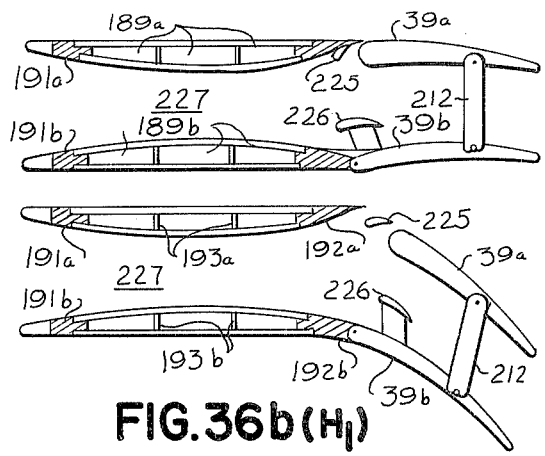
FIG.36a(H)
FIG.36b(H₁)
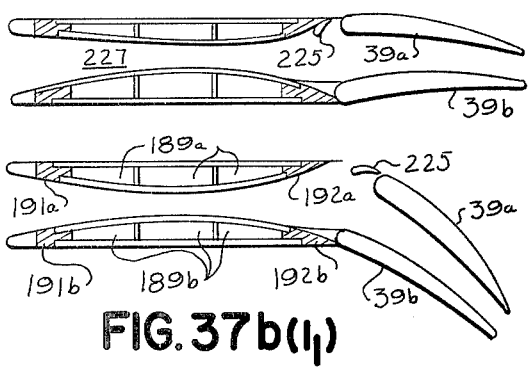
FIG.37a(I)
FIG.37b(I₁)

FIG.38a(J)
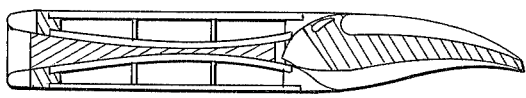
FIG.38b(J₁)
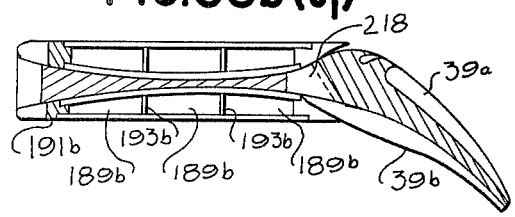
FIG.39a(K)
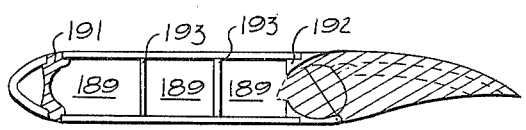
FIG.39b(K₁)
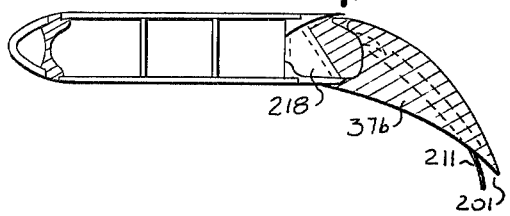
FIG.40a(L)
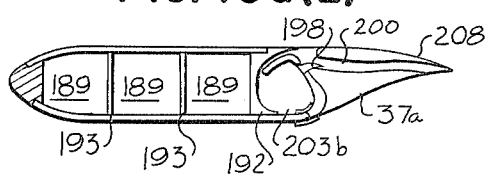
FIG.40b(L₁)
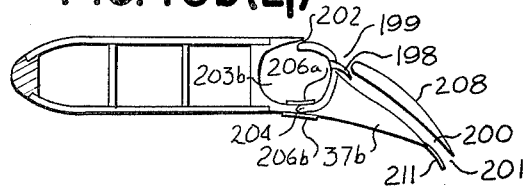
FIG.41a(M)
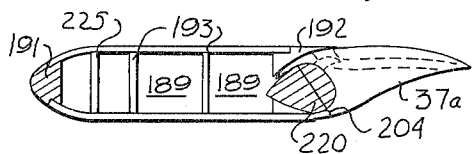
FIG.41b(M₁)
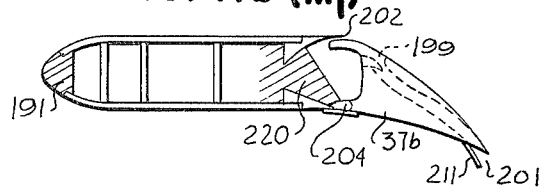
FIG.42(N)
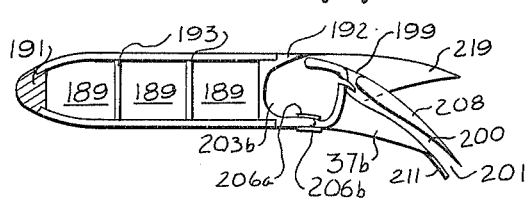
FIG.43(O)
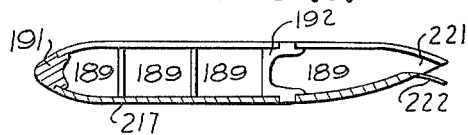
FIG.44(P)
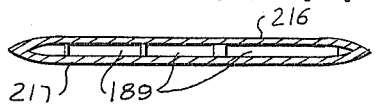

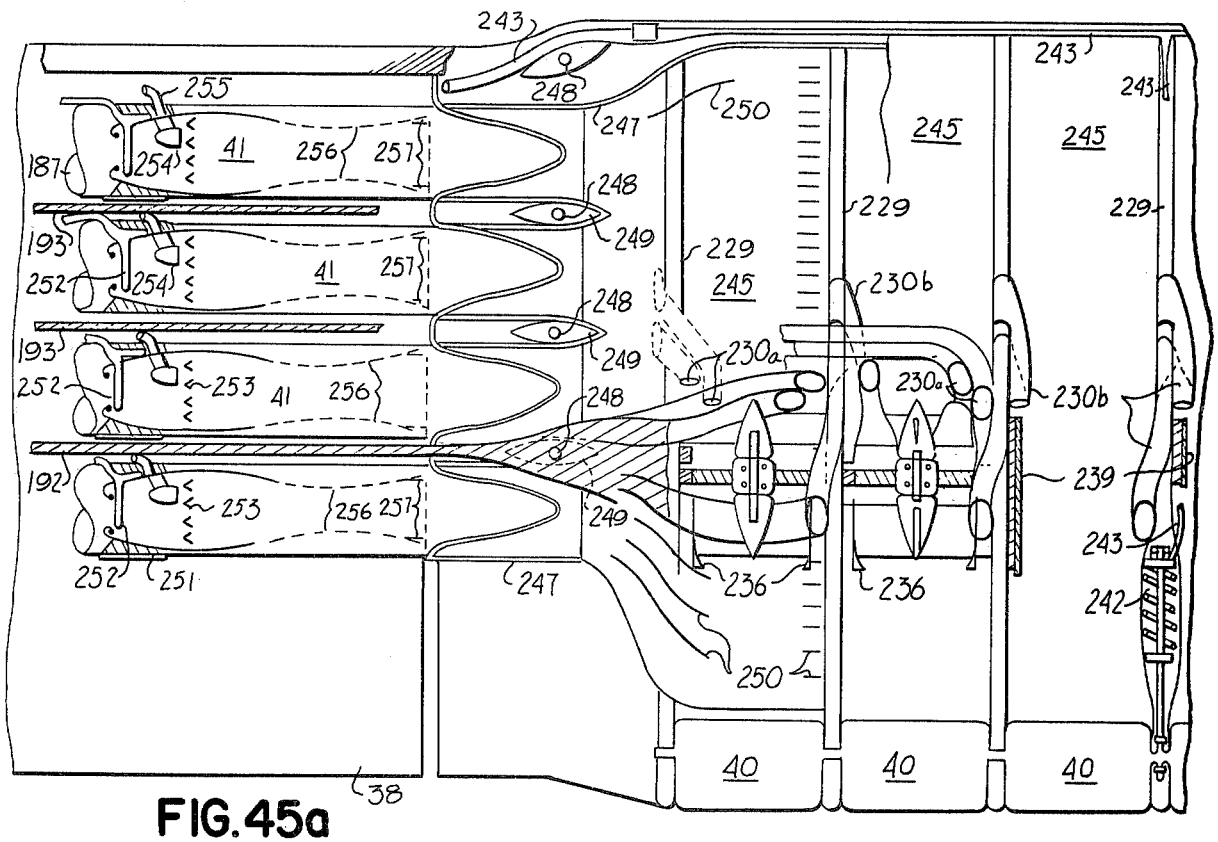
FIG.45a
FIG.45b
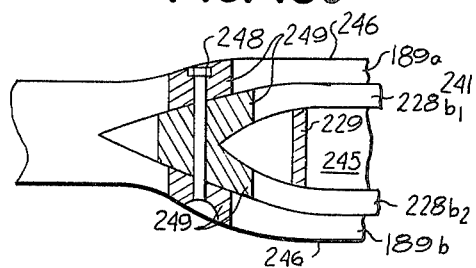
FIG.45c FIG.45d
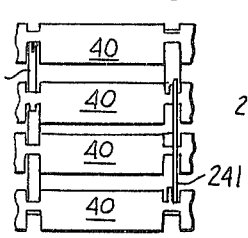
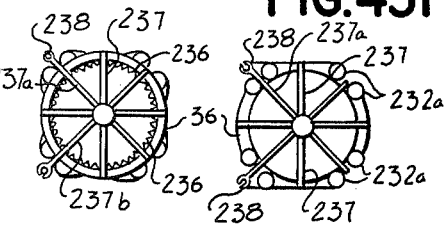
FIG.45e FIG.45f

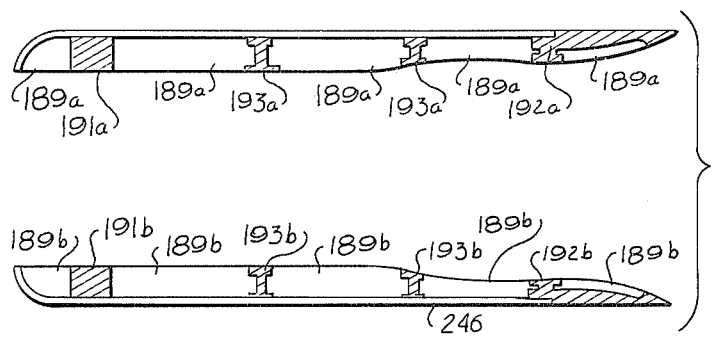
FIG. 46
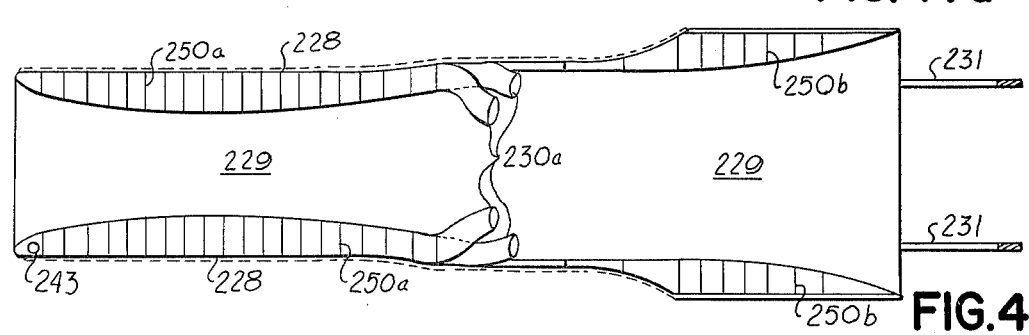
FIG. 47a
FIG. 47b
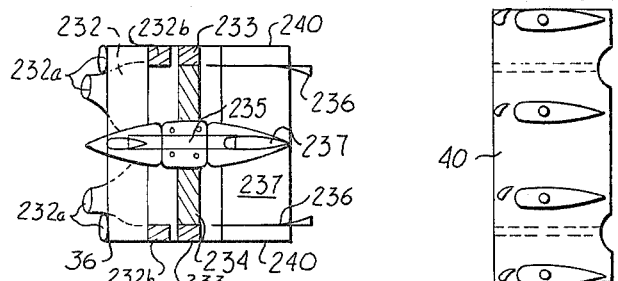
FIG. 48
FIG. 49
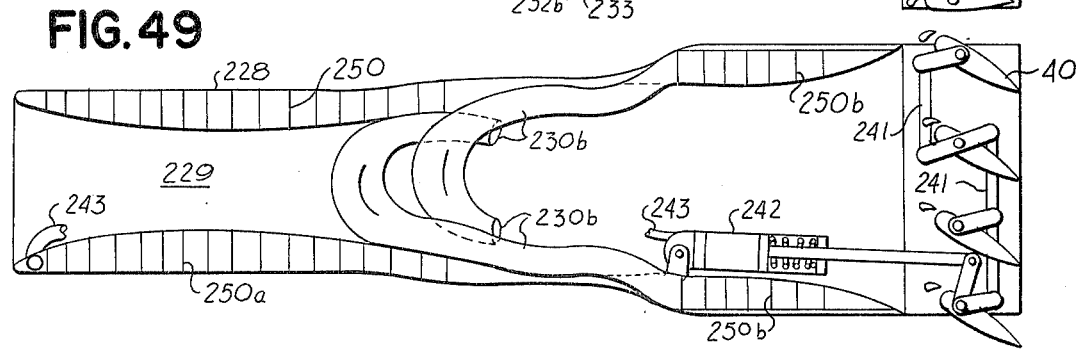
FIG. 50
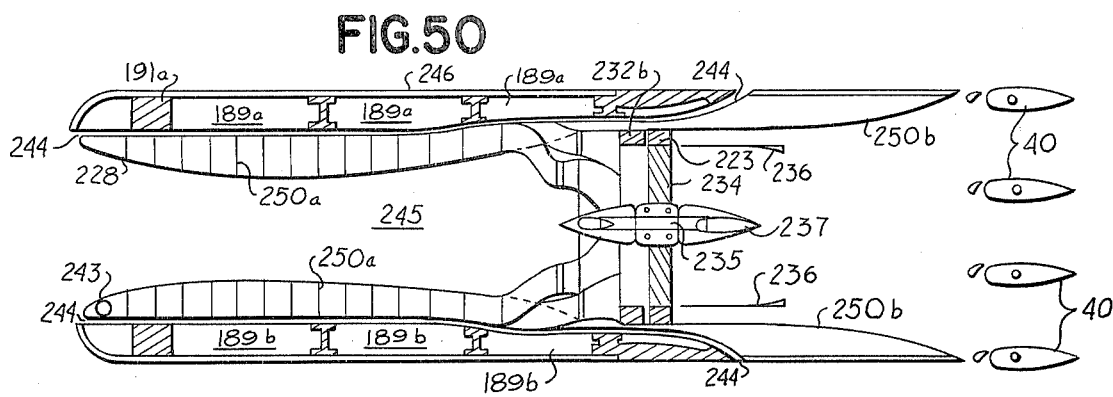

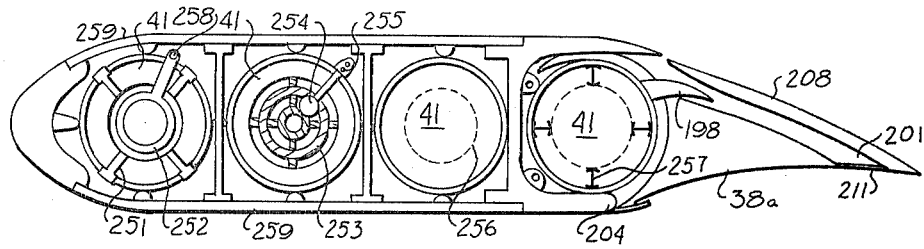
FIG.51a
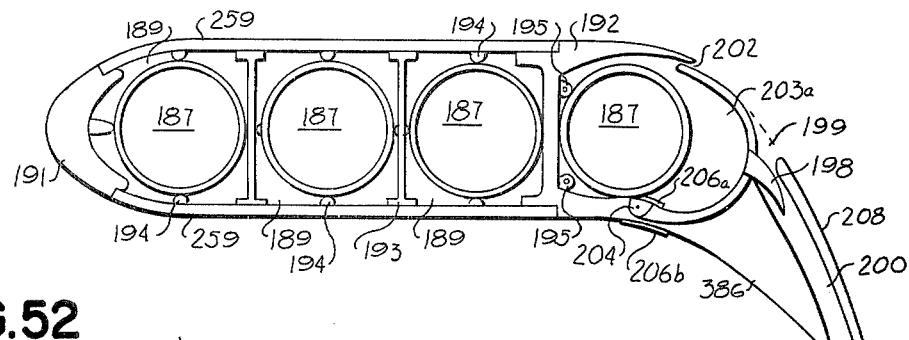
FIG.51b
FIG.52
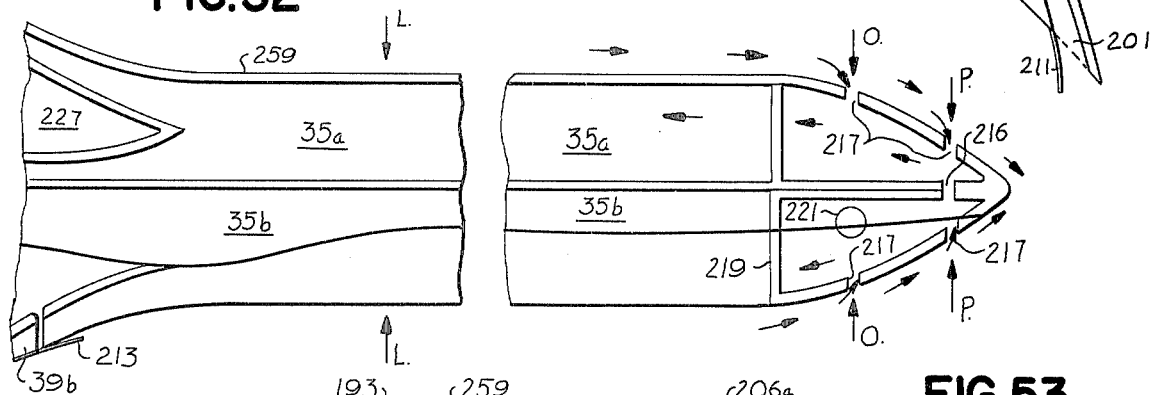
FIG.53
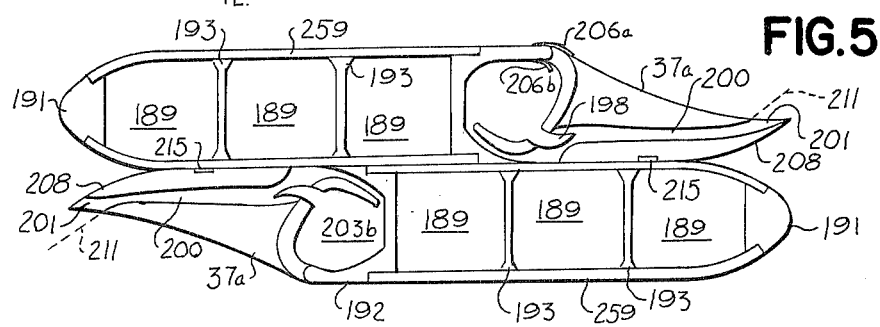
FIG.54
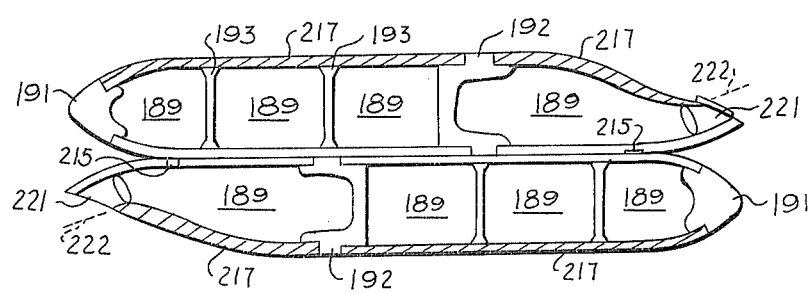
FIG.55
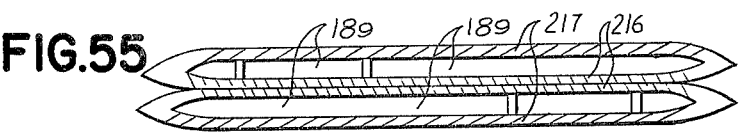

VERTICAL TAKE-OFF AND LANDING AIRCRAFT

BACKGROUND OF THE INVENTION

This invention relates to improvements in aircraft, and more particularly to improvements in vertical take-off and landing (VTOL) aircraft of the tail-lifter type such as shown in prior U.S. Pat. Nos. 3,582,021 and 3,762,667, David R. Pender.

The basic concept of tail-lifter type VTOL aircraft was established in U.S. Pat. No. 3,582,021 in which the aircraft with fuselage horizontal on the ground is lifted by a tail rotor, converted to fixed-wing flight by collapsing the rotor, letting the fuselage descend, pulling the aircraft out the descent to a horizontal position to fly on fixed wings, and then retracting the rotor. The process is reversed for landing.

U.S. Pat. No. 3,762,667 discloses a multiple of implementing innovations for carrying out the concept. A large number of those implementing innovations are superceded by the present invention but some are retained. Those retained innovations are shown in the drawings accompanying this application in order to present a complete picture of the invention and its operation; however, the text does not include a detailed description of those previous innovations.

SUMMARY

This invention includes a multiple of implementing innovations that are either technically interrelated or have some special advantage when applied to the tail-lifter concept, and those interrelated innovations are all designed to bring the tail-lifter concept closer to being a practical commercial and/or military aircraft. Some of these interrelated innovations are applicable only to the tail-lifter concept while others could possibly be used on fixed-wing aircraft or other types of rotor wing aircraft. However, all of the innovations fit together to create a specific VTOL aircraft to be used in the context of a specific type of VTOL transport system; therefore, these innovations need to be presented together in order to properly evaluate the usefulness of this invention.

The objectives of these interrelated innovations include:

(1) A method for improved ground handling and greater landing and take-off precision in adverse weather conditions to enable pin-point landings at the terminal entrance, which in turn will permit the elimination of aircraft wheels for ground movements of the aircraft.

(2) A new, more efficient method of space utilization for "packaging" passengers and loading and unloading passengers.

(3) A new, more efficient method of handling passenger baggage.

(4) A new, more efficient method of handling cargo, and mixed cargo and passengers, and methods of quick-changing from all passenger to all cargo, or any combination thereof.

(5) A new, improved method of converting from rotor flight to fixed-wing flight and back to rotor flight.

(6) A new, improved method of rotor directional control.

(7) Vibration reduction to fuselage via a new, improved flexible connection between rotor mast and fuselage.

(8) Improved flexible ducts for hot and cold gases to rotor blades.

(9) A new type suction, pressure jet-mechanical-flap rotor blade with higher coefficient of lift.

(10) A new type of rotor nozzle that provides both lift and propulsion with high propulsion efficiency, high thermal efficiency, and low noise levels.

(11) A method to eliminate the need for a rotor stowage door.

(12) A new suction system integrated with the low bypass engine, and specifically adapted to the arrangement or layout of the tail-lifter aircraft and integrated with the rotor flight system to provide for fuel efficient suction laminar flow control during fixed-wing flight.

(13) A new type of suction surface skin for the wetted area of the aircraft to be used in conjunction with the abovementioned new suction laminar flow control system.

Other objects and advantages of the invention will become apparent during the course of the following detailed description.

BRIEF DESCRIPTION OF DRAWING FIGURES

FIG. 1 is a front view of the aircraft on the ground, showing the rotor unit deployed.

FIG. 2a is a side view of the aircraft with rotor retracted as in fixed-wing flight, but also showing the arrester cable as it would be used for landing and take-off.

FIG. 2b is the same as FIG. 2a, but cut away to show the interior of the fuselage and interior of the stowage tube with rotor.

FIG. 3a is a top view of the aircraft, cut away to show major components of the retracted rotor unit in the stowage tube and upper deck passenger seats and also showing engines with added inlet and outlet components, with rotor directional control ducts.

FIG. 3b is similar to FIG. 3a, but showing only the front part of the fuselage, and cut away to show main fuselage seating and pilots' underside windows for rotor flying.

FIGS. 4a and 4b are enlarged top views of the rotor directional control duct showing rotor directional control diverter valve at wing tips.

FIG. 5 is a front view of wing tip winglets indicating rotor directional control nozzle outlets at the top winglet and at the bottom winglet.

FIG. 6 is a sectional end view of the winglets shown in FIG. 5.

FIG. 7 is a top view of the rear of the aircraft showing the passenger cable train extended inside the passenger terminal with baggage compartments deployed outwardly.

FIG. 8 is a side view of FIG. 7 which also shows the deployed rotor.

FIG. 9 is a side view of the rear two-thirds of the cable train showing a mixed passenger-container cargo payload.

FIG. 10 is a rear view of aircraft showing the inside of the fuselage cross section and a sectional view of the rotor near the rotor mast with the blade rotated to show a cross section of the blade cord at the root of the blade.

FIG. 11 is a top view of the tail of the aircraft, with rotor deployed, illustrating major components inside the rotor blade.

FIG. 12 is a side view of the aircraft in the process of transition from rotor flight to fixed-wing flight with the rotor in the process of closing.

FIG. 13a is a top view showing the front end of one engine and all special engine intake components relating to the separation of the hot gas and by-pass intake, showing the by-pass fan as the suction pump for the surface suction system.

FIG. 13b is a partial cross sectional view of FIG. 13a at the side wall at the front end of the stowage tube, showing ambient air being sucked in through the by-pass duct system of the stowed rotor through air passages through the stowage tube wall and into the by-pass fan intake.

FIG. 13c is a similar view to FIG. 13b but with rotor unit extended, allowing the one-way flap valve to close, sealing off the opening in the stowage tube wall that leads to the by-pass air intake.

FIG. 14 is a cross sectional view of FIG. 13a showing the rotary valve in the open position creating a vacuum chamber inside the wing and sucking air through the porous wing skin surface.

FIG. 17a is a side view of FIG. 16 showing only the curved or diverted gas path leading to the rotor system and also showing the rearward components of the rotor propulsion system, including the cyclic pitch control valves.

FIG. 17b is a further side view of FIG. 16 but taking a straight-through plane showing only the duct system to the fixed-wing flight tail pipe.

FIG. 18a is a cross sectional view of FIG. 17a showing the lateral divider cyclic pitch control valve and also showing hot and by-pass ducts leading into the rotor unit.

FIG. 18b is a cross sectional view of FIG. 17a showing only the vertical divider cyclic pitch control valve.

FIG. 21 is a cross sectional view of the rotor mast in the vicinity of the 90° mast tilt joint showing the center hot gas duct, the four by-pass control ducts, and the four flexible mast elastomer mount units.

FIG. 22 is a cross sectional view of FIG. 21 to further illustrate the design of the flexible mast elastomer units.

FIG. 23 is a cross sectional view of FIG. 25a, taken in the rotor stowage tube and viewed from the top, showing how the four by-pass control ducts merge into the mast to form a quartered or four-part concentric by-pass duct surrounding the hot-gas ducts.

FIG. 24 is a view also taken in the rotor stowage tube and showing the folded rotor blade roots at the point where the blade flexible ducts enter the blade roots.

FIG. 25a is a side, cut-away view of the upper part of the rotor mast also showing the hot and by-pass flexible ducts entering the blade roots and showing the rotor mast extension.

FIG. 25b is a cross sectional view of FIG. 25a showing the rotating part of the rotor mast at the interface of the nonrotating part of the rotor mast.

FIG. 26 is a view similar to FIG. 25a, on a reduced scale, taken at a 90° angle, showing the lower portion of the rotor mast down to the inside of the rear of the stowage tube.

FIG. 27a is a top view of the inboard portion of the rotor blade cut away to show major components of a portion of the rotor blade.

FIG. 27b is a side view of FIG. 27a.

FIGS. 28 throgh 34a and 34b are cross sectional views of further components of the inboard portion of the rotor blade.

FIG. 35a is a top view of the outboard portion of the rotor blade cut away to show major components of a portion of the rotor blade.

FIG. 35b is a side view of FIG. 35a.

FIGS. 36a, b, 37a, 37b, 38a, 38b, 39a, 39b, 40a, 40b, 41a, 41b through 44b are cross sectional views of further components of the outboard portion of the rotor blade.

FIG. 45a is a top view near the center of the rotor blade at the mouth of the nozzle, cut away to show major nozzle components, including reheat burners and the multiple turbo tip driven fans.

FIG. 45b is a side view of FIG. 45a showing the pair of blades folded up, inside the stowage tube, and cut away at different planes, showing different components of the nozzle, both from the leading and trailing edges of the nozzle.

FIG. 45c is a further side view of the same portion of the blade as shown in FIG. 45b but at a different plane, and showing how the nozzle unit is slid in and anchored at the upstream end.

FIG. 45d is a view of one set of the variable turning vanes shown in the deflected position at the rear of each turbo tip driven fan tunnel, as viewed from the rear or trailing edge of the nozzle unit.

FIG. 45e is a rear view of one of the turbo tip driven fan units, viewed from the rear or trailing edge of the nozzle unit.

FIG. 45f is a view similar to FIG. 45e but viewed from the front or through the leading edge of the nozzle tunnel.

FIG. 46 is a cross sectional view of the center portion of the rotor blade or blade nozzle cavity housing the nozzle unit, but without the hot gas manifold unit.

FIG. 47a is a cross sectional view of the hot gas manifold unit, but without the removable turbo tip driven fan units and turning vane unit.

FIG. 47b is a cross sectional view of the removable turning vane unit.

FIG. 48 is a cross sectional view of the removable turbo tip driven fan unit.

FIG. 49 is a cross sectional view of the hot gas manifold unit but taken at the cross section of the nozzle wall separating the individual turbo tip driven fan units and showing the attached turning vanes with actuator cylinder.

FIG. 50 is a cross sectional view of the entire nozzle unit assembled, taken at the cross section of the center of the turbo tip driven fan.

FIG. 51a is a cross sectional view of the rotor blade showing various cross sections of the reheat burners.

FIG. 51b is a view similar to FIG. 51a but with the reheat burners not shown and with the mechanical-jet flap in the down position as shown in FIG. 34b but on an enlarged scale.

FIG. 52 is a side view of the outboard portion of the pair of folded blades which would be wetted or exposed to the slip stream during winged flight and showing suction slots for drag reduction.

FIGS. 53, 54 and 55 are cross sectional views of FIG. 52.

Figure 56A:
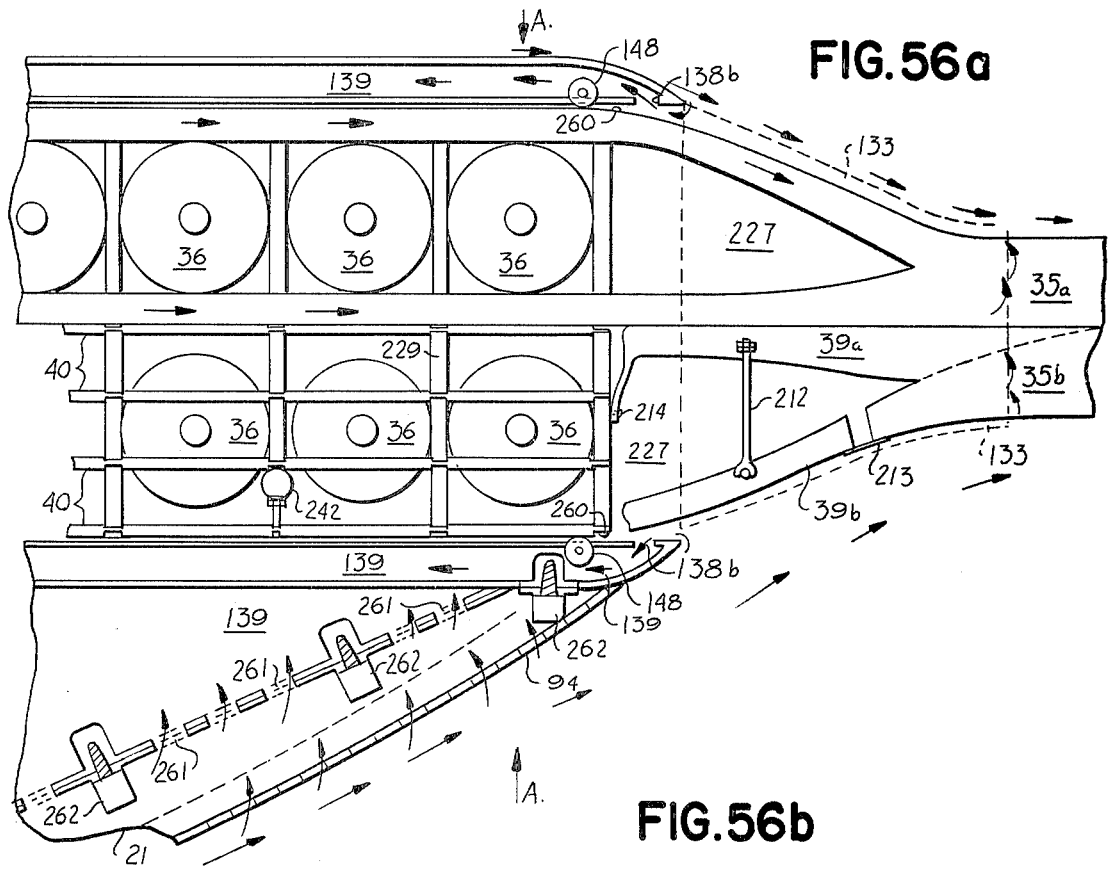

FIG. 56a is a side cut-away partial view of the pair of folded blades, showing the outward portion of the jet nozzle and the transition to the outward exposed portion of the outer blades, and also showing the rear portion of the stowage tube and the end of the rear ramp door.

Figure 56B:
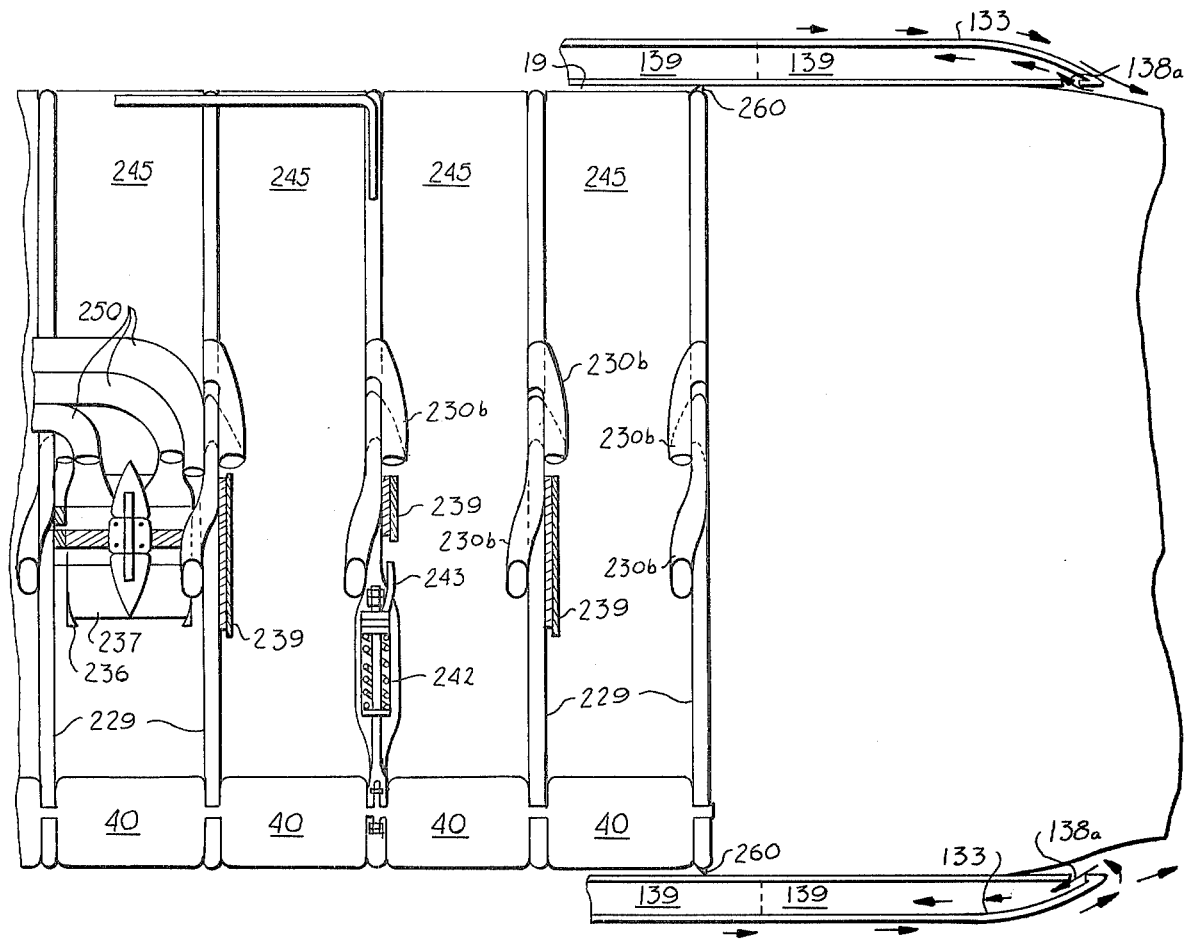

FIG. 56b is a top, cut-away view of FIG. 56a.

Figures 57, 58:
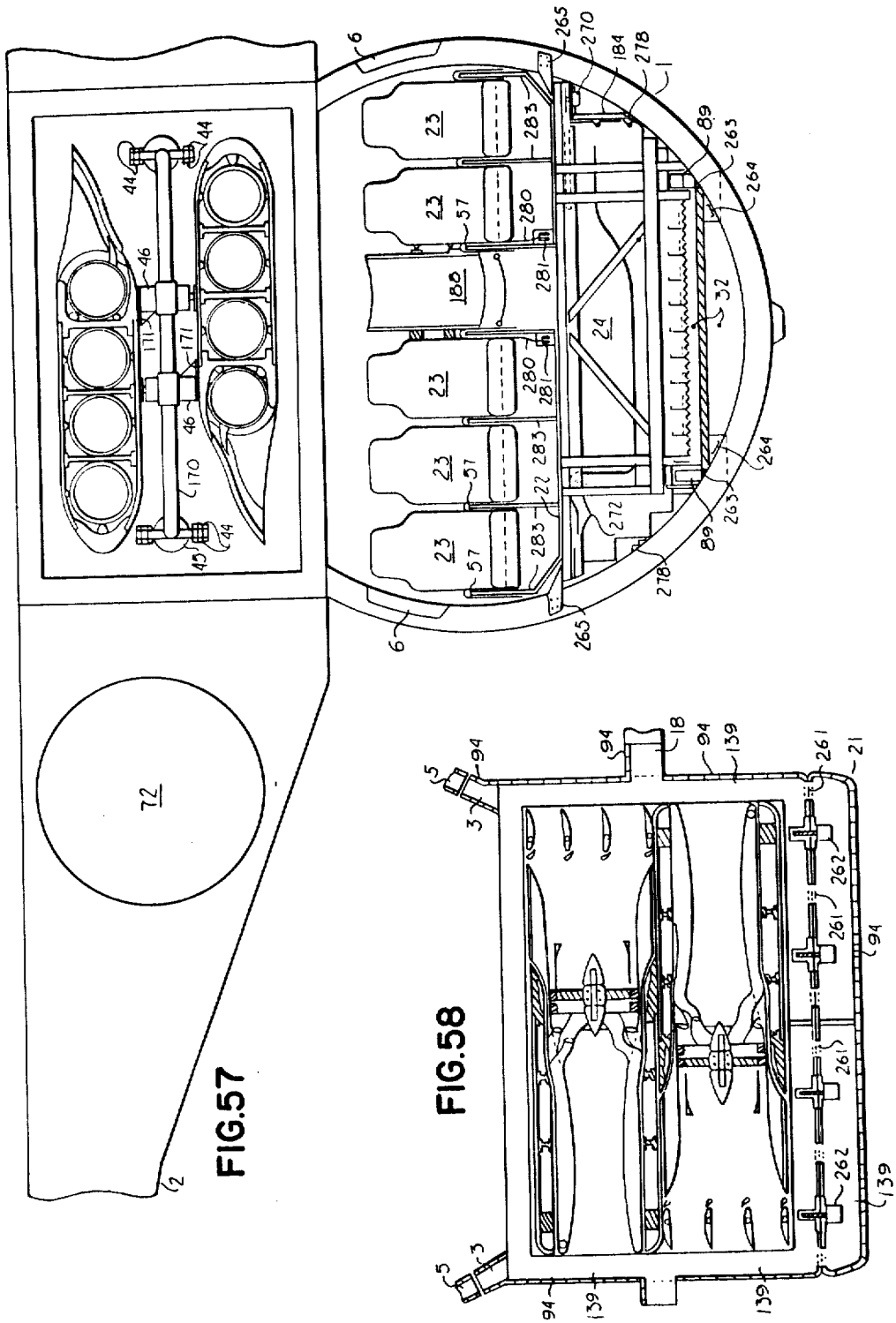

FIG. 57 is a cross sectional view of the aircraft, showing a constant fuselage section and cable train with passenger seats and roll-out baggage container beneath, and also showing a section of the wing, stowage tube, and an inboard cross section of the folded rotor blades.

FIG. 58 is a cross sectional view of FIG. 56a.

FIG. 59a is a top view of the cable train with baggage units extended.

FIG. 59b is an end view of FIG. 59a.

Figure 60:
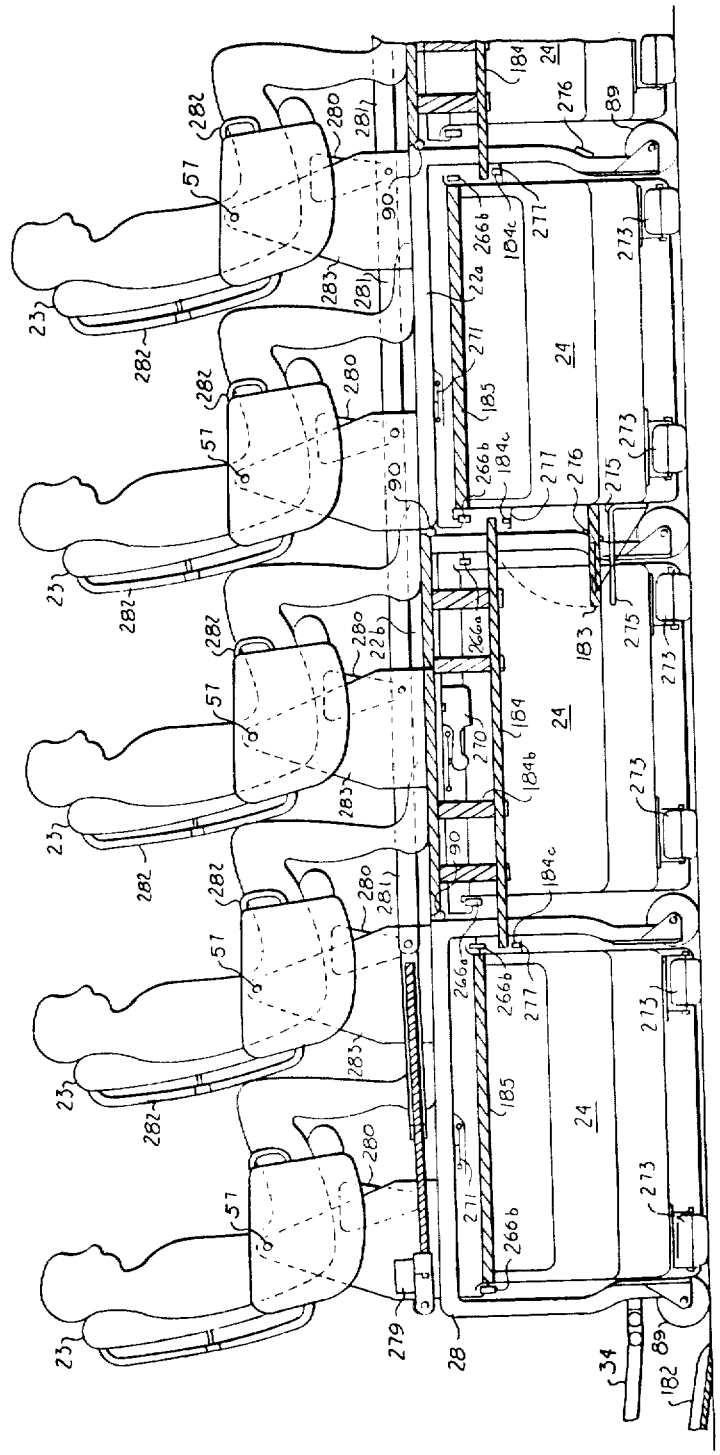

FIG. 60 is a side view of the rear section of the cable train with passengers when fully extended out of the fuselage, with baggage containers extended, alternately left and right from the cable train.

Figure 61:
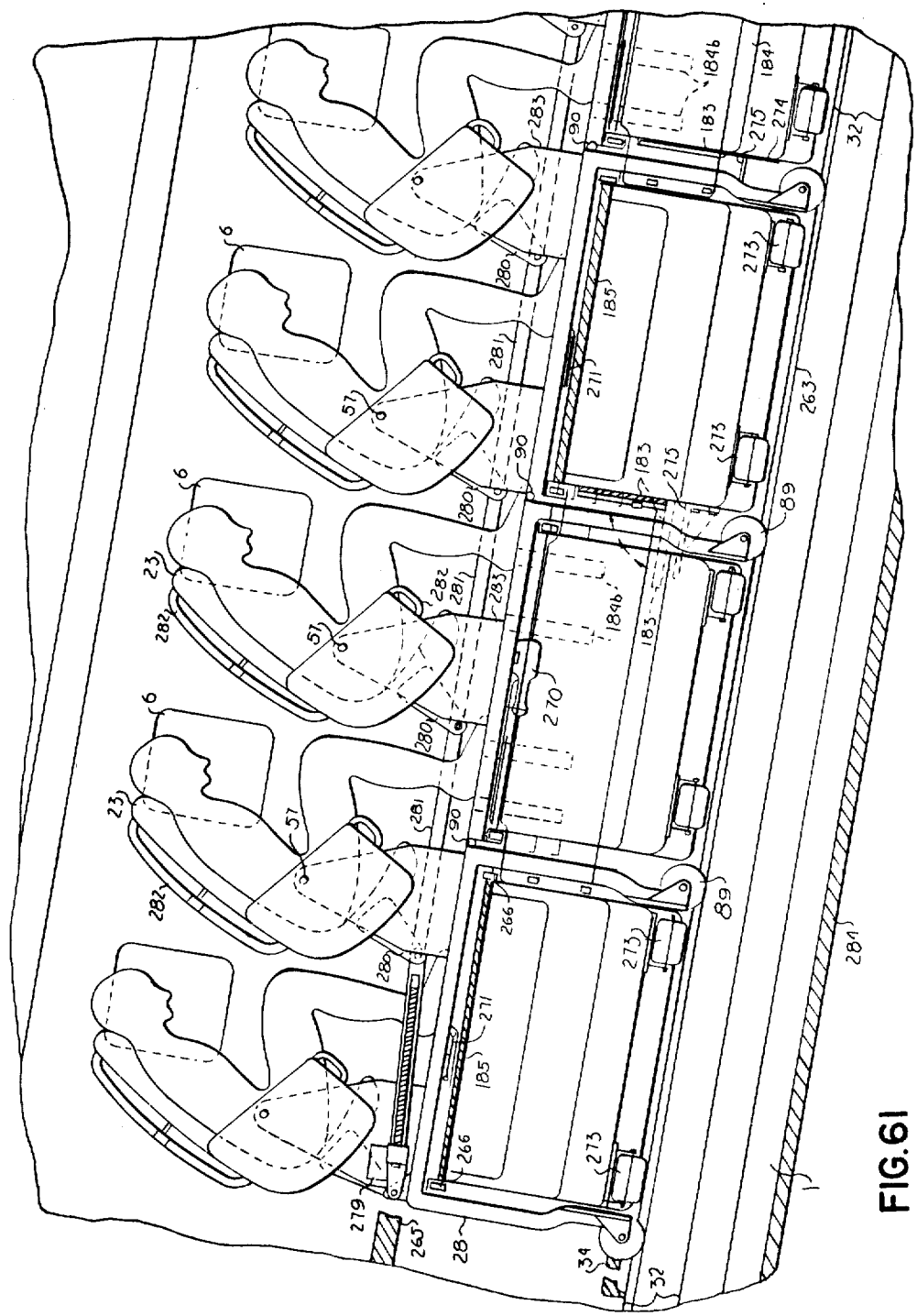

FIG. 61 is a side view of a section of the cable train inside the fuselage, with seats tilted forwardly, as when the aircraft is in rotor flight.

FIG. 62 is a partial side view of the rear of the parked aircraft, with ramp door open, the left side showing the tail end of the cable train before the cable train is extended and the right side showing the front end of the cable train after it has been fully extended out of the aircraft.

FIG. 63 is a partial side view of the rear of the aircraft, with the rear ramp door closed, showing the tail end of the cable train fitted in the ramp door.

Figure 64:
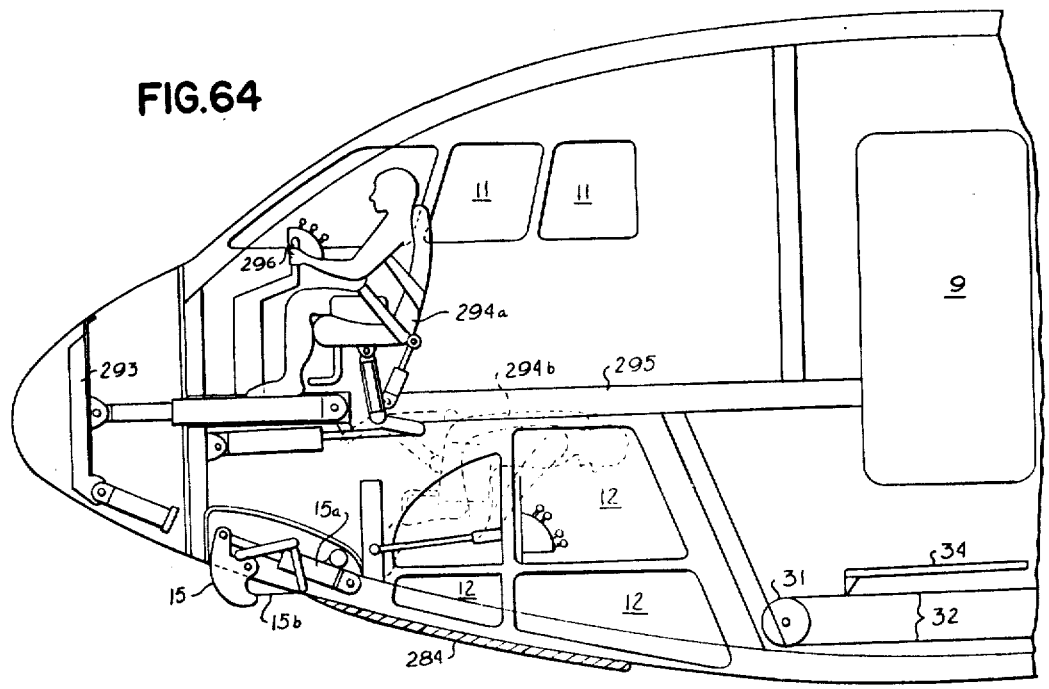

FIG. 64 is a side view of the pilot's compartment showing the pilot's position for both fixed-wing flight and rotor flight, and also showing details of the arrester cable hook.

Figure 65:
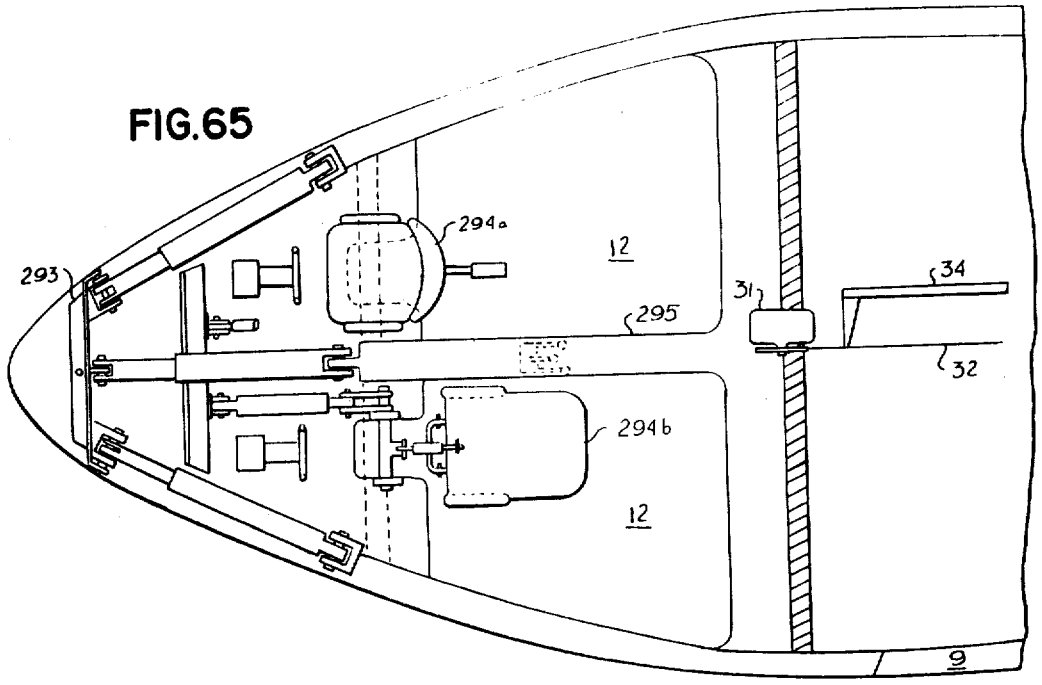

FIG. 65 is a top view of FIG. 64.

Figure 66A:
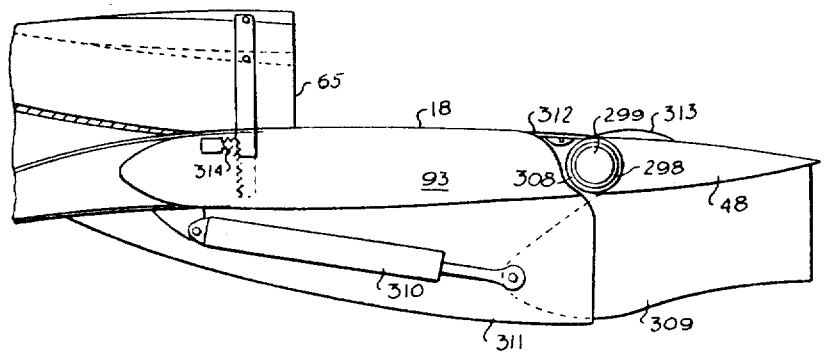
Figure 66B:
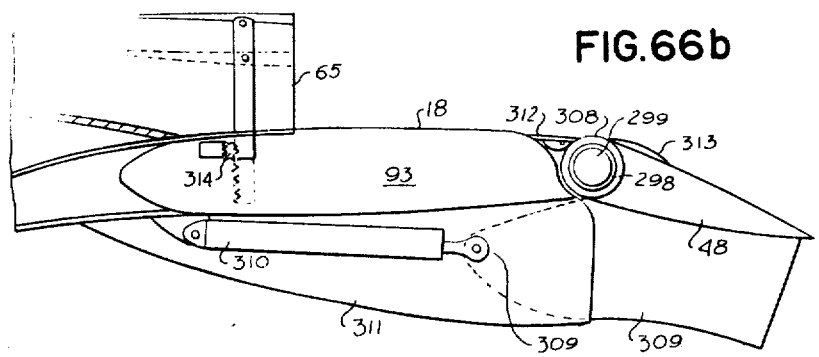
Figure 66C:
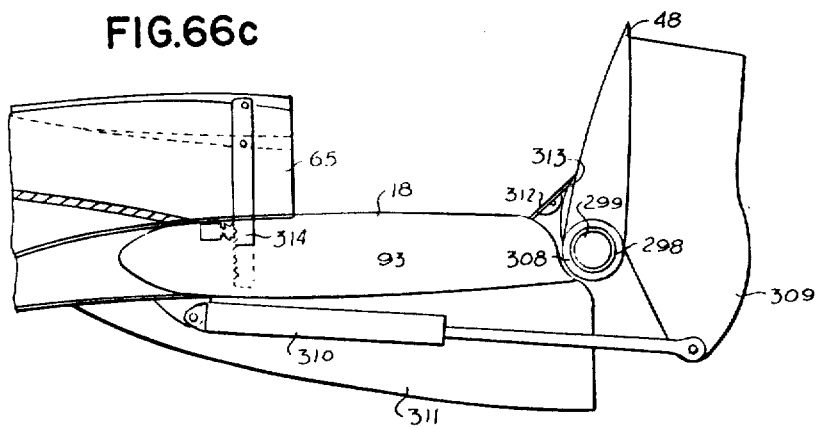

FIGS. 66a, 66b and 66c are side views of the jet engine tail pipe and the inboard elevator-thrust deflector shown in three different positions.

FIGS. 67a, 67b, 68a and 68b are sectional views of the suction augmented fixed-wing elevators.

FIG. 69 is a rear end, sectional view of the horizontal stabilizer showing the thrust deflector with jet tail pipe, the pivot axis and crank arms of the elevator, and the pivot axis of one of the rudders along with part of the rotor stowage tube with suction air passages.

FIGS. 70a and 70b are top sectional views of the suction augmented fixed-wing rudders.

FIGS. 71a and 71b are cross sectional areas of the main wing showing suction assisted split mechanical flaps.

FIGS. 72a, 72b and 72c are cross sectional view near the outer wing, illustrating an alternate method of rotor directional control, based on a similar suction-mechanical flap principle as in FIGS. 71a and 72b.

FIG. 73 is a partial view of the top of the aircraft, on a reduced scale, showing the location of the components in FIGS. 71a through 72c.

FIGS. 74 through 77b are views of a flexible duct and its various components, used to meet the stringent flexible duct requirements of the pressure jet rotor for the tail-lifter aircraft.

FIGS. 78 through 83 illustrate a suction surface compliant skin for "wetted" areas of the aircraft for suction laminar flow control.

DETAILED DESCRIPTION

The Payload Handling System

1. An Overview of the Payload Handling System

A key feature in the payload handling system is that the entire payload - passengers, baggage or cargo, etc. - is wheeled in and out of the fuselage through a rear ramp door on a cable train that is a detachable part of the aircraft fuselage. The overall concept of the cable train is illustrated in FIGS. 2b, 7, 8 and 9.

The major purposes of this cable train system are:

1. To make it feasible to forego stand-up head room during flight.

2. To make is feasible to forego the need for an interior aisle at certain times so that the interior aisle can be quickly changed, back and forth, as needed from aisle use to passenger seating use.

3. To make it feasible to eliminate the need for checking passenger baggage.

This cable train concept could be advantageously used on other types of short-haul aircraft, including conventional fixed-wing aircraft and conventional helicopters; but the cable train concept appears to be absolutely essential to the economic feasibility of the tail-lifter concept for the following reasons:

(1) The rotor stowage tube takes up about forty percent of the cross sectional area of the fuselage, see FIG. 57. To compensate for this massive rotor stowage area requirement, trade-offs must be made, and the giving up of head room and sometimes aisle use almost compensates for rotor stowage tube area requirements.

(2) Also, the elimination of expensive and time-consuming baggage checking appears to be an important prerequisite to an efficient center city to center city short-haul VTOL transport system.

(3) To receive full benefit of the cable train system, it must be used in conjunction with the tail-lifter precision landing system, to be further described, which is specific to the tail-lifter concept. This allows the tail-lifter to be landed within a few feet of the passenger terminal door so the cable train can be extended directly into the passenger terminal without the need for ground relocating of the tail-lifter aircraft, and thereby eliminating the need for wheels on the aircraft.

For the above reasons, the cable train should be considered an integral part of the present tail-lifter invention since it appears essential to the economic reduction to practice of the invention.

Part of the understanding of this invention is the perception that the tail-lifter short-haul VTOL can do without stand-up, walk-around head room, and also do without an interior aisle at certain times. The reduction of both head room requirements and interior aisle requirements are interrelated, and are made possible by both the roll-in, roll-out cable train feature and the relatively short time period of each stage length of this short-haul VTOL. With the above comments in mind, this particular passenger handling system appears feasible for the following reasons:

(1) The roll-in, roll-out cable train system eliminates the need for stand-up head room and interior aisles because getting to and from passenger seats takes place outside the fuselage, with passengers loading and departing from the sides of the cable train. The only other normal, non-emergency need for an aisle and enough head room to use the aisle relates to the need to use the lavatory.

(2) The maximum stage length of the short-haul VTOL flight would be about one hour and 15 minutes, with an average stage length of less than 40 minutes. The vast majority of passengers, forewarned of the limited lavatory facilites and limited access to those facilities can make do without them with no great sacrifice. Those few passengers who feel they must use the facilities could sit well forward close to the lavatory and, therefore, would have to disturb fewer fold-away seat passengers. This would be similar to asking theater patrons to stand up to get to empty seats in the middle of the theater. Also, passengers in the upper deck would have easy access to the lavatory as the upper deck aisle has no fold-away seats and is always open.

At least one lavatory appears essential for this VTOL - for crew, emergencies, and those who must use it; but it also appears to be a good policy to make the lavatory slightly inconvenient, considering flights are usually of short duration.

(3) When the aisle is open, there is enough head room to use the aisle in a slightly bent-over position. The aisle head room is about the same as in small business jets and slightly higher than "micro-buses" and van-type automotive vehicles.

(4) The convertible aisles would always be open when normal load factors are below 80 percent, which would usually be most flights. Also, on the longer short-haul flights, the convertible aisle could be required to remain open, with reduced passenger capacity, and the weight savings of reduced passengers would be traded off for fuel to implement the longer flight.

(5) The concept of short-haul inter-city VTOL transport is strictly utilitarian - no food, no drink or other service, and no standing-up and walking-around.

It might be noted that most smaller general aviation aircraft as well as automobiles have neither stand-up head room nor aisles or toilets and both are designed for non-stop trips substantially longer than the one-hour trips of the short-haul tail-lifter. Also, in terms of maximum and average trip time, this VTOL stage length is the same order of magnitude as an urban transit bus or subway ride, and these vehicles also have no lavatories, and passengers only stand up when they can find no seats.

(6) An aisle must be provided in case of emergency. The operating practice for the cable train system would be to keep all fold-way seats folded away when not occupied, and only use fold-away seats after all other seats are occupied. Then, in an emergency, or even in normal deplaning, fold-away seat occupants would get up and fold their own seats, which would take about five seconds, and the convertible seat area would become an instant aisle for these fold-away seat occupants to file out.

Emergency exit hatches are placed about every sixteen feet, so the maximum distance any passenger would have to travel to an emergency exit would be about eight feet. Therefore, in an emergency, the permanent seat passengers who happened to be next to the emergency side exit doors would get out first, followed by the fold-away seat occupants, and then by the other permanent seat passengers. Since the fuselage is right on the ground, the emergency exits are close enough to the ground so no chutes or other devices are required for the emergency exits.

2. Details of the Cable Train

FIGS. 2b, 3b, 7-10, 57, 59a, 59b, 60-64 illustrate the payload handling system. It consists of a cable train 22 made up of a series of "cable cars" with passenger seats on top, as shown at 23, and slide-out baggage containers 24 beneath, see FIGS. 26, 7 and 8. The front cable car has four wheels 28; and the in-between cars have two wheels attached to each other similar to a series of 2-wheel trailers with a double or "piano" hinge at the passenger floor 90, allowing movement in only one plane, i.e. the up and down plane, and no significant lateral or sideways movement as would happen with a single-point hinge. As shown in detail in FIG. 62, the front 4-wheeled cable car has a rigid tongue 34 attached to the front cable car, which also has a double or 2-point hinge to allow only up-and-down movement of the tongue, with the other end of the tongue attached to an endless cable 32 in the bottom of the fuselage. The endless cable is driven by a cable train drive wheel and motor 31 and has a return cable wheel or pulley 33 in the extreme aft end of the rear ramp door 21. There are in-between guide or idler pulleys 291 near the hinge of the ramp door 288 to provide a rolling surface for the cable when the cable bends downwardly as the ramp door is opened.

Again referring to FIG. 62, to unload passengers and baggage, the ramp door 21 is opened via a motor winch 286 in the ramp door, with twin side-winch cables 85 attached to the mating ramp door surface on the fuselage. Ramp door toes 182 are folded down, either mechanically, or by hand, and the cable train drive wheel motor 31 is activated to extend the cable train until the front car 28 is extended just beyond the ramp toes via the cable train tongue 34. As shown in FIGS. 7 and 8, the cable train extends inside the passenger terminal building 87, and an overhead garage-type sliding door 88 can be pulled down to substantially enclose the passengers and keep out noise and inclement weather, and separate the passengers from the aircraft.

Each cable car has a slide-out baggage container 24 beneath the passenger floor (FIGS. 59a and 59b). Four rollers 266 are attached to the top of the baggage container that coact with mating tracks 272 beneath the passenger floor. Each baggage container has its own endless cable 269, cable drive pulley unit 270, and return pulley 271 to extend and retract the baggage container which is connected to the cable 269 via the baggage container cable anchor arm 268. The baggage containers are designed so they extend alternately outwardly, left, right, left, right, etc. from the cable train. The ends of the baggage container track 272 curve downwardly so that as the baggage container outer rollers 266b roll out beyond the track they let the baggage container down to ground level so the baggage container wheels 273 meet the ground, and continue rolling, and as the baggage train is fully extended the curved-down end of the baggage container tracks 272 allows the inner baggage container rollers 266a to also roll downwardly until the entire baggage compartment rests solidly on the ground on its four wheels. The inner baggage compartment rollers 266a are attached to baggage compartment inner roller arms 267 to allow the full extension needed for the baggage containers 24.

Passengers get on and off the cable train in the spaces between the alternately extended baggage containers, depositing their baggage in the containers as they board, and picking them up again as they get off at their destination.

As shown in FIGS. 59a, 59b and 60, passenger boarding of the cable train is implemented by: (a) a fold-up step attached to the side of the baggage container 183; (b) a fold-out step-platform 184 which is hinged to the sides of the cable train floor and spans the spaces between the baggage containers; and (c) a built-in platform over the top, inside part of the baggage container 185 which leads to the cable train floor where passengers use (d) the hand holds on the outside seats 282 to aid in getting to their seats on the cable train floor.

The fold-up seats work in the following manner: as the baggage container is retracted, the hinged swing-out actuator arm 275 is forced inwardly by the guide rail 276 which pushes on the hinged passenger step slide-up support brace 274. This pushes the hinged fold-up step 183 upwardly so the fold-up step can fit in the allocated space as the baggage container is retracted. The process is reversed when the baggage container is extended.

The hinged passenger step platform 184 works in the following manner. With the baggage container in the closed position and with the cable train inside the fuselage as shown in FIG. 57, the platform 184 will be held down and under by the fuselage fold-under guide rail 278 as shown in FIG. 57. As the cable train is extended, the hinged platform will swing slightly outwardly, and hang downwardly, as determined by gravity. Reversing the process, as the cable train is retracted back into the fuselage, these hanging step-platforms will be forced further downward and inward by lead-in guide rails at the opening of the rear ramp door (the lead-in portion of these rails is not shown). The platform will again be in the position shown in FIG. 57.

Again assuming the passenger train is out of the fuselage, as the baggage containers are extended outwardly, alternately on the left and right side of the cable train, track units 277 attached to the outside of the baggage container engage rollers 184c on the underside of the platform 184 to push the platform to the position shown in FIGS. 59b and 59a, and support the platform in that position. The guide rail or track units 277 curve upwardly in the vicinity of the fold-up steps so the tracks will not be in the way of the steps. This process is reversed when the baggage containers are retracted and the platforms 184 are left swinging downwardly, so they can be folded under when the cable car is retracted into the fuselage.

There are no moving parts in the fixed platform 185 over the baggage container, and no further description is needed.

In order to take full advantage of the tail-lifter VTOL concept, it is designed to land without special ground facilities in any small open space, such as on grass or soft ground. In order to roll out the cable train on grass or soft ground, a set of portable track units are attached to the ends of the ramp toes 182 to prevent the relatively small cable train wheels 89 from sinking in the grass or soft ground. The roll-out baggage containers are provided with wide, high floatation wheels 273 to also minimize the sink-in rolling friction problem on soft ground.

There is a cut-out on the rear side of the baggage container, see the right side container of FIG. 59b, so passengers will not have to lift baggage so high to deposit or retrieve it. This 'rear' side of the container becomes the top of the container when the fuselage is near the vertical position on rotor flight. This means the weight of the baggage is resting on the front or bottom side of the container during rotor flight.

3. The Seat-Tilting Unit

Another important feature of the payload handling system is the tilting of the passenger seats. This is shown in FIGS. 60, 61 and 57. When the aircraft is lifted by its tail and flying on the rotor, the rear-facing seats need to be tilted forward for the comfort of the passengers. The mechanism tilting the seats is a screw actuator 279 with one end anchored to the floor of the forward cable car (although it could be anchored to the floor of any cable car) and the other end attached to a seat tilt lever arm 280 of the adjoining forward seat, as shown in FIGS. 60 and 61. For needed clearance between rows of seats, all seats need to be tilted in unison. To accomplish this, all seats in a row operating on a single actuator are joined together so they must tilt together, and each row is connected to every other row via seat tilt connecting rod synchronizers 281, each attached to the lever arm 280 beneath the seat. These connecting rods are placed so that they do not get in the way of the passengers' feet, either to the side of the seat or in the center, so that the passengers' feet straddle the rods 281. When the seats are tilted, they pivot around the seat tilt hinge 57. Since the seat rows on the left and right sides of the aisle are not easily joined, separate actuators and connecting rods are used for seats on each side of the aisle, as shown for arms 280 and rods 281 in FIG. 57. The seat-tilt mechanism should be operated automatically by a gravity level sensing device but could be operated manually, if necessary.

The toilet 78 is one seat designed not to tilt as do the other seats. The toilet is of the recirculating closed system type with chemically treated water, with a filter. The toilet is aligned fore and aft or parallel with the fuselage, with the holding tank to the rear of the seat. On fuselage tilt-up, the fluid in the toilet bowl simply flows rearwardly through the water seal into the holding tank; and on fuselage tilt-down, as in converting to fixed-wing flight, the fluid flows back into the toilet bowl.

Passenger windows 6 are designed for some viewing during all stages of seat tilt but are designed for maximum viewing during forward seat tilt when the aircraft is on rotor flight at low altitude.

4. Interior Aisle and Fold-Away Seats

The convertible aisle seat 188 is shown in FIG. 57. It is a fold-away fabric seat similar in principle to the folding 'director's chair' or folding wheelchair. This folding seat fits into an aisle about the same width as the other seats.

In its most simple form, as shown in FIG. 57, the fold-away seat 188 consists of (a) fabric back with rigid stays sewn into the fabric on each side, and (b) a fabric seat, also with rigid stays sewn into the fabric on each side.

The rigid stays, both back and bottom, are attached permanently to the permanent seats on one side and the rigid stays on the other side, both back and bottom, have quick release hooks or latches that are attached to the permanent seat on the other side of the aisle. To open the aisle, stays on the latch side of the fold-away seats, both back and bottom, are lifted of their latch or hook receivers and deposited in convenient holders on the opposite side of the aisle.

As the permanent seats tilt forward and backward in unison, so do the fold-away seats. The fold-away seats are provided with seat belts as are the permanent seats.

5. Cable Car Length

Another feature of the cable car train is that the length of each cable car is exactly 1.5 times the seat pitch. Seat pitch is defined as the distance from one row of seats to the next row of seats. This means that every other cable car has two rows of seats, and the cable cars in between have one row of seats. To express it differently, odd-numbered cable cars have two rows of seats and even-numbered cable cars have one row of seats, while the distance between all seat rows is always equal and all cable cars have the same length. The reasons for the particular cable car length are twofold:

(1) Cable car length of one seat pitch length appeared too short and of two seat pitch length too long. Cable car length determines cargo container width, and the smaller width container (based on one seat pitch distance) would not adequately accommodate the larger suitcases. The larger width container (based on two seat pitch distance) made it unwieldy and inconvenient for passengers to deposit and pick up their baggage. That is, the average passenger cannot easily reach across the large baggage container (based on two seat pitch length) and deposit or retrieve his luggage. The ideal width baggage container, which appears to be based on a 1.5 seat pitch passenger car, will allow the passenger to reach over and pick up his baggage by standing alongside the baggage container without undue stretching or having to walk in the container and over other luggage.

(2) This second point has to do with the use of a mixed cargo-passenger payload where there is a joining of passenger cable car with cargo container cable car as shown in FIG. 9.

Each cargo container car is equal in length to two passenger cable cars. This means that each cargo container car can be substituted for a two row seat cable car plus a one row seat cable car and vice versa. The cargo container cars, when attached to the rear of the cable train, should always be attached to the passenger cable car with only one row of seats. If this is done, passengers in the last cable car will have ample foot room. If the cargo container cars 180 are attached to the passenger cable cars with two rows of seats, then there will not be enough room between the container unit and the adjacent last row of seats for the passengers' feet, so that row of seats is lost. Also, if all the passenger cable cars were the length of one row of seats or of two rows of seats, there would not be enough passenger foot room to utilize the last row of seats adjacent to the cargo container. The revenue loss of six passenger seats in any mixed passenger-cargo train can be a significant revenue loss over the life of the aircraft.

6. The Tail End of the Cable Train

The cable train requires a rear ramp door, and this must be a relatively large door and takes up about 20 percent of the fuselage length. In most rear ramp door aircraft, this space above the rear ramp door is not generally utilized or is unutilizable. The cable train concept makes this end of fuselage space utilizable, and part of this invention is to design the tail end of the cable train to utilize the space above the rear ramp door.

FIGS. 2b, 7, 8, 9, 62 and 63 illustrate the tail end of the cable train. The transition car 30 starts right at the ramp door hinge line and has two rows of seats, or the same as one-half of the other passenger cable cars. It differs from the other cars in that:

(a) It has limited baggage area due to the curving up of the ramp door, and this baggage area 30a, FIGS. 62 and 63, does not slide out but is simply a 'tunnel' area beneath the passenger seats.

(b) The transition car has built-in steps 30b all the way across the width of the transition car. These steps serve as footrests for the rear rows of passengers during flight and as interior aisle steps for rear boarding and departing the train via the interior aisle. This is an alternate or added method of boarding and departing in addition to the side boarding and departing methods previously described. This aisle departure, with the use of the transition car steps, would be one other important exit when the train is not extended out of the fuselage.

(c) The transition car also has a separate variable length connecting rod actuator 287, FIGS. 62 and 63, in order to keep the passenger seats level when the ramp door drops and the transition car floor tilts downwardly. The actuator may be manually operated or operated automatically based on gravity leveling principle.

The final car 29 is designed to utilize the remaining narrowing depth of the fuselage and provides for the continuation of the interior aisle. It has containers on each side of the aisle to fit the available space, and each of the side containers is divided into two compartments. The larger compartment 29c has a built-in curved back seat 29e and is designed for baggage or passengers, as needed. This seat is not tiltable but has a curved back, plus pillows 29f, which enables the passenger to adjust to the varying tilt of the fuselage with a reasonable degree of comfort. It might be considered a child's seat. It has an inside access door 29d and outside window in the compartment 29g that lines up with the rearmost window of the fuselage 6 to allow the passenger to look out.

The rearmost compartment is for baggage only as shown at 29a. The integral toes 182 fold over the top of this rearmost baggage compartment, FIG. 63.

The rear baggage or passenger car 29 has four wheels for stability, identical to the lead car. It is attached to the transition car 30 via a transition - car - to - rear - car connecting ramp 292, which also serves as a footrest and access walk to that last row of passenger seats on the transition car.

Also, the rearmost car 29 plus the car 30 is substitutable for a larger tail end or cable train rear cargo container 181 to utilize the space above the rear ramp door, as shown in FIG. 9.

7. The Upper Deck Seats

A further innovation for more efficient space utilization is to utilize the front end of the rotor stowage tube for upper deck passenger seats 25 as shown in FIGS. 2b and 3a. This front part of the stowage tube becomes part of the pressurized cabin and is separated from the rest of the stowage tube by the bulkhead 20 which contains a stowage tube bulkhead hatch 79, which allows access to the stowage tube. Another hatch 80 on the roof of the upper deck passenger compartment allows access to the top of the aircraft. This upper deck hatch 80 is useful to gain access to the exposed part of the rotor for inspection, maintenance, and for securing or tying down the rotor blades in the fore-aft position while the aircraft sits on the ground. The hatch 80 is also another emergency hatch for upper deck passengers who could leave the aircraft by running down the sloping nose of the aircraft and jumping to the ground. The top hatch could also be used as an exit when the taillifter aircraft lands in water. Access to the upper deck passenger compartment is via stairs 26 as shown in FIGS. 2b and 3a.

The size of the rotor stowage tube is such that it allows just about the same passenger head room, or slightly more, than the main, lower passenger compartment. The stowage tube width allows for about one less seat than the main lower passenger compartment. Therefore, as shown in FIG. 3a, the upper deck has four regular passenger seats compared with five regular seats below. The upper deck has no fold-away aisle seats as does the main deck. Since the upper seats are not on the cable train, the aisle is needed. The upper deck has an off-center aisle with three seats on one side of the aisle and one seat on the other side of the aisle. This arrangement allows the steps to the upper compartment 26 to be off center from the lower aisle so that these steps do not block the lower aisle as shown in FIG. 3b.

The upper deck passengers would board through the forward door 9, as would the crew, and space in this general area would be provided for carry-on luggage. If there were a need for a first-class passenger area, the upper deck passenger compartment might qualify, having slightly more head room, an aisle always open, close to the lavatory 78, and close to the attendant's seat 27, FIGS. 26 and 36, and being a small 'exclusive' compartment, with a separate 'exclusive' entrance. This small upper deck passenger compartment may be especially useful when the entire lower deck is given over to carrying cargo. The upper deck seats tilt, as do the lower deck seats.

8. PRECISION LANDING SYSTEM

Part of the payload handling system is the precision landing system, and it is unique to the tail-lifter concept. This system is shown in FIGS. 1, 2a, 2b, 3a, 7, 8 and 64. Its components consist of an aircraft arrester cable hook 15 near the nose of the aircraft, and on the ground there is a coacting arrester cable 13 which is anchored to the ground at each end of the cable, FIGS. 1, 2 and 3a. This double-anchored cable is held up off the ground by twin flexible cable support holders 14.

As the aircraft comes in for a landing, the nose of the aircraft is kept a few feet off the ground and slides over the horizontally suspended cable until the aircraft nose hook 15 catches on to the cable and pulls the cable taut. Once the nose hook is engaged, and the fuselage has been tilted about 60° to 70° downward, directional control is actually accomplished with the rotor cyclic pitch control by pulling the tail of the aircraft to the left or right, while the nose of the aircraft is anchored in one spot. As the aircraft fuselage is tilted over in the horizontal position, the pilot lets the aircraft nose touch the ground so that the tail of the aircraft is immediately in front of the airport terminal passenger building 87, FIG. 8. This building is a low-ceiling, single-story building to allow for ample clearance between the rotor and the building. There will be increased ground effect lift beneath that portion of the rotor disc directly above the single story building.

Details of the hook 15 are shown in FIG. 64. Just prior to landing, the cable 15 is extended via the cable hook actuator unit 15a. This cable hook has a cable safety latch 15b to keep the cable from accidentally sliding off the hook, once the cable is engaged. The latch 15b is automatically positioned by mechanical linkage that engages the safety latch when the hook 15 is extended and removes the safety latch when the hook is retracted. In take-off, when the fuselage is tilted to the vertical position, the cable hook is retracted, which tilts the hook unit downwardly and automatically releases the safety catch and allows the cable to slip off the hook so the aircraft can ascend vertically.

The major advantage of this cable hook system is that the aircraft can land where it is needed, directly in front of the passenger terminal building. The aircraft, being restrained by the arrester cable, can land within feet of any building or obstruction without danger of pilot error or wind gust causing the aircraft to collide or crash into the building or obstruction. This eliminates the need for taxiing or otherwise moving the aircraft, on the ground in normal use. This saves time, fuel, ground-handling personnel, and equipment, and eliminates the need to put landing gear wheels on the aircraft, and allows the fuselage to sit low, directly on the ground, which facilitates loading and unloading through the rear ramp door, and also puts the emergency exit doors close to the ground for quick, simple emergency evacuation. The cable hook can also be used for transporting external payloads on rotor flight over short distances.

In lieu of wheels or other landing gear on the aircraft, ground stability is provided by the retractable on-ground fuselage stabilizer 10. It is shown in the extended position 10b in FIGS. 1 and 2a and in the retracted position 10a in FIG. 3a.

9. SUMMARY OF PAYLOAD HANDLING SYSTEM

The VTOL payload system of the present invention provides for the highest possible passenger density based on:

1. The elimination of stand-up, walk-around head room.
2. The part-time elimination of interior aisles and the substitution of fold-away passenger seats for the aisle.
3. The utilization of space above the tail ramp door for passengers and baggage.
4. The utilization of the forward part of the rotor stowage tube for passengers.

The VTOL payload system provides for the maximum number of payload options including:

1. Maximum passenger density for short-haul, as described in the foregoing paragraph.
2. Reducing passenger capacity by prohibiting fold-away seat use, and keeping aisle open, and trading off reduced passenger weight for greater fuel weight for longer range flights.
3. Quick change, back and forth, for any combination of passengers and cargo by attaching cargo roll-out container car units to the passenger cable car units.

4. The use of an all-cargo container cable train unit in the lower level, with the small passenger compartment in the upper deck.

5. The removal of the entire cable train, to accommodate extra large or extra long cargo directly in the fuselage and thereby eliminate the weight of the cable train.

6. The use of the tail-lifter for rotor flight only, for lifting and transporting external loads, via cable, that are too large to fit in the fuselage.

7. The coordinated use of several tail-lifter aircraft for external lifting of objects too heavy for a single tail-lifter aircraft.

8. The use of the tail-lifter for scheduled city-center-to-city-center use for passenger and/or cargo, using the specially designed city center ports, as described.

9. The use of the tail-lifter for special excursions, vacations, or business, passenger or cargo, to areas that may be remote and have no special port or terminal and no special ground handling facilities.

The present VTOL payload system eliminates all need for baggage checking which provides great cost saving to the tail-lifter VTOL airline, and great time saving, both checking and retrieving, to the passenger.

The combination of the precision landing system, and the roll-in roll-out cable train with no baggage check substantially reduces the on-ground time of the aircraft, which substantially increases the productivity of the aircraft and greatly reduces terminal facility requirements with reduction of both direct and indirect operating cost.

THE LIFT, PROPULSION AND CONTROL SYSTEM

1. The Engine Suction Intake System

The present VTOL system includes: (1) An integral suction pump for sucked skin laminar flow control while on fixed wing flight; (2) A method to cool hot parts of the rotor units inside the stowage tube; (3) A method to suppress engine fan-compressor inlet noise. Part of this invention includes a modification of the prime propulsion low by-pass engines so as to meet the three above requirements. These multiple requirements are met in the following manner:

The by-pass air and the jet engine air enter through separate inlets and remain separated until final expulsion from the rotor blade. FIG. 13a is an enlarged top view near the leading edge of the fixed wing root showing the various engine air inlets. Numeral 16 is the non-by-pass or combustion engine air intake. There are four by-pass air inlets. Numeral 17 designates controllable vanes allowing ambiant by-pass air to enter from the underside of the leading edge of the wing root. Controllable rotary valve 70 connects the by-pass intake with the wing vacuum chamber used for sucked surface laminar flow control on fixed-wing flight. Numeral 71 designates a controllable valve connecting the by-pass intake with the rotor stowage tube. Automatic valve 92 opens only when the rotor is retracted and sucks air through the rotor by-pass duct system for cooling and drag reduction.

For drag reduction, air is sucked through lateral or crosswise slots at the folded rotor blade tips. FIG. 52 illustrates these blade tip slots with blades folded. These slots are to aid in maintaining laminar flow as slipstream air passes over the exposed blade tips. The blade tip suction slots are part of the overall suction laminar flow system for fixed-wing flight. The sucked air provides interior cooling of hot gas parts of the folded retracted rotor as air passes through the rotor to the by-pass engine inlet. The tip slots also have other purposes during rotor flight that will be explained in a later section. FIG. 13a shows that the by-pass air from the automatic valve 92 must pass through external suction duct 84, and then through valve 70 to enter the by-pass engine fan. FIG. 13b shows a sectional view through the stowage tube wall of the retracted by-pass duct 56 that has forced open the split gas seal valve 92a, allowing sucked air to pass through and out to the external suction duct 84, and in through rotary valve 70. FIG. 13c is a similar view but with the rotor extended, and the automatic split gas seal valve in the closed position 92b.

Referring again to FIG. 13a, for take-off, valve 70, which is connected to the wing vacuum chamber, and valve 17, which is connected with ambiant under-wing outside air, are closed; and valve 71, connected to the rotor stowage tube, is open. On takeoff, engine combustion air enters through non-by-pass engine air intake 16 and by-pass air is drawn through the rear stowage tube opening, which serves to cool the outside of all hot rotor components in the stowage tube, and also cools the outside of the rotor mast at the entrance of the stowage tube. This arrangement also suppresses engine inlet noise sources. Since the engine is buried deep in the wing roots, and since the by-pass entrance air is far removed from the fan blades, sound suppressing barrier material can surround the blade tip noise source in order to reduce noise escaping from the engine fan-compressor.

A conventional jet engine mounted in a conventional jet engine nacelle does not lend itself to this degree of fan or compressor noise suppression.

It should be noted again that the engine combustion air and the by-pass air are completely separate flows even before they enter the aircraft. This flow separation is maintained by mid-blade bands 104a and mid-stator bands 104b that separate by-pass flow and jet engine combustion air flow. These stationary 104b and rotating 104a bands have extremely close tolerance between them to minimize mixing of the by-pass air with jet engine air. This 'up-front' flow separation allows the by-pass portion of the jet engine to act as a suction pump; and, therefore, no separate suction pump is required.

Figure 15A:
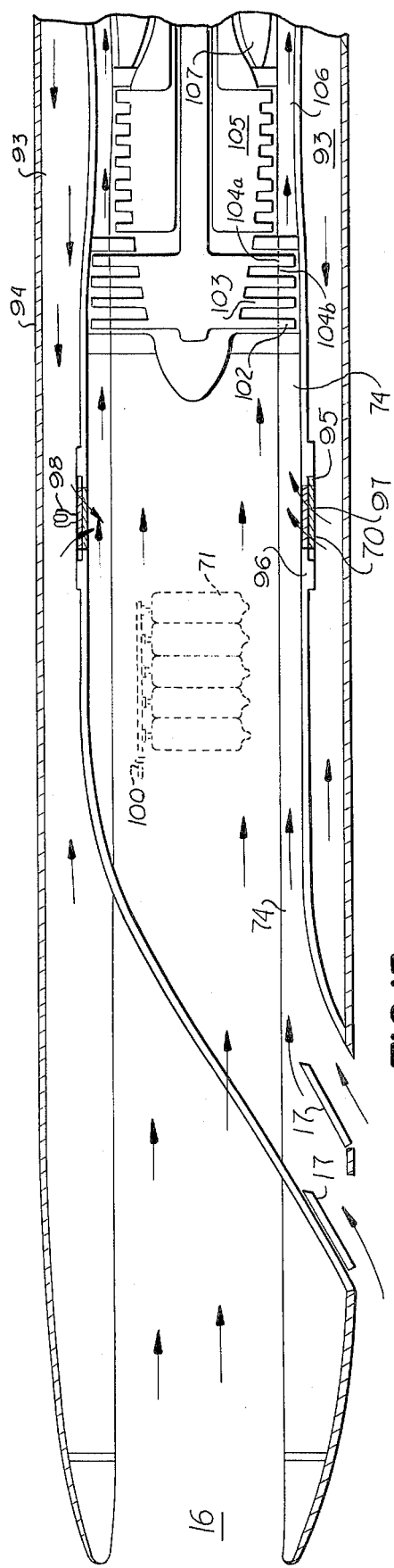
FIG. 15a is a side view of FIG. 13a showing the front end of the engine and engine intake components, with the separation of the hot gas and by-pass intakes, and special components of the turbo-fan suction surface system.

FIG. 15a is a side view of FIG. 13a showing the three major by-pass inlet valve units 17, 71 and 70, and also showing the jet engine combustion air inlet 16.

2. THE ENGINE EXIT DUCTS, DIVERTER VALVES, AND ROTOR RETRACTION SYSTEM

Figure 15B:
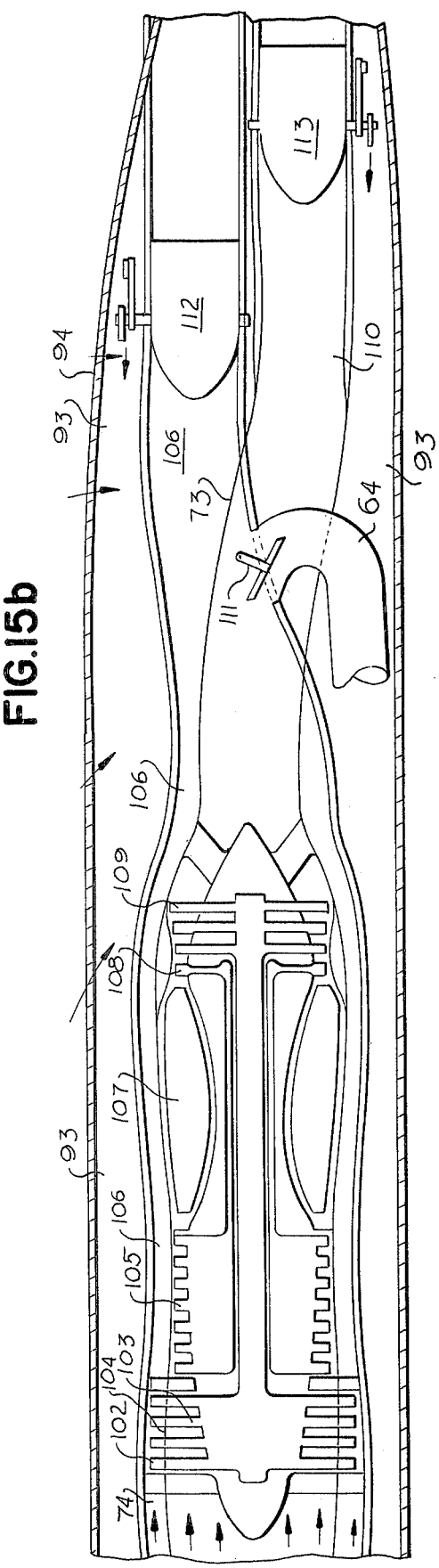
FIG. 15b is a rearward extension of FIG. 15a, but still a side view and overlapping FIG. 15a, showing the entire low by-pass ratio engine and engine outlet components separating the hot gas and by-pass air.

FIG. 15b is a side view of the entire by-pass jet engine showing the duct system attached to the rear of the engine. The peripheral outer concentric by-pass duct 106 is maneuvered up, around, and over the center hot gas duct 110 to form a separate top by-pass duct, while the hot gas duct is bent slightly downwardly, directly beneath the by-pass duct. Both ducts are shown with center blocking diverter valves for diverting flow for rotor flight, valve 112 for by-pass air, and valve 113 for the hot gas. Upstream of the by-pass blocking valve 112 is a smaller by-pass bleed-off duct 64 with its control valve 111. This duct leads to the wing tip to provide jet thrusters for rotor directional control, FIGS. 3a, 4a, 4b, and 5 and 6. Details of the operation and uses of this diverted-by-pass duct 64 and valve 111 will be further discussed.

Figure 16:
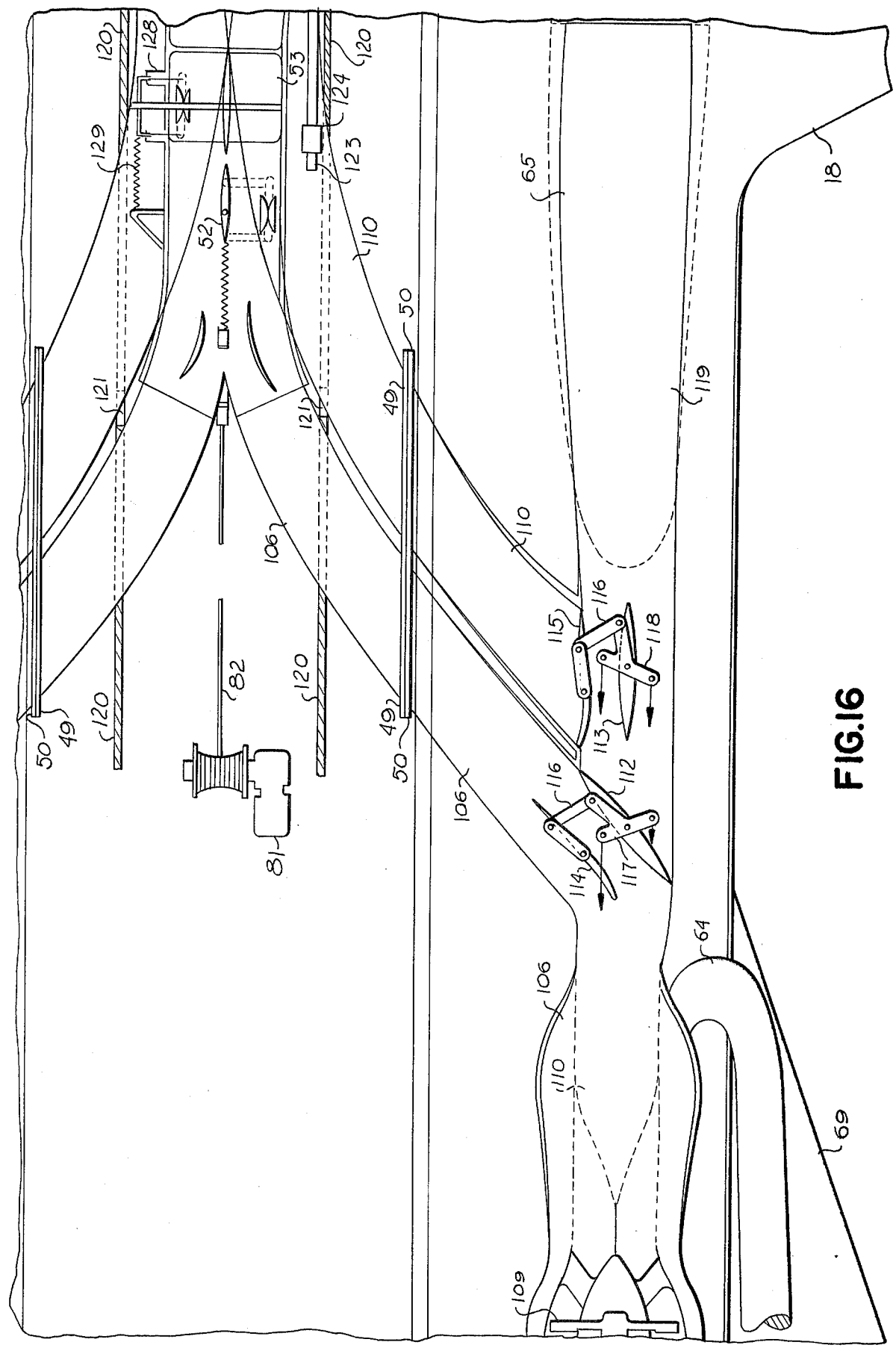
FIG. 16 is a further rearward extension of FIG. 15b but viewed from the top, showing hot and by-pass diverter valves to rotor unit, with the rotor extended to receive the hot and by-pass air.

FIG. 16 is a top view showing the rear end of the jet engine, the remainder of the stationary duct system attached to the jet engine, and the forward portion of the retractable rotor system, with collective pitch control valves. FIG. 16 shows a top view of the valves 112 and 113 shown in FIG. 15b. Valve 112 is connected with valve 114; and valve 113 is connected with valve 115 via diverter valve connecting rod synchronizers 116 so that each set of valves move together. The by-pas valve units 112 and 114 are shown in the diverted position, which is required for rotor flight; and the hot gas valve units 113 and 115 are shown in the 'straight-through' position, which is required for fixed-wing flight.

Valves 112 and 113 are rounded on the upstream end, as shown in FIGS. 15b and 17b. This reduces internal drag during fixed-wing flight. FIG. 18a illustrates that the outer sides of the by-pass and hot gas ducts 106 and 110 are rounded to conform to the rounded upstream shape of the valves to form a tight seal between the valve and duct wall when the valves are closed.

Valves 114 and 115 serve to seal the duct wall when in the straight-through position while flying on the fixed wing; and serve as turning vanes for the gas flows while on rotor flight, as shown in FIG. 16.

The hot gas duct 110 and by-pass duct 106 continue on through the stowage tube wall as shown in FIGS. 16 and 18a, and the mating ducts of the extended rotor are joined and sealed when the movable half of rotor gas coupling 49 slides in place against the stationary half of the rotor gas coupling 50.

Referring to FIGS. 17a, 18a, 16 and 19, the rotor unit rolls in and out the stowage tube on upper and lower wheels 121 which are attached to the main load carrying support unit 132. These wheels roll on upper and lower tracks 120, and when fully extended, the rotor is anchored in place as the main rotor anchor hook 123 engages the main rotor anchor hook receiver 124. This system lends itself to quick and easy emergency jetison of the rotor unit, in case of catastrophic blade failure, by explosively detaching the main hook receiver 124. If need be, the wheels and track units could be placed on each side of the stowage tube instead of on the top and bottom of the stowage tube.

Looking at FIGS. 16 and 3a, the winch 81 which is actually placed in the extreme forward end of the stowage tube (although not shown in that position in FIG. 16) serves to retract the rotor unit into the stowage tube via cable 82. A more complicated push-pull endless cable system is not used. Since there is a continuous rearward drag on the exposed blade tip, there is never any requirement to 'push' the rotor unit out of the stowage tube as blade tip drag during flight will always do that. There is only need to pull the rotor in for fixed-wing flight; therefore, a simple winch will suffice.

3. ROTOR FLIGHT CONTROL VALVES

The cyclic pitch control valves 52 and 53, FIGS. 16, 17a, 18a, 18b, are essentially the same as described in U.S. Pat. No. 3,762,667. That is, their function is to divide the by-pass air into four parts for four ducts, and vary the air flow in each of the four ducts for cyclic control. Valve 52 is for rotor pitch control which directs the air into either the right two ducts or the left two ducts; and valve 53 directs the air into either the top two ducts or the bottom two ducts for lateral rotor control. Note that the cyclic control linkages are 'rotated' or offset 90° to compensate for gyroscopic precession. That is, the left-right 'lateral valve' is actually for forward-back tilt pitch control; and the 'up-down' valve is actually for left-right or lateral control.

Figure 19:
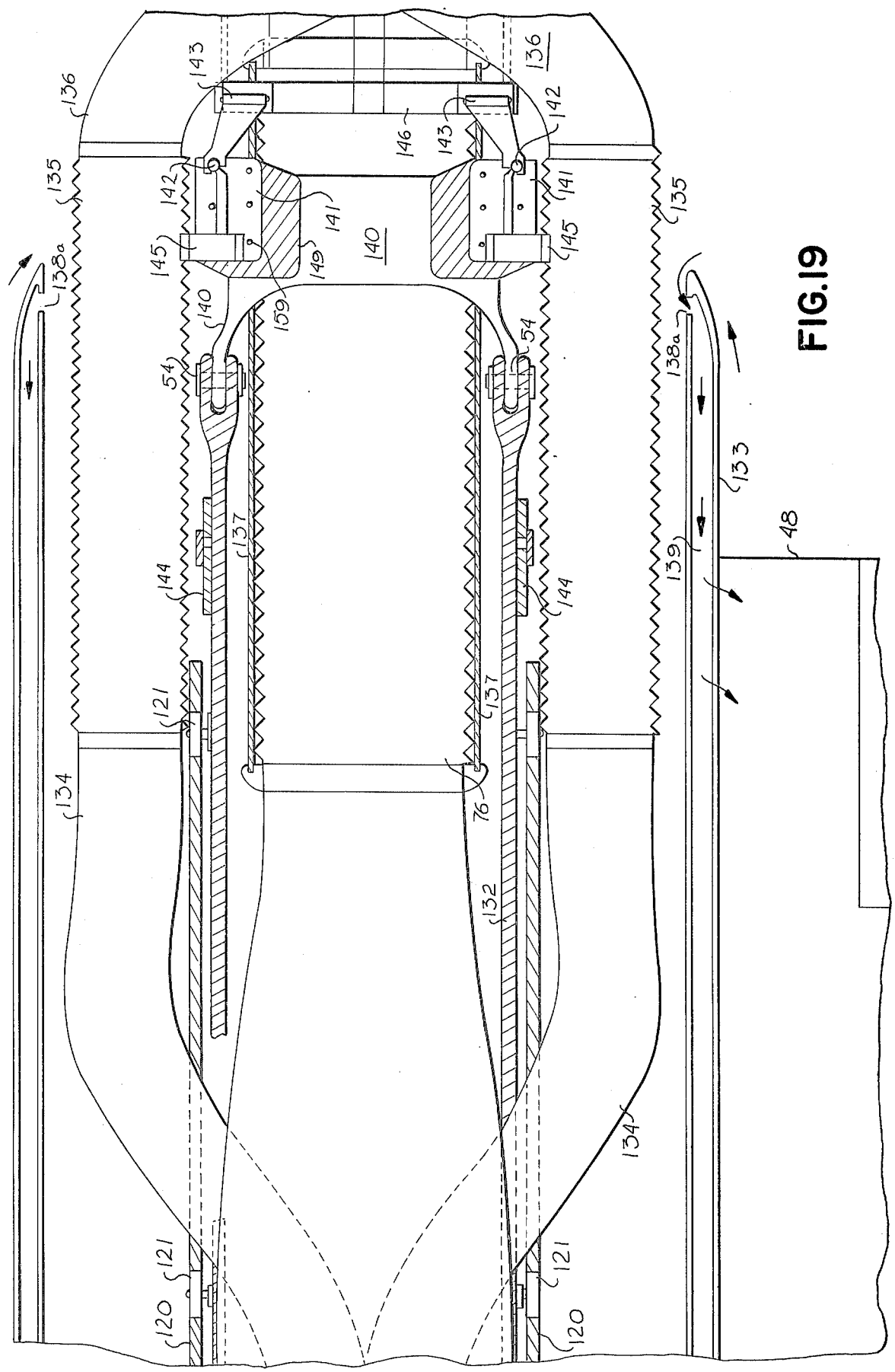
FIG. 19 is a top view of the rotor mast at the 90° tilt joint showing the hot and by-pass air flexible ducts and also showing the flexible mast elastomer mount units.

FIGS. 19 and 23 show how the four by-pass circular control ducts 136 converge into a four-quadrant concentric by-pass duct 160 on the non-rotating part of the rotor mast surrounding the center hot gas duct 110. This non-rotating four-quadrant duct, FIG. 23, is mated with an identically sized rotating concentric outer by-pass duct, FIG. 25b. The rotating portion of the concentric by-pass duct is divided into halves instead of quarters. The halved concentric by-pass ducts are shown at 177a and 177b. The center hot gas duct is likewise split into halves and shown at 176a and 176b. These are gas seals between the inner and outer walls of the concentric by-pass ducts at the interface between the rotating and non-rotating portion of the rotor mast and are represented at 174, FIG. 25a. FIG. 25b is a cross section of FIG. 25a.

The two half-round hot gas ducts 176a and 176b and the two half-round concentric by-pass ducts 177a and 177b, FIG. 25b, are gradually shaped or contoured back to circular ducts with one hot gas duct and one by-pass duct going to each blade. This component is referred to as the rotor mast to rotor head transforming duct 168a (for hot gas) and 168b (for by-pass), FIGS. 25a and 26. This component is held in place by ring 172. The blade root flexible ducts 58 and 59 are mounted on top of this component 168 as represented in FIG. 27a.

With this system, the pilot, by operating the cyclic control valves 52 and 53, can direct varying quantities of by-pass air into the chosen concentric by-pass air quadrants, and hence direct by-pass air to blades according to the blades' azimuth position. That is, the pilot can increase or decrease by-pass air to blades advancing on the right side, or retreating on the left side, or in the fore or aft position for varying effective blade pitch according to the position of the rotor blade for cyclic pitch control.

In the previous configuration of U.S. Pat. No. 3,762,667, the cyclic control valves were stationary; in this invention, the cyclic valves slide back and forth in the stowage tube with the rotor mast. This new arrangement requires some connect-disconnect fitting for operating the two cyclic control valves 52 and 53. These connect-disconnect fittings are shown in FIGS. 16, 17a, 18a and 18b. As the rotor mast is extended, the movable cyclic control female engaging coupling 130a (for pitch control valve) and 130b (for lateral control valve) is engaged to and coacts with the fixed cyclic control male matching coupling 131a (for pitch control valve) and 131b (for lateral control valve) to link the pilot's controls to the cyclic control valves.

Springs 129 keep valves 52 and 53 centered for proper engagement. Appropriate pulleys, cables and linkages 125, 126, 127 and 128 are shown in FIGS. 16, 17a, 18a and 18b to facilitate cyclic control operation.

Collective pitch control is accomplished by changing the overall by-pass air volume and pressure to the rotor. This can be done by:

(1) Changing the entire jet engine throttle setting.

(2) Changing the setting of center blocking-diverter valve for by-pass air 112 so that part of the by-pass air escapes out of the fixed-wing flight tail pipe 65, FIG. 16.

(3) Change the setting of the by-pass bleed-off valve 111 that leads to the wing tip ducts for rotor directional control, FIG. 15b.

Changing the jet engine throttle is not practical as there is too great a lag time between throttle change and change in by-pass flow. The reaction time would be far too slow for effective collective pitch control. Also, throttle change would also effect hot gas flow and have adverse effect on rotor RPM and coning angle.

Referring to FIG. 16, the blocking valve 112 approach does not appear to be practical either. For safety, the blocking-diverter valve is designed so that if the valve is open, air flow will tend to keep it open by having greater blade area downstream of the pivot axis than upstream of the pivot in order to prevent accidental closing of the valve. When the pair of valves 112 and 114 are forced closed for rotor flight, air flow will tend to keep the pair of valves closed. Once valve 112 is closed, the side diverter valve 114 is forced in the slipstream, thereby removing air flow dynamic pressure on the downstream side of valve 112, and this factor combined with greater air flow pressure on the upstream side of valve 114, which is connected to valve 112, will tend to hold the closed diverter valve 112 in the closed position which in turn will prevent accidental opening of the diverter valve.

Therefore, diverter-blocking valve 112 is best designed to operate in either fully open or fully closed position for safety purposes, and it would be difficult to adapt the blocking-diverter valve 112 to make the small increments in change of by-pass flow that would be required for effective collective pitch control.

The best alternative appears to use valve 111, FIG. 15b, for collective pitch control. This valve 111 bleeds off by-pass air from the rotor blades to the wing tip ducts 64 for rotor directional control.

Obviously, there would be some relation between collective pitch control and rotor directional control, and the critical question is: can the pilot vary rotor collective pitch control without adversely affecting rotor flight directional control; and, conversely, can the pilot vary rotor flight directional control without adversely affecting collective pitch control? To answer this question, one must first analyze specifically how rotor flight directional control works.

Valve 111 does not control rotor flight directional control directly, but it does regulate the quantity of by-pass air flow to the wing tip rotor directional control valves 63. There is one valve in each wing tip. These valves 63, and their method of operation, are shown in FIGS. 3a, 4a, 4b, 5 and 6. In 'neutral', when there is no directional control turning, valve 63 is in position as in FIG. 4a, and there is equal amount of jet thrust out of the top and bottom of the wing tip winglets, FIGS. 5 and 6, so that net turning thrust or torque on the fuselage longitudinal axis is zero. When directional turning is required, valves 64 are in position as shown in FIG. 4b, and the two valves 64, one in each wing tip, are designed to form a couple for turning the aircraft fuselage. This system is designed so that aircraft rotor directional control can be accomplished with either engine, so it will work with one engine out.

The strength of directional control thrust requirements is determined by the intensity of wind gust and cross winds; and the variation of the strength of this directional control thrust can be regulated by:

(1) The degree to which valve 63, FIG. 4b, is turned.

(2) The degree to which valve 111 is opened, FIG. 15b. Therefore, there are two methods to control the strength or force of the directional control turning action.

Returning to collective pitch control via use of valve 111, when directional control valves 63 are in neutral, changing valve 111 position to change collective pitch control will not effect directional control in any way; but, if directional control valve 63 is moved from neutral to directionally turn the aircraft, then any change in valve 111 to change collective path will alter the by-pass flow to the wing tips, and therefore change the force of the directional control. However, the pilot can simultaneously increase or decrease the turning angle of valve 63 as needed to compensate for the increase or decrease of valve 111 that the pilot uses to regulate collective pitch control. With practice, the simultaneous manipulation of these two sets of valves could become more-or-less instinctive (as has been proven to be the case in pilot's instinctive feed back control of cyclic pitch to compensate for inherent rotor instability). For this system to work, the by-pass flow to the wing tips must be continuous. Intermittent or sudden on-off flows of by-pass air to the wing tips would obviously complicate the coordination problem of collective pitch control and rotor directional control.

This tail-lifter aircraft would appear to require a minimum of directional control force. There is no rotor torque to counteract, and the symmetry of the aircraft around the vertical fuselage directional change axis should eliminate any weather-cocking effect, and will minimize directional control force requirements. As long as the wind force blows equally on each wing of the aircraft, there would be no twisting or turning moment to counteract. The principal directional force to counteract would be from wind gusts that happen to be stronger on one wing than on the other wing. In times of high winds and when gusts may be uneven on the opposed wings, and extra directional control thrust is needed, jet engine throttle settings could be increased to assure an adequate supply of by-pass air for both rotor directional control and collective pitch control.

Also, precise directional orientation of the fuselage is not essential during the process of engaging the nose ground hook; and once the nose ground hook is engaged and the fuselage is tilted over, and there is a strong rotor downwash force on top of the wing, any upsetting wind gust force on the wings would tend to be nullified by this strong, balanced, downwash force on top of the wing. Also, once the nose ground hook is engaged, and the fuselage has been tilted, directional control is actually accomplished with the cyclic pitch rotor by pulling the tail to the left or right while the nose is anchored in one spot, thereby minimizing wing tip jet directional control requirements.

The small force requirements for directional control should also minimize the noise problem from the wing tip directional control jets. Also, with the directional control valve in neutral, the air flow would be equally divided between the top and bottom winglet jet nozzles, and therefore the flow through each nozzle would be relatively slow, and relatively quiet. Only during directional turning, when most of the wing tip by-pass air is forced through one or the other fixed area winglet nozzles, would nozzle velocity and noise increase, so the rotor directional control noise problem would be intermittent, and the intensity and frequency of this noise source would vary with the intensity and frequency of wind gust that would adversely affect directional control on take-off and landing.

The manner in which changes in by-pass flow actually changes the collective and cyclic pitch of the blades will be further described.

3a. ALTERNATE ROTOR CONTROLS

An alternate rotor directional control method is illustrated in FIGS. 72 and 73. This method utilizes the suction system that is already installed for the suction surface laminar flow control instead of by by-pass air pressure, and eliminates the possible conflicting demands of by-pass air for both rotor directional control and collective pitch control, as previously described.

The concept of this alternate rotor directional control method is to use top and bottom flap surfaces 325a and 325b, FIG. 72, near the leading edge of the wing tip in combination with controllable suction air in order to deflect rotor downwash over the wing tip leading edge in order to achieve rotor directional control. FIG. 72a is a sectional view of this rotor directional control system in the closed position for fixed-wing flight. FIG. 72b is a similar sectional view in the open, neutral position for rotor flight with each flap in the half-open position. FIG. 72c is a similar sectional view, but with rotor directional control in the turning position with the top flap fully open and the bottom flap fully closed for maximum rotor directional turning.

The top flap 325a is opened via top screw actuator motor drive 329a which simultaneously opens the bottom flap 325b via synchronizer flexible shaft 329c which is connected to the bottom driven screw actuator 329b. These actuators 329a and 329b are connected to the flaps via flap control arms 326a and 326b. When these flaps are opened, variable width suction slots 330a and 330b are automatically opened and uncovered via slot opening control arms 331a and 331b, which are activated by the flap control arms 326a and 326b and connected to the variable suction intake seals for directional control flaps 343a and 343b.

The variable width suction slots 330a and 330b are connected to a suction chamber 332, FIGS. 72 and 73, that is separated from the main wing suction chamber 93 via partition 333 with seals around control arms 331.

This alternate rotor directional control system is operated from the pilot's compartment via cables 328 which are connected to the directional flap pivot control crank 327, which activates the flaps 325a and 325b via the two screw actuators 329a and 329b.

This rotor directional control flap system operates on the same principle as ailerons. That is, when the top flap is open on one wing, the bottom flap is open on the other wing, forming a couple to twist or turn the fuselage in the desired direction. It is also designed so that if the flaps are inoperative on one wing, or if the suction system is out on one wing, the flaps on the other wing can provide rotor directional control.

This concept, which uses a mechanical flap in conjunction with a suction slot in a similar configuration, has been tried experimentally in wind tunnels and has been found to be more effective in diverting slipstream with less flow separation and less turbulence than mechanical flaps used alone, or suction slots used alone. What is new and novel about this system is: (a) the concept of using upper and lower flaps and adapting them for rotor directional control with its design for reverse slipstream direction over the wing; (b) its automatic variation of the suction slot width with the opening and closing of the flaps; and (c) the mechanism for opening and closing these flaps and also the mechanism for operating these flaps.

A key feature of this alternate rotor directional control system is that the wider a flap is open, the wider the suction slots are opened under the flaps; and when a flap is closed, the suction slot under the flap is closed by its variable suction intake seal 343. This feature is an aid in regulating rotor directional control force and also keeps the suction slots from creating a suction seal between flap and wing, thereby causing difficulty in the initial opening of the flaps.

Another feature of this alternate directional rotor control system is that the upper flap 325a has a porous surface so that the flap is part of the fixed wing flight upper surface suction laminar flow control system. In order to accomplish this, the upper flap control arm 326a is actually a rigid hollow duct through which suction air is drawn through the porous surface of the flap. This hollow upper flap control arm 326a as well as the lower flap control arm 326b are both segments of a circle that pivots on the flap hinge axis so that seals can be formed between the flap control arms and the holes in the wing through which the control arms pass.

A second alternate rotor directional control system would be to use one-piece or slab-type wing tips where each entire wing tip pivots and is linked so opposed wing tips pivot in opposite directions (not shown in the drawings). These pivotable wing tips would serve both as ailerons and for rotor directional control. Since the wing tips would be designed to pivot on a more-or-less center of cord axis, they would be reasonably effective in deflecting slipstream air from either direction, which would make them suitable for ailerons and for rotor flight directional control by rotor downwash deflection. These slab-type wing tips would be more-or-less mass balanced and aerodynamically balanced around the pivoting axis, and could be spring-loaded in the neutral position so as to automatically return to neutral position after being deflected by pilot's control and would be stable in the neutral position while in fixed-wing flight and also in reverse downwash flow in rotor flight.

Conventional ailerons could be used as a third alternate or emergency or back-up rotor flight directional control system, but with considerably less effectiveness in deflective rotor downwash than the slab-type movable wing tips.

If it feasible that the reverse flow of rotor downwash over the aircraft's rudders and elevators could also substitute for cyclic pitch control. Downwash over the elevators would tilt the aircraft tail fore and aft; and twin rudders on the tips of the tail plane would tilt the tail laterally. These tail surfaces must be positioned to be symmetrical beneath the rotor as shown in FIG. 10. These tail movements would in turn tilt the rotor mast in the opposite direction, and hence tilt the rotor disc and substitute for other cyclic pitch control methods.

4. THE COCKPIT

The cockpit in this invention is similar to the cockpit described in the previous VTOL U.S. Pat. No. 3,762,667 and therefore needs no detailed explanation.

The cockpit is shown in side view in FIG. 64 and top view in FIG. 65. Basically, the cockpit has dual control 296 for fixed-wing flight and windshield 11 for fixed-wing flight, and also dual control 297 and windshield 12 for rotor flight.

The controls for fixed-wing flight are in the conventional location. For rotor flight, the fuselage is in a more-or-less vertical position and is pulled rearwardly by the rotor, so the pilot faces rearwardly, looking through the windshield on the underside of the cockpit. Rotor flight controls are appropriately located for flying in this position.

Both the pilot's and co-pilot's seats 294a and 294b are designed to quickly rotate and pivot so that both pilot and co-pilot can quickly shift back and forth from fixed-wing flight controls to rotor flight controls, FIG. 64.

Just before start-up and 'tilt-up', one or both pilots would be at the rotor flight controls, which means they would be facing downward when the fuselage is horizontal on the ground. This means that for the few moments before 'tilt-up', the pilots at the rotor flight controls would be held in their seats by their seat belts and shoulder harnesses. In effect, the pilots would be hanging from their shoulder harnesses. This means that the shoulder harnesses should be of an elaborate design for the comfort of the pilots.

During transition to and from rotor flight, one pilot would be at the rotor flight controls while the other pilot would be at the fixed-wing flight controls.

5. THE ROTOR MAST

The rotor mast has some flexibility in any direction (up to 10–15 degrees) and tilts a full 90 degrees on a lateral hinge axis on take-off and landing. The rotor mast is illustrated in FIGS. 19, 20a, 20b, 21, 22, 24, 25a and 26. Its major components are: the elastomeric shock-absorbing rotor mast mounts 141; the parking rotor mast latch 47; the main rotor mast tilt hinge 54; rotor mast tilt hinge hydraulic dampers 147a; and the flexible duct units 76, 135, 58 and 59.

There are four elastomeric mounts 141 spaced more-or-less 90 degrees apart, FIGS. 19, 20a, 21 and 22, with the inside of each elastomer bonded to lower tilting main mast 140 and the outside of each elastomer bonded to a plate 141 on which is attached a ball joint 142 which receives a hinge connector 143 which is attached to the lower 'unsprung' non-rotating portion of the rotor mast 146. Embedded in the elastomer 149 are cables 158 connecting the inner plate 140 to the outer plate 141 with cable anchor ends 159.

When the rotor lifts the aircraft, the outer plates 141 of the elastomer mounts are pulled upwardly, putting the elastomer in shear and putting the embedded cables in tension, which compresses the elastomer sandwich so that the elastomer sandwich is in a combination of shear and compression.

Figure 20A:
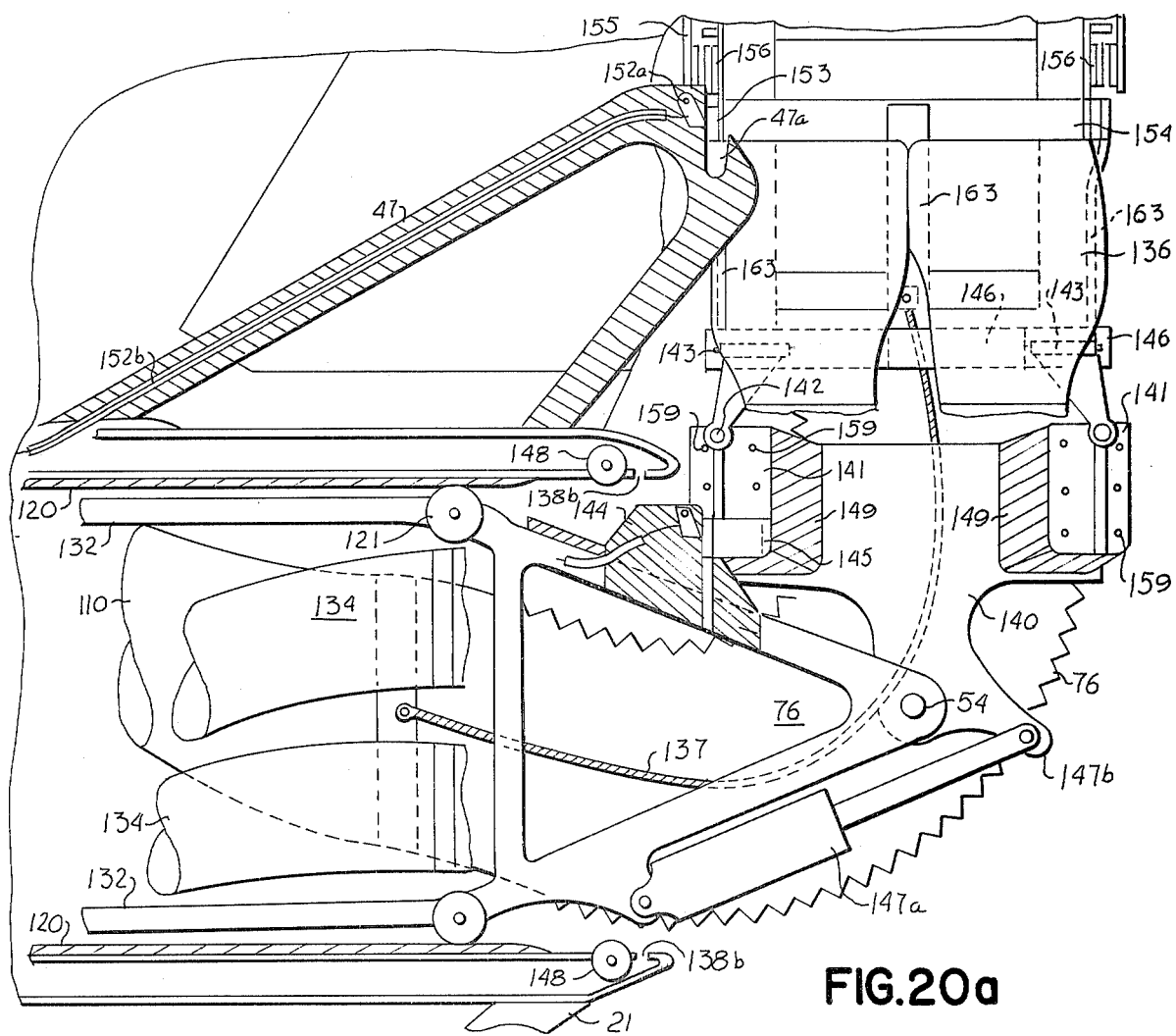
FIG. 20a is a side cut-away view at the end of the stowage tube showing the 90° tilt-up mast support joint, the hot gas duct (with by-pass ducts cut away), the flexible mast elastomer units, and the on-ground rotor mast lock.

The elastomer mounts are shown under load in FIGS. 19, 20a and 22.

The purposes of the elastomeric mounts are to provide a flexible mast that can tilt in any direction and act as a shock absorber that reduces transmission of rotor vibration to the fuselage. The embedded cables are necessary to carry most of the load because the elastomeric mounts, in shear, without the cables, are not capable of supporting the required load, considering the mounts must be small enough to fit in the available space in the stowage tube.

The cables are also a safety feature. The elastomeric shock mounts must of necessity be close to the center hot gas duct 76. In normal operation, this is no problem. The mounts are separated from the hot gas ducts by heat insulator pads 157, FIG. 21. Also, cooling air is continually drawn in the mouth of the stowage tube which draws cool air over the elastomeric mounts to prevent heat build-up on the mounts. If there is an accident, such as a rupture of the gas duct, this could quickly melt down the heat sensitive elastomer. However, the embedded steel cables would hold and allow an emergency landing.

The cable unit without the elastomer is equally unacceptable. The tail-lifter fuselage, dangling from the rotor on free-swinging cables, allows sideways sway between the two parts of the rotor mast connected by the cables; and the flapping of the rotor blades would tend to exert a rhythmic sideways force on the rotor mast which the free-swinging cables would permit to built up into potentially destructive harmonic vibrations. This rhythmic sideways force on the rotor mast is accentuated by the semi-rigid nature of the rotor, to be further described, whereby the blades are not completely free to swing up and down and, hence, the up-down movement of the blades is in part translated to sideways movement of the rotor mast. Also, the free-swinging cables would allow some unacceptable twisting force between the two parts of the mast connected by the cables. In addition, the free-swinging cables do not provide for an acceptable method of ground support of the rotor mast.

Therefore, the elastomer without the cable is unacceptable, and the cables without the elastomer are equally unacceptable. It is the combination of the cables embedded in the elastomer whereby the cable movement is restricted, and put in tension, which puts the elastomer in a combination of shear and compression that form an essential part of the rotor control system.

The hydraulic cylinder damper 147a, which is connected to the damper crank arm 147b, serves to restrict tilt hinge 54 movement during rotor flight and to force all relative movement between the upper and lower mast to pass through the elastomeric mounts during rotor flight. That is, once the tail-lifter clears the ground, this damper prevents the rotor from setting up back and forth movement or vibration in the tilt hinge 54. This may be a passive damper; or, if needed, it could be a hydraulic cylinder, with on-off valves to completely lock the cylinder and immobilize the tilt hinge once the mast is in a more-or-less straight position during rotor flight.

The parking rotor mast latch 47 works in conjunction with the elastomeric rotor mast mounts 141. There are two separate rotor mast latches 47 set on top of the stowage tube opening. The latch locations are shown in the small scale drawings, FIGS. 1, 10 (rear view) and 3a (top view). On landing, as the fuselage settles on the ground and as the mast tilts 90° (relative to the fuselage), and as fuselage weight is removed from the rotor, two latch hook receivers 153, which are attained to the sides of the upper non-rotating main mast supports 154, settle down into the latch slot 47a on latch 47, FIG. 20a. The lowering of the mast, with the latch hook receivers 153 is made possible by the mounts 141. As aircraft weight is taken off the rotor, the positive upward pull on the shock mounts reverses to a downward push on the mounts until most of the weight of the rotor unit rests on the shock mounts. Some of the rotor weight could be on the latches 47 as the latch hooks 153 rest on the bottom of the latch slot 47a on latch 47.

When the latch hook 153 descends near the bottom of the latch slot 47a, the mast latch down lock 152a automatically locks the rotor mast securely in place. For take-off, the pilot pulls the down lock release cable 152b to allow the spinning rotor to lift the mast, and the latch hook receiver 153 up and out of the slot 47*a* in the parking rotor mast latch 47 to free the mast from the latch.

If desired, the rotor mast latch units 47 can be designed to retract or fold down flat in recesses in the top of the stowage door. The retraction of the latches will reduce fixed-wing flight drag and keep the latches out of the path of diverted rudder air flow for increased rudder effectiveness if twin rudders are placed on top of the stowage opening as shown in FIGS. 26 and 69.

There is an alternate latch unit system consisting of parts 144 and 145, FIGS. 19, 20*a*, 21 and 26. FIGS. 19 and 21 show only the alternate latch system. The only differences in the two systems are that the alternate latch 144 is mounted directly on the main load-carrying support unit 132 and the latch receiver 145 is mounted directly on the outer plate of the elastomeric mount units 141. This alternate latch system retracts with the rotor which had the advantage of not causing drag or rudder interference during fixed-wing flight. Its main disadvantage is that high leverage on the alternate latch would put excessive stress on the latch so that it may not be built strong enough to hold.

5*a*. THE FLEXIBLE DUCT SYSTEM

The flexible duct units consist of the center hot gas flexible duct 76, the four by-pass air control flexible ducts 135; the blade root hot gas flexible ducts 59; and the blade root by-pass air flexible ducts 58. These flexible duct units are shown in FIGS. 19, 20*a*, 20*b*, 21, 24, 25*a*, 26 and 27*a*. Details of the new type of flexible duct construction with insert liners are shown in FIGS. 74, 75, 76, 77*a* and 77*b*.

A bellows type flexible duct appears to be the best type duct to meet the requirement of this tail-lifter VTOL. All of the flexible ducts are required to bend through the very large bend angle of 90°, and the bellows type flexible ducts are one of the few flexible ducts capable of meeting such large bend requirements. However, the bellows type flexible duct allows very large variation in length of the duct, like a coil spring, and this could cause a problem with the large forces to contend with as the high velocity and high pressure gas is deflected around the bend in the duct. Without a fixed flexible duct length, the gas force and pressure could force the flexible duct to expand lengthwise or push out in an uncontrollable manner.

The way this variable length problem is handled is to attach fixed length cables at or near the center of the bend line so that on that particular plane the flexible duct length is substantially fixed.

Looking first at the hot gas flexible duct 76 of FIGS. 20*a* and 19, one cable 137 is anchored on each side of the hot gas flexible duct, and the cables are fastened to the protruding ridges of the bellows. The cables may not necessarily be attached to every bellows ridge but at close enough intervals to effectively control the length of the flexible duct. The cable may be attached to the protruding bellows by cable clamps welded to the protruding bellows, or some other suitable means.

Figure 20B:
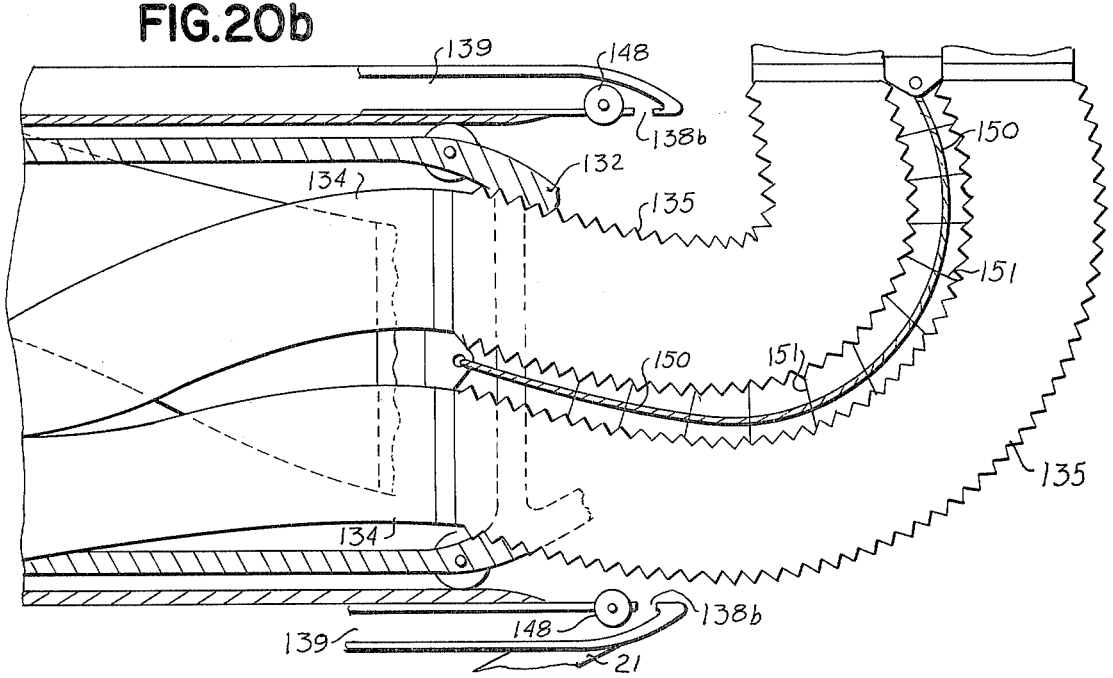
FIG. 20b is a view similar to FIG. 20a but showing only rotor control by-pass ducts.

Cable attachments 150 for the four by-pass flexible ducts 135 are slightly different, as shown in FIGS. 20*b* and 21. There are two ducts, one above the other, on each side of the hot gas duct, and the center of bend radius is in between the two ducts, so a cable is placed between the upper and lower by-pass ducts on or near the bend radius of the by-pass ducts, which is the same bend radius as the hot gas ducts and hot gas duct cables. These cables 150 are attached to the upper and lower by-pass ducts by fittings 151 which are fastened to the by-pass ducts at suitable intervals. FIG. 21 shows a sectional end view of both the hot and by-pass ducts and their respective cables and fasteners.

It should be noted that during rotor flight there must be minor variation in the length of the center hot flexible duct 76 and the four by-pass flexible ducts 135 due to the stretching of the elastomeric shock absorber rotor mast mounts 141, and to allow lateral bending of the flexible mast. Consequently, the cables 137 and 150 must be anchored with enough slack or "play" to allow for the maximum stretch or extension that the flexible ducts 76 and 135 will encounter. During rotor flight, this maximum stretching would occur on one side of the ducts during a lateral or sideways tilting of the rotor mast.

Cables 162*a* and 162*b* for the blade root by-pass ducts 58 are shown in FIGS. 25*a*, 26 and 24, and are attached in the same way as described for the tilting mast hot gas ducts 76.

Another features of the blade root flexible ducts is the placement of a flat flexible gas turning vane 169 inside the blade root flexible ducts, as shown in FIGS. 25*a* and 26. This inside turning vane is positioned on the center of the radius of bend as is the outside length stabilizer cables 162. The inside turning vane is anchored only at each end of the flexible duct. FIG. 25*a* shows a partial top view of the turning vane 169, anchored at the upstream end, with a V leading edge to reduce drag (like swept-back aircraft wings). The purpose of these turning vanes is to increase the efficiency of turning of the high velocity gases.

6. THE ROTOR HUB AND MAST EXTENSION

FIG. 26 shows a side view of the rotor hub and mast extension (above the rotor hub). FIGS. 25*a* and 27*a* are views, respectively, of the hub and extension on a larger scale but with the rotor rotated 90°, and the left side of FIG. 27*a* shows a top view of the rotor hub. The rotor has fixed pitch blades with the blade attached to the hub via widely spaced leading edge and trailing edge blade root arms 161*a* and 161*b*. The by-pass and hot gas flexible ducts 58 and 59 fit between these blade root arms. The blades are supported by rotor fold-up arms 44 which are attached to the piston rod of the shock damper 45. This attachment of the rotor fold-ups arms insures that the blades will fold up symmetrically. The damper 45 slows blade fold-up in the beginning stages of fold up and a separate group of dampers 46, mounted on the damper holder 170, prevent the two blades from clashing into each other on the final stage of fold-up. The folded blades, with last-stage shock damper 46 are shown in FIG. 45*b* (side view) and FIG. 57 (end view).

In conventional pitch change rotors, the cordwise center of lift is near the quarter cord line, so the cordwise center of mass is designed to be on the quarter cord line, and the pitch change axis is also placed on the quarter cord line. This makes pitch change easy, with no large forces to overcome on the pitch change arm. On conventional rotors, with blade flapping, it is important to match up cordwise center of lift with cordwise center of gravity in order to prevent blade flutter. Blade flutter is caused by the oscillating twisting moment on the rotor blade during flapping due to the mismatch of the cordwise center of lift and center of mass.

On this rotor, there is no attempt to match up cordwise center of lift and cordwise center of balance. Since it is a fixed pitch rotor, there is no pitch control arm force to overcome and the potential problem of blade flutter (due to the mismatch of blade lift and blade mass on blade flapping) is overcome by a torsionally rigid blade that is rigidly attached to the rotor hub which should prevent the oscillating blade twisting that causes flutter. The 'fat' nature of a pressure jet rotor (large blade thickness to cord ratio) combined with the widely spaced leading edge and trailing edge blade root attachment, combined with the rotor fold-up arms attachment (which also prevent twisting) should provide a torsionally stiff blade and therefore a flutter resistant blade. Also, the low rotor advance ratio (due to low forward speed of the aircraft) will reduce blade flapping and tend to further reduce blade flutter.

The rotor hub is a hybrid. It has some aspects of a teeter hinge rotor and also of the conventional flapping hinge rotor and also of a semi-rigid rotor, but cannot be classified as any of the above.

Since each blade has a separate hinge pair, it looks like a flapping hinge rotor, but the two opposed blades cannot swing independently as flapping hinge blades do. When one blade swings up, the other blade is forced down because the blades are interconnected via the rotor fold-up arms 44, which makes it act like a teeter hinge rotor. But unlike a teeter hinge rotor, the two opposed blades are separated and are on separate hinges which provide an automatically adjustable variable coning angle which the one-piece teeter hinge rotor cannot provide.

The semi-rigid aspect of the rotor is based on the flexible joint 51 at the base of the damper mast extension which allows the damper 45 or mast extension to bend back and forth in response to the up and down flapping of the two blades. Without this flexible joint 51, the blades could not simulate a teeter hinge rotor, and the rotor would behave as a rigid rotor rather than a semi-rigid rotor because the blades, including blade root attachments, are extremely rigid.

It should be noted here that the semi-rigid teeter hinge simulation works in conjunction with the flexible mast to accomplish disc tilting. The disc tilting is initiated by the cyclic pitch control acting on the teeter hinge simulator rotor, which then pulls or bends the flexible mast in the desired direction. There are several advantages to this arrangement. First, the bending mast keeps the angle of tilt between the rotor disc and the mast to a minimum. That is, as the disc is tilted via cyclic pitch control, the mast more quickly aligns itself beneath the disc, if the mast is flexible. This greatly reduces the problem of Hook's joint effect and Coriolis force in translational flight (speed-up and slow-down of rotor blades with the cyclic pitch flapping tilted disc) which reduces the lead-lag stress on the rotor, eliminates the need for lead-lag hinges and greatly reduces vibration problems; while at the same time greatly increases the effectiveness of the cyclic pitch control. That is, small cyclic pitch differential gives greater disc tilting with a flexible mast.

The tail-lifter VTOL also needs a flexible mast because it must have a very long mast. The great distance between the rotor disc and the center of gravity of the aircraft would put very large bending stress on the mass during rotor tilting, if the mast were not flexible.

The fact that the tail-lifter VTOL uses a pressure jet rotor rather than a mechanically driven rotor makes it far more feasible to incorporate the advantage of a flexible mast. For a mechanically driven rotor to incorporate a flexible mast would require an expensive, heavy, and high maintenance, constant velocity universal joint to transmit the high torque required for the rotor. No such device would be required for the torqueless pressure jet rotor. For the pressure jet rotor tail-lifter VTOL, the benefits of a flexible mast far outweighs the cost, but this is not the case for conventional helicopters with mechanically driven rotors.

7. THE ROTOR BLADE

The blade has five divisions: (1) the blade root; (2) the inboard and outboard augmenter flap; (3) the mini-transition flap; (4) the blade tip; and (5) the mid-blade jet nozzle. The blade and all of its components are illustrated in FIGS. 27 through 58.

(1) THE BLADE ROOT

Looking at FIG. 27a, the blade root hot gas flexible duct 59 is connected to the blade root hot gas manifold 186 which branches into four separate hot gas ducts 187 that fit in between the structural blade beams. This manifold is anchored to the blade root plate 165, and plate 165 supports the entire centrifugal load of the manifold 186, and everything attached to the manifold, as shown in FIGS. 27a and 28. By-pass air from the blade root by-pass flexible duct 58 passes through the blade root plate 165 and into a plenum chamber in the blade that fills all open space not occupied by the manifold 186. This by-pass air serves to cool the manifold 186.

The inner blade has a movable flap 38 that takes up about 35% to 40% of the blade cord. This means that the load of the trailing edge blade root arm 161b must shift inboard of the movable flap to the rear blade beam 192. The blade root manifold 186 branches into four separate ducts 187, and blade space limitation dictates that the rearmost of the four hot gas ducts must be placed behind the rear main beam 192. This means that as the root arm 161b moves inward to join with the main rear beam support 192 it must divide to allow the rear hot gas duct to pass through and to the outside of the main rear blade beam support 192.

FIGS. 28, 29, 30, 31 and 32 show cross sections of FIG. 27a, which illustrate: (a) how the single blade root hot gas duct transforms into the four individual hot gas ducts 186; (b) how the by-pass air is released into the blade plenum chamber 189; (c) how the trailing edge blade root arm 161b moves inwardly and gradually transforms or splits in the curved main load-carrying over-under blade root suspension band 196 and allows the rear hot gas duct 186 to pass through this split to the outside of the rear main beam 192.

The top and bottom portion of the band 196 curves around and is attached to the top and bottom flanges of the beam 192, the two intermediate blade beams 193, and continue to curve around to join the leading edge blade beam 191. Under blade centrifugal force, this curved band is put under tension and supports the front, rear and intermediate blade beams in a manner similar to the way the main suspension cables of a suspension bridge support a bridge via the hanging cables. The band 196 is best illustrated in FIGS. 31 and 27b. This suspension band also aids in providing the needed torsional rigidity of the blade when used in conjunction with the rotor fold-up arms 44 which also aid in preventing blade twisting.

(2) THE INBOARD AND OUTBOARD AUGMENTER FLAP

A top, cut-away view of the inner augmenter flap 38 is shown in FIG. 27a. An end, sectional view of the flap is shown in FIGS. 34a (flap up) and 34b (flap down). The same view, but on a larger scale, is shown in FIG. 51b.

The augmenter flap has the following features:

(a) The rear blade beam 192 is configured to serve as an integral part of the flap. This beam is shaped something like a channel or C, with the flap attached near the outer edge of the lower flange via flap hinge 204.

(b) The inside of the flange of the upper channel is curved to form a sliding seal, or a calibrated shroud blowing slot, in conjunction with the forwardmost upper surface of the augmenter flap as shown by slot 202.

(c) The slightly curved outside of this upper flange becomes part of the upper surface of the blade.

(d) The flap has a suction intake slot 199 and the extreme end of the upper flange serves to seal or cover this slot when the flap is in the up position.

(e) The rear hot gas duct 187 fits inside the channel or C of the beam 192. When the flap is up, there is very little duct area for by-pass air to pass through. By-pass air pressure forces the flap down and thereby increases the duct area through which by-pass air can flow, as shown in FIG. 34b.

(f) Inside the flap 38 are a series of small nozzles called augmenter flap ejector nozzles 198. By-pass air is forced through these nozzles, and the nozzles are configured in such a way as to draw the blade upper surface slip-stream air in the slot 199 and into the tunnel 200, and out through the exit slot 201. This tunnel is formed by a sound absorbing ejector tunnel top plate 208, which is attached to the flap via ejector tunnel top plate attachment partitions 209, which form a series of mini-ejector tunnels behind the individual ejector nozzles. The nozzles within the tunnels are illustrated in FIGS. 27a, 34 and 51b.

(g) Top, cut-away view of the augmenter flap hinges 204 is shown in FIG. 27a, which shows segments of the flap in both the up and down positions. Inside these hinge axes are long torsion springs 205, anchored to the flange of the rear blade beam on one end of the spring 205a and anchored to augmenter flap 38 on the other end of the spring 205b. The flap is spring-loaded in the up position. The flap must be in the up position to fit into the stowage tube on retraction, and the torsion springs insure that the flaps will be in the up position at all times when by-pass air pressure is not applied.

(h) In order to prevent by-pass air leakage around the flap hinge, a semi-flexible strip-flap seal 206a is placed over the inside of the hinge joints as shown in FIGS. 27a, 33, 34 and 51b. By-pass air pressure holds the seal against the hinge. A similarly mated strip-flap seal 206b is placed over the outside of the flap hinge to provide a smooth surface for air flow under the wing and flap. Slip-stream air pressure holds this strip seal against the flap hinges.

Each end of the flap must be provided with a sliding seal against the fixed, adjacent portion of the blade. This inboard flap end is shown in FIG. 27a, and also in FIGS. 32 and 33b. FIG. 33a illustrates the flap in the up position. The flap end at the other end of the augmenter flap would work in a similar fashion. Appropriate type seals (not shown) would be used at the interface to be sealed.

(i) The remainder of the by-pass air not expelled through inboard flap 38 continues outward to the outer augmenter flaps. When the by-pass air reaches the mid-blade jet nozzle, it is diverted through by-pass air passages that flow over at 189a and under at 189b the jet nozzle as shown in FIGS. 45b and 45c. FIG. 46 shows a sectional end view of the mid-blade cavity 246 that surrounds the removable jet nozzle, which also shows the over-under by-pass air passages 189a and 189b. FIG. 46 also shows how the leading, intermediate and rear structural beams divide, see numerals 191a and 191b; 193a and 193b; and 192a and 192b. The split beams converge after passing the blade jet nozzle, FIG. 56a, and continue as beams for the outer blade, using the same beam numerals 191, 193 and 192 as the inner blade beam. The outer blades and outer augmenter flaps 37 are basically the same as the inner blades and inner augmenter flaps 38. The major difference is that the outer blade is less thick and there are no hot gas ducts in the outer blade. FIG. 35a shows a partially cut-away top view of the outer blade with augmenter flap and FIG. 35b shows a rear view of FIG. 35a.

As shown in FIG. 35a, the intermediate and rear beams 193, 192 have appropriate slits, or fixed louver type openings 224 in the web of the beams to allow by-pass air to pass rearwardly through these beams to the augmenter flap 37. FIG. 35a also shows by-pass air turning vanes 223 that cross through the blade beams. By the proper placement of the by-pass turning vanes 223, and proper design of the size and number of slits 224 in the web of the beam, the flow and pressure of the by-pass air can be varied along the radius of the outer blade, as needed. Seals between different segments of the augmenter flap as illustrated in FIG. 35a and the sectional view in FIGS. 41a and 41b allow different pressures to be maintained along different stations of the augmenter flap, and further maintain flow differentials along different sections or stations of the flap.

FIG. 42 shows the flap end seal for the downstream end of the outboard flap similar to that shown in FIG. 33 for the inboard flap. The flap end seal for the upstream end of the outboard flap is shown in FIGS. 39a and 39b.

(3) THE MINI-TRANSITION FLAP

Transition between the jet nozzle and the outer blade is best shown in the end view of FIG. 35b and in FIGS. 36, 37 and 38.

The transition section is basically an open tunnel 227 with an upper transition flap 39a and a lower transition flap 39b at the trailing edge of the tunnel. The flap 39a is an inward extension of the outer augmenter flap 37 and moves with this flap. The flap 39b is a separate small flap that is actuated by connecting rod 212. The upper flap has a hinge anchor 214 against the outer bulkhead of the jet nozzle, with the hinge in the same plane as the outer flap. The lower flap 39b has a flap seal 213 that seals against the adjoining flap stub when in the closed position. This flap seal is to provide for a smooth airflow over that portion of the exposed, folded and retracted blades, when in fixed-wing flight, FIG. 52.

The mini-transition flaps have the same high deflection angle as the outer augmenter flaps. Such high flap deflection angles would normally cause flow separation without the by-pass air ejection nozzle jet flap. However, it is not practical to duct by-pass air to the transition flaps; so, in lieu of by-pass jet assist, leading edge slats 225 and 226 are attached to the upper and lower mini-flaps to aid in laminar flow across the upper surface of the mini-flaps.

(4) THE BLADE TIP

Blade tip vortices are a source of noise on rotor craft. The expulsion of air pumped through a blade tip nozzle has been shown experimentally to dissipate blade tip vortices and reduce this source of noise. Since air is pumped to the outer blade for the augmenter flaps, the extra cost for installing a pressure jet blade tip vortex dissipator nozzle is relatively small.

FIG. 35 shows the blade tip vortex dissipator nozzle 221 and FIG. 43 shows cross section of the nozzle. By-pass air reaches the vortex dissipator nozzle via gaps in the outermost by-pass air turning vane 223 as shown in FIG. 35a.

Lateral slits 216 and 217 in the blade tip as shown in cross section in FIGS. 35a and 35b and in FIGS. 43 and 44, also serve as additional blade tip vortex dissipator nozzles. These slit nozzles may also provide some minor additional blade thrust, as does the vortex dissipator nozzle 221.

Also, during fixed-wing flight, with the rotor folded and retracted, the blade by-pass plenum chamber becomes a suction chamber, and the exposed wing-tip slots 217 become suction slots to help maintain laminar flow over the curve of the wing tips. The manner in which suction is created within the blade by-pass air chamber has been explained in a previous section.

The suction slots are shown in FIG. 52 and end views FIGS. 54 and 55. FIG. 52 also shows that the upper surface slots 216 on each blade meet on fold-up and suction from these opposed blade slots helps hold the two blades together. Additionally, a strip seal of elastomeric material in the upper surface of the blade tips will aid in creating a vacuum between the two blade tips to further hold the blade tips together and reduce wetted area. These upper surface fold-up seals 215 are shown in FIGS. 35a, 53 and 54.

There is a one-way valve 222 placed over the vortex dissipator nozzle 221 and a one-way semi-flexible strip flap valve 211 placed over the ejector tunnel exit slot of both the inner augmenter flap 38 and the outer augmenter flap 37. These one-way seals are best shown in FIGS. 51a, 51b, 53 and 54, and are placed there to prevent unwanted suction through these openings during fixed-wing flight.

(5) MID-BLADE JET NOZZLE

The mid-blade jet nozzle system consists of the following major components:
 (a) Blade root hot gas manifold unit
 (b) Blade reheat burners
 (c) Mid-blade cavity for the jet nozzle
 (d) Jet nozzle hot gas manifold unit
 (e) Multiple turbo tip driven fan units
 (f) Variable vectored thrust turning vanes unit FIGS. 1, 11, 45a, 45b, 45c, 45d, 45e, 45f, 46, 47a, 47b, 48, 49, 50, 51a, 56a, 56b and 58 illustrate various views and components of the mid-blade jet nozzle. These components are fastened together in a special way to handle problem relating to centrifugal loading and problems of expansion and contraction of the hot parts. The components must be assembled in a specific sequence in two separate sub-assemblies which are later assembled in the blade.

The first sub-assembly consists of: (a) the blade reheat burners 41 which fit into the hot gas ducts 187 on the downstream ends of the (b) blade root hot gas manifold 186 as shown in FIGS. 11, 45a and 45b and is referred to as the inner blade hot gas subassembly.

The second sub-assembly consists of: (a) the series of turbo tip driven fan units 36 of FIG. 48; (b) the jet nozzle hot gas manifold unit 228 of FIG. 47a; and (c) the variable vectored thrust turning vane unit 40 of FIG. 47b. These three assembled components are referred to as the jet nozzle sub-assembly.

The Inner Blade Hot Gas Sub-Assembly

The reheat burners are similar to conventional afterburners used in high performance jet fighter aircraft in that they burn unused oxygen in the combustion gases expelled from the jet engine exhaust. They are like conventional jet engine burners in that they are designed to operate full time (on rotor flight) and are 'can' type construction as are many jet engine burners. Their major purposes are the same as conventional afterburners - to boost thrust.

Reheat burners 41 are inserted into the ends of each of the four hot gas ducts 187 in each blade, as shown in FIGS. 11, 45a and 45b. The reheat burner is anchored only at the upstream end of the burner at anchor point 251, FIG. 45a. The downstream portion of the burners are free to expand and contract within the ducts 187. The reheat burners have all the conventional components found in any can type jet engine burner: (a) burner spray bar 252 fed by fuel lines 258; (b) burner flame holder 253; (c) burner pilot lighter 254; and (d) burner mixer-cooling holes 256.

The burner pilot lighters, which operate continuously, have the oxygen rich by-pass air fed to them via duct 255 for greater effectiveness and reduced flame-out risk. The lighter also has its own fuel line and electric ignitor plug. Each burner has a sliding positioner 257 at the downstream end of the burner for lateral stabilization of the burner. FIG. 51a is a sectional view showing the reheat burner and its various component parts. A high pressure burner fuel pump is represented by numeral 207, FIG. 27a, along the upper portion of the blade root manifold 186. The high pressure fuel pump 207 could be operated by a small turbine propelled by the hot exhaust gases (not shown). The attachment of the reheat burners to the blade root hot gas manifold completes the assembly of the inner blade hot gas sub-assembly A modification of the pressure jet rotor system would be to feed only 'cold' compressed air to the rotor blades and place blade burners in the compressed air flow upstream of the turbo tip drive fans in the blade nozzle.

The Jet Nozzle Sub-Assembly

The purpose of the jet nozzle hot gas manifold unit 228 which is shown in FIGS. 45a, 45b, 45c and 47a is to channel the hot gas from the ends of the four hot gas ducts 187 to the turbo tip driven fan units 36. The upstream end of the jet nozzle hot gas manifold units 228 has four holes 247 for the ends of the hot gas ducts 187 to pass through. The manifold 228 is shown in FIG. 45b (side view) and FIG. 47a (sectional end view).

The manifold unit 229 has built-in guide vanes 250 and these are illustrated in top view, FIG. 45a and also illustrated in sectional view 47a. The guide vanes 250 direct hot gases to lead-in ducts to the turbo tip driven fan units 230 which are mated to the nozzle inlets for the turbo tip driven nozzle unit 232a where the tip turbo fan units are inserted in the manifold unit 228.

In order to minimize noise escaping from the fan unit, the fan unit should be buried near the mid-cord of the mid-blade cavity to provide maximum noise shielding, as shown in FIG. 50. This means that hot gases from the rear hot gas duct 187 must enter the rear portion of the manifold unit 228 behind the turbo fan unit. The rear gas passages 250b are more-or-less separated from the front gas passage 250a by the turbo tip driven fan unit as shown in FIG. 47a. This presents a problem of ducting the gas in the rear compartment vanes 250b to the front of the tip turbo fan unit. The problem is solved by diverting gas from rear vanes 250b past the turbo fan units through the gas ducts 230b which run along the manifold partition 229 in the spaces between the circular tip turbo fan units as shown in FIGS. 45a, 45b, 49 and 56b. In order to minimize sharp bends in these rear lead-in ducts 230b, which causes thrust losses, the top lead-in duct is curved down to mate with the bottom nozzle inlets and the bottom lead-in duct is curved up to mate with the top inlets, as shown in FIGS. 49 and 45b.

The protection of the mid-blade cavity 246 from the heat of the jet nozzle hot gas manifold unit 228 is accomplished by designing air flow passages at the interface between the two units as shown by air passage 244 of FIG. 50 and the bottom blade of FIG. 45b. Lateral, parallel, stand-off ridges attached to the manifold, FIG. 45b, determine the width of the cooling air gap between the nozzle and blade cavity. Supplemental heat protection can be effected by adding a layer of suitable insulation material to the surface of the manifold unit.

Each turbo tip driven fan unit 36 has eight nozzle inlets 232a which are transformed to form an eight-part circular nozzle outlet with their stator vanes 232b, as shown in front view in FIG. 45f. Hot gases flow through the nozzle 232 to propel the tip turbines 233 which turn the fan unit 234, and the hot and cold streams are mixed by the fluted gas mixer 236 as shown in side view in FIG. 50 and rear end view in FIG. 45e. This mixed gas flows should improve propulsive efficiency and reduce gas exit noise.

Each turbo tip driven fan unit 36 has eight struts 237 on each side of the turbo fan shaft unit 235, and these fore and aft strut units are joined via the turbo fan outer casing 240 to make the turbo fan a structurally rigid unit, FIGS. 48, 45b, 45e and 45f. This outer casing 240 is also a seal with the turbine blade tips.

The extended ends of two of these struts 237a and 237b provide the female attachment fittings 238 to be anchored to the male attachment units 239 at the inside of the manifold unit, at the top and bottom of the tunnel partition wall 229. Under centrifugal loading, the struts 237a and 237b are put under tension, and these two anchoring struts tend to pull the top and bottom of the jet nozzle manifold together, but the wall 229, which is put under compression, tends to maintain the proper vertical spacing between the upper and lower portions of the manifold, which in turn maintains the proper spacing for the stressed struts 237a and 237b which should in turn prevent unwanted distortion of the tip turbo fan outer casing 240. If such distortion were allowed to occur, it would cause blade-tip-to-casing rubbing and seal clearance problems.

With this attachment system, when the manifold unit expands (thermal expansion plus centrifugal stretching) the distance between the attached individual fan units increases, but this does not matter because:

(a) All the relevant components that the fan units are attached to expand proportionally, so that the special relationship between the components is maintained.

(b) The fan unit is attached only at the upstream end, with the downstream portion of the fan unit free to expand and contract.

After the fan units are inserted in the jet nozzle hot gas manifold, the variable vectored thrust turning vane unit 40, FIG. 47b, is attached via bolts 231, FIG. 47a, to the rear of manifold unit 228, and turning vanes are attached to the turning vane actuator 242 which is activated by by-pass air pressure line 243, FIGS. 49, 45a and 56b. This completes the assembly of the jet nozzle sub-assembly.

FINAL ASSEMBLY OF THE MID-BLADE JET NOZZLE

The jet nozzle sub-assembly is inserted in the cavity 246, FIG. 50.

At the upstream end of the cavity 246, there are four holes 247 to allow the ends of the four ducts 187 to pass through, FIGS. 45a and 45b. When the jet nozzle sub-assembly is inserted in place, the holes 247 in the upstream end of the cavity and the four holes 247 in the upstream end of the manifold unit match up to allow the ends of the hot gas ducts to pass through both sets of holes.

This jet nozzle sub-assembly is anchored only at the upstream end of the cavity by anchor bolts 248 as shown in top view in FIG. 45a and side view in FIG. 45b and FIG. 45c. The remaining downstream portion of the jet nozzle sub-assembly is free to adjust to centrifugal loading and to thermal expansion and contraction in the mid-blade cavity. The downstream end of the jet nozzle sub-assembly does have lateral restraints or fasteners (not shown) to secure the downstream end of the sub-assembly in the cavity.

After the sub-assembly is anchored in place in the cavity, the inner blade hot gas sub-assembly is inserted in through the blade root opening and the manifold 186 is anchored only at the upstream end to the blade root plate 165, FIG. 27a. The ends of the ducts 187 are inserted into holes with sliding seals 247 through the cavity, and then through holes in the manifold unit 228, FIGS. 45a and 45b, and the hot gas ducts are free to slide back and forth in these openings in response to thermal expansion and contraction and centrifugal loading.

To summarize, there are two sub-assemblies, each anchored only at their upstream end, with the downstream portion of each sub-assembly free to expand and contract and the ends of the hot gas ducts of the inner blade hot gas sub-assembly is slid into the upstream end of the jet nozzle sub-assembly; and within each of these sub-assemblies there are components which are also anchored at their upstream end with the downstream portion of the components also free to expand and contract.

THE ROTOR BLADE AS STOWAGE TUBE DOOR

A separate and important function of the mid-blade jet nozzle is that it serves as a replacement for a rotor stowage tube door. This function is illustrated in FIGS. 2a, 2b and 3a, and on an enlarged scale in FIGS. 56a, 56b and 58. The enlargement of the two blades at the jet nozzle is designed to plug the end of the stowage tube. The transition portion of the blade from jet nozzle to the exposed outer blade provides a reasonably streamlined 'tail cone' for fixed-wing flight.

The 'beaver tail' tail cone also provides some supplemental horizontal stabilization but at the expense of pitch control. However, since the 'beaver tail' is in place only at higher altitudes, after rotor retraction, maneuvering requirements are minimal, so the reduced pitch control should not matter.

The elimination of the separate stowage tube door eliminates the cost and weight of the stowage tube door; eliminates the mechanism for opening and closing such a door and, therefore, eliminates the possible malfunction of such mechanism; eliminates the aerodynamic problems of opening and closing such a door in the slipstream of the aircraft, and eliminates the problem of on-ground interference of the opened stowage tube door with the ground, passenger exit, or other structures.

FIG. 56a also shows top and bottom laminar flow suction slots at the rear end of the stowage tube 138b; and FIG. 56b also shows laminar flow suction slots on the side rear extension of the stowage tube 138a. These suction slots are connected through passages in the walls of the stowage tube that lead to the wing suction chamber 93 and hence through rotary valve 70 and into suction pump 102. These stowage tube suction slots are parts of the overall fixed-wing laminar flow control system, as are the blade tip suction slots 217 at the very tip of folded rotor blades as described in the section on the rotor blade tips.

8. THE THRUST DEFLECTOR-INBOARD ELEVATOR UNIT AND TAIL PIPE

The thrust deflector unit 48 is shown in FIGS. 2a, 3a, 10 and 12, and in enlarged scale to show details of construction and operation in FIGS. 66a, 66b and 66c.

The purpose of the thrust deflector 48 is to aid in converting from rotor flight to fixed-wing flight, and this is best illustrated in FIG. 12. On conversion to fixed-wing flight as the rotor is being collapsed and as the aircraft begins to drop, the thrust deflectors are tilted upward as in FIGS. 12 and 66c. This pushes the tail of the aircraft downward and thereby reduces the speed and distance of drop of the aircraft as the aircraft is converted to level fixed-wing flight. This, in turn, reduces the loading on the aircraft and passenger, and greatly diminishes passenger discomfort and stress on the aircraft.

The concept of deflecting engine thrust to aid in converting from rotor flight to fixed-wing flight is disclosed in previous U.S. Pat. No. 3,762,667, but this particular deflector unit is new and different in that it provides both thrust deflection for converting from rotor flight to fixed-wing flight and also provides upper surface blowing powered lift to aid in converting from fixed-wing flight to rotor flight.

Upper surface blowing (USB) is a relatively new concept that is not being used experimentally on some STOL aircraft. This USB system differs from other USB systems in that it blows over the horizontal stabilizer rather than the main wing. This means that USB on this VTOL aircraft can provide added lift at the tail of the aircraft rather than at the main wing. On conversion from fixed-wing flight to rotor flight, the aircraft must reduce speed which reduces lift. At the same time, the folded rotor is extended, shifting the center of gravity and weight of the aircraft rearward. This puts substantial increase lift requirements at the tail of the aircraft which is provided by the upper surface blowing of the inboard-elevators. This USB added lift, which is shown in FIG. 66b, allows the horizontal stabilizer and elevator to be built smaller than would otherwise be required.

The dual function thrust deflector and USB powered lift inboard elevator is powered by actuator 310, which has fairing around the actuator 311 and an inboard elevator crank arm 309 that also includes fairings to reduce drag. Left and right deflector units are designed to operate independently in case of engine failure, or malfunction of either deflector unit.

To insure smooth air flow over the elevator during all operating positions, a hinged transition bridge 312 is attached to the horizontal stabilizer, FIGS. 66a, 66b and 66c. When the inboard elevator 48 acts as a thrust deflector as in FIG. 66c, the bridge 312 'rides up' the stand-off ribs 313, creating a gap between the bridge and the thrust deflector. This bridge provides for a smoother two-stage upward deflection of the hot gases, and also acts on the ejector pump principle by sucking in color air from beneath the deflector in the gap between the bridge and the upper surface of the deflector. This film of cool air reduces the intense heat that the deflector-inboard elevator 48 would be subjected to when the unit is used as a thrust deflector.

When the elevator unit is used for added powdered lift, FIG. 66b, the transition bridge 312 provides a smooth, downward-curved surface for the high velocity hot gases to pass over. This is important because the USB flap works on the Coanda effect, in which the high speed flow adheres to the upper curved surface, and any sharp break in the surface would destroy the Coanda effect.

The fixed-wing flight tail pipe 65 is part of the upper surface blowing system, and thrust deflector system. The tail pipe is designed to combine and mix the hot engine exhaust gases and the by-pass air, which is best illustrated in side view in FIG. 17a and top view in FIG. 16. This mixing of hot and by-pass air increases propulsive efficiency and reduces noise.

The tail pipe also includes a variable area nozzle unit 314. The nozzle may be needed because the suction pump for the laminar flow control suction system and cooling system is an integral part of the compressor-fan unit of the primary jet engine. Consequently, variation in suction air requirements will cause variation in by-pass and hot gas flow through the engine which may therefore require a variable area nozzle to maintain optimum nozzle exit velocity from the tail pipe.

This variable area nozzle unit 314 is illustrated in FIGS. 66, 17b and 69. The ultra-simple device is made by using a relatively thin gage metal tail pipe which can be bent or deformed; and then incorporate a mechanism in the end of the tail pipe to depress or squeeze the tail pipe to reduce its cross sectional area. This is best illustrated in end view in FIG. 69 where the tail pipe 65 in solid lines shows the full open position, and the broken line shows the tail pipe in the reduced area configuration as it is depressed by the center variable area depressing mechanism 314. A side view of the variable area tail pipe squeezer mechanism 314 is best illustrated in FIG. 65 which shows how the tail pipe is squeezed by an electric motor operated rack and pinion gear attached to the end of a pull-down rod attached in the middle of the end of the tail pipe.

9. THE SUCTION SPLIT FLAPS

A fixed-wing flap system will enable conversion from fixed-wing flight to rotor flight to take place at a lower air speed. This in turn will: (a) reduce aircraft drop distance before full deployment of the rotor; (b) reduce stress on aircraft components during conversion; and (c) minimize discomfort to passengers. The fixed-wing flap system should also increase safety during conversion, and also increase safety during fixed-wing flight emergency, wheel-less or skid landings.

The suction split flaps 66 are illustrated in FIGS. 73, 71a and 71b. This special flap system was devised to take advantage of the suction chamber already placed in the wing for the suction skin laminar flow control system. By using the wing suction for the flaps a high lift flap system can be devised that is mechanically very simple. Without the suction, a far more complex and heavier mechanical flap system would be required to provide equivalent coefficients of lift (such as the triple slotted Fowler flap).

This suction split flap system is based on the same principle as the more complex suction flap system used for the alternate rotor directional control as illustrated in FIGS. 72 and 73. With reference to FIGS. 71a and 71b, as the split flap 66 is opened by actuator 319, the variable suction intake slot 322 is uncovered, and the sliding seal 323 opens progressively wider as the flap is opened wider and, therefore, letting in progressively larger amounts of sucked air for greater lift. The sliding seal 323 is controlled by the variable suction intake seal control arm 324, which is attached to the split flap actuator arm 320. This arm 320 is circular in shape and pivots around the split flap actuator hinge 321 so that there is a continuous seal between the actuator arm 320 and the underside of the wing so that air cannot be sucked in around the actuator arm.

Air flowing over the top of the wing is diverted downward by the combination of the open mechanical flap and the suction slot on the underside of the trailing edge of the wing. This system, which uses a simple mechanical flap in conjunction with a suction slot on the underside of the wing's trailing edge, has been tried experimentally in wind tunnels and has been found to produce higher lift coefficients than simple split mechanical flaps used alone, or suction slots used alone. The varying of the suction slot width with the opening of the mechanical flap and the curved internal actuator arm 320 inside the suction chamber are unique features of this suction-split flap.

10. THE SUCTION AUGMENTED FIXED-WING FLIGHT CONTROL SURFACES

The purpose of this innovation is to further utilize the aircraft suction system to augment fixed-wing flight control surface effectiveness. The system has the following features:

(a) The control surfaces - elevator, rudders, and ailerons - would have porous sucked skin surfaces similar to the porous skin for other wetted areas of a suction surface skin aircraft.

(b) The suction through the control surface skin is variable, and when a control surface is turned, suction is automatically increased on the low pressure side of the control surface, which is the side that is turned away from the slipstream. This increases the effectiveness of slipstream deflection and minimizes the onset of drag inducing break-away turbulence. The purpose of this suction flight control surface system is to:

(1) Further reduce fixed-wing flight drag in straight and level flight by increasing the percentage of wetted skin area that has a suction surface.

(2) Increase flight control effectiveness at low transition speeds and complement the use of low speed-high lift suction split flaps and the low-speed lift of the upper surface blowing inboard elevator.

(3) The increased effectiveness of the flight controls enable smaller control surfaces to be used which will further reduce drag and reduce structural weight.

FIGS. 67, 68, 69 and 70 illustrate how the suction augmented flight control system operates. FIGS. 67a and 67b show a sectional view of the pivoting hollow shaft for the elevators 299 and the automatic suction control valves 315 and elevator control arms 301 and cables 302. This outer elevator pivot hollow shaft 299 passes through the thrust deflector pivot shaft 308, FIG. 69. As the outer elevators 60 are turned downward, FIG. 67b, holes or slots in this inner shaft 299 match up with holes or slots in an outer shaft to create a rotary valve in the full open position 315b. This increases suction flow through the upper porous surface 94 of the outboard elevator 60. FIG. 67a shows the elevator control in neutral position for straight and level fixed-wing flight and the variable open suction air valve is in minimum open position 315a. FIGS. 68a and 68b show a section through the outer portion of the horizontal stabilizer 18 and elevator 60 illustrating how air is sucked through holes 300 in the elevator hollow pivot shaft 298, which then passes through the variable opening suction air valve 315, and then into the wing suction chamber.

The same basic variable suction augmented system used for the elevator can be applied to the ailerons, so no illustration is needed or shown for suction augmented ailerons.

The suction augmented system is also used for the twin rudder and is illustrated in FIGS. 70a and 70b. The suction system for the rudder 5 differs from the elevator system in that the rudder has porous surfaces on both sides of the rudder with separate suction chamber for each side of the rudder, using the rudder suction chamber divider 316 to separate the chambers.

When the rudder and rudder hollow pivot shaft 303 are in neutral as in FIG. 70a, equal quantities of air are sucked through the opposite porous sides of the rudder through the variable opening sucked air valve 317a. This is merely to maintain laminar flow over the rudder in straight flight. When the rudder is turned, FIG. 70b, the rotary valve opens 317b to permit larger quantities of sucked air to be drawn in on the low pressure side of the rudder, and the valve closes to reduce or cut off sucked air from flowing through the high pressure side of the rudder. The higher suction on the low pressure side increases the capability of the rudder to alter the direction of the air flow at higher rudder turning angles and still maintain laminar flow, and therefore increase the effectiveness of the rudder.

The rudder control arms 305 and control cables 306, and turn-around cable control pulley 307 are shown in FIGS. 69, 70a and 70b.

11. INSERT LINERS FOR BELLOWS TYPE FLEXIBLE DUCTS

The flexible duct requirements on this rotor unit are most stringent, and no existing flexible ducts appear to meet these requirements. The ducts have to: (a) bend a full 90° with a sharp or small radius of bend; (b) be subjected to high temperatures; (c) high velocity; (d) high pressure, and (e) continuous flexing; and (f) the inside surface of the duct needs to be relatively smooth to cut down on internal drag.

A one-piece metal type bellows was chosen because it can stand relatively high temperature, it can take the sharp 90° bend, and being one piece, it can be airtight. The bellows would generally be designed as a continuous spiral or helical bellows. The problems or drawbacks that have to be overcome with this type flexible bellows are:

(a) The ridges or grooves of the bellows cause substantial internal gas flow turbulence and drag.

(b) There is substantial heat loss on the hot gas flexible ducts, with the fluted bellows acting as heat exchanger surfaces.

(c) The prolonged exposure to the high temperature could limit the life of the necessarily thin duct wall material.

(d) There would be substantial noise transmission from the high velocity gases passing through the thin wall ducts, especially when gas flow direction is changed.

To handle the above problems, a special strip liner 335 is inserted in the grooves of the bellows as shown in FIGS. 74, 75, 76, 77a and 77b. FIG. 74 shows an overall view of the bellows type flexible duct with a 90° bend. FIG. 76 shows an end sectional view of the special liner 335 to be inserted in the bellows groove, and FIG. 75 shows a side view of the insert liner. The flange of the insert liner 335b is to be inserted in the spiral or helical groove of the bellows type flexible duct. This flange 335b is slit or cut at regular intervals 335d to allow the insert liner flange to bend or curve to fit in the grooves of the circular flexible duct, as shown in FIG. 75. Between the slits of the flange, integral flange springs 335c are stamped, FIGS. 75 and 76. These flange springs 335c force the shank of the anchor flange 335b to stay in contact with the forward or downstream wall of the bellows groove regardless of whether the bellows is expanded or contracted. This is shown in FIGS. 77a and 77b which are cut-away views of the insert liner 335 placed in the flexible bellows duct 334. FIGS. 77a and 77b also show how the overlapping duct liner surface 335a, which sits on top of the bellows groove ridge, slides over each other to adjust to the expansion and contraction of the bellows. The arrows show the direction of the gas flow and illustrate how the duct liner surface 335a smooths out the interior surface of the bellows flexible duct 334 in order to reduce turbulence and reduce internal gas flow drag. FIGS. 76, 77a and 77b also show how the duct liner surface 335a incorporates a heat and sound insulator material 335e, such as asbestos fabric, in order to cut down on heat and sound transmission to the outer bellows duct wall.

12. SUCTION SURFACE SKIN SYSTEM FOR FIXED-WING FLIGHT LAMINAR FLOW CONTROL

One of the principal barriers to the development of a practical sucked skin laminar flow control aircraft has been the absence of a practical suction skin for the aircraft. Problems encountered have been:

(a) Degradation of performance caused by clogging of the skin from insect accretion and dust.

(b) Excessive maintenance requirements of the skin, related to keeping the skin clean and unclogged.

(c) Maintaining differential suction flows over different areas of the aircraft to match differing suction requirements to maintain laminar flow.

(d) Problems related to lift destroying, reverse flow over low pressure upper surface of wings when the suction system is inoperable.

This suction surface skin system is designed to overcome the above-mentioned problems when used in conjunction with this tail-lifter VTOL. The suction surface skin system could also be applicable to other conventional fixed-wing aircraft, but would have greater skin clogging problems.

The system consists of a porous, compliant skin. Non-porous and non-suction compliant skins have been experimented with for drag reduction with some success; and so have more-or-less rigid porous suction skins been used experimentally. However, the combination of a porous and compliant skin has not been used, and there appears to be some advantage in using this combination.

The suction skin system of the present invention is illustrated in FIGS. 78 through 83, and consists of the following components:

FIG. 78 represents a sectional view of the outer skin 336, which is a relatively thin, fine pore, porous flexible suction skin. This outer skin is bonded to an inner, thick, coarse pore, porous flexible skin 337, which is shown in FIG. 79. The inner skin 337 is in turn bonded to the rigid, structural aircraft skin 339 shown in sectional view in FIG. 81. The wetted area structural skin 339 has threaded, countersunk round holes 340 in the aircraft skin. These holes are to admit suction air flow to the vacuum chambers in the wings and vacuum chambers beneath other wetted skin areas of the aircraft where sucked skin laminar flow is desired. Inserted in these holes are integral, one-piece, semi-flexible, non-return valve inserts 341, FIG. 80. These inserts may be made of materials, such as polyethylene, and be self-threading by the screw threading holes 340 in the aircraft skin 339. The countersunk inserts have a cross diameter bi-valve lip support bridge 341a on which two integral, flexible, bi-valve lip-hinges 341b support two non-return bi-valve lips 341c. The non-return valves are to prevent lift destroying reverse flow over the low or negative pressure upper surface of the wings when the suction system is not in operation. The prevention of reverse flow is essential for safety reasons in the case of malfunction of the suction system, and also because there are times during fixed-wing flight when it is not desirable to operate the surface suction system.

It should be noted that the holes in the aircraft skin 340 and the inserted valves are of varying sizes, shown in section in FIG. 81 and top view in FIG. 83, so that differential suction flows can be established over different areas of the aircraft in order to match differing suction requirements to maintain laminar flow. In order to maintain the flow differential established by the different size holes and valves, a grid of 'fences' or impervious or non-porous barriers 338 is incorporated in the skin 337. The grid 338 is shown in section in FIG. 79 and top view in FIG. 82. The non-porous grid or barrier 'fence' maintains the needed pressure differentials over different areas of the sucked skin by preventing air flow from migrating from a higher pressure area to a lower pressure area.

Cleaning or maintaining the porous suction skin in an unclogged condition can be done with conventional vacuum cleaners, and 'wet' detergent foam vacuum cleaners not unlike those used for cleaning carpets. The fact that the porous suction skin is flexible or compliant in depth, like a carpet, enables a cleaner to 'beat' or vibrate the flexible skin to help loosen the dust and insect accretion from the compliant skin, as does a carpet vacuum cleaner; and the thick, coarse pore inner flexible skin 337 allows the vacuum cleaner to create a reverse cleaning flow through the outer, thin, fine pore skin where the dust and insect accretion is lodged. The fine pore skin minimizes dust penetration to the coarse inner skin. That is, although the vacuum cleaner will automatically close the non-return valve inserts 341, reverse cleaning of the compliant skin is still possible by drawing in air from outside the vacuum cleaner nozzle, up through the thick, inner skin and out through the thin skin and into the vacuum cleaner bag. In other words, cleaning of the compliant skin is like cleaning a carpet, with the structural aircraft skin 339 that incorporates the non-return insert valves 341 being equivalent to the floor supporting the carpet.

The fact that suction for the laminar flow control suction skin is turned on only at high altitude where the air is clean and not at ground level or low altitudes where there is dust and insects greatly reduces the problem of porous skin clogging and related maintenance problems.

Also, the tail-lifter VTOL has special advantages over any conventional fixed-wing aircraft with a suction surface skin system in relation to the problem of pore clogging of the skin. Even with skin suction turned off, on conventional fixed-wing aircraft, the air speed on take-off and landing impacts dust and insects on the leading edge of the wing and clogs up the porous skin. The tail-lifter, on the other hand, which moves through the dust and insect zone at zero forward speed does not have this problem.

A potential problem with this suction skin system is the weakening of the stressed skin of the wing by the thousands of small holes required for suction air flow. The fact that the holes are round reduces the stress concentration, but there would be substantial weakening of the wing nevertheless, and this weakening must be compensated for by thicker skin or stronger skin material, or by modifying the internal structure of the wing. However, the use of the newer fiber composite materials for structural skin may be a better answer. By using a composite, such as the epoxy-graphite fibers, and molding the holes in the skin instead of later drilling the holes, the fiber matrix can be worked around the hole forms or protrusion in the forms so that the fibers are not cut and therefore the holes should not substantially reduce the strength of the epoxy-graphite fiber skin.

13. ANALYSIS OF ROTOR BLADE CONCEPT AND OPERATIONS

The varying of by-pass air flow to the blades is used to vary lift, both collective and cyclic, for the inboard and outboard flaps as well as for varying lift through the blade nozzle via the jet nozzle turning vanes. In order to vary lift of the inboard and outboard flap, there are two options:

(a) Design the inboard and outboard flap to operate in two positions only: (1) fully open; or (2) fully closed. That is, the minimum operable by-pass flow will push the flap to the fully open position. The flaps will close only when there is no by-pass flow, such as during autorotation and during conversion when the blades are being folded for retraction. Variation in lift is accomplished by the variation in jet flap effectiveness. That is, variation in by-pass air will cause variation in suction through the upper jet flap suction slot and variation in blowing through the trailing edge blowing slot while the flaps remain fully extended.

(b) Design the inboard and outboard flaps to operate with flap angles that vary with the by-pass air flow and air pressure. During rotor operation, there will be a balance between by-pass air pushing the flaps outwardly and downwardly, and the slipstream of the rotor pushing the flaps upwardly. Changing by-pass air pressure and flow will change the equilibrium flap angle position. This second option will automatically decrease the flap angle and decrease lift on the advancing blade due to higher slipstream pressure on the advancing side pushing the flap upward; and automatically increase the flap angle and increase lift on the retreating blade due to lower slipstream pressure on the retreating side, allowing the internal by-pass pressure to push the flap downward. In other words, this second option would tend to replace blade flapping as the mechanism of lift equilization of advancing and retreating blades. This is good in that it would reduce vibrating, stress and wear problems associated with excess blade flapping. However, some blade flapping would remain and such residual blade flapping would tend to counter the automatic decrease flap angle of the advancing blade and the automatic increased flap angle of the retreating blade. That is, since the mass of the blade flap is aft of the flap hinge, inertia would cause the flap on the upward swinging, advancing blade to swing downward and cause the flap on the downward swinging retreating blade to swing upwardly. This is the opposite of what is desired.

Therefore, it appears that blade flapping may wipe out any advantage of the 'free-swinging' variable angle flap of option (b) so option (a) may be the preferred embodiment.

About one-third of the rotor blade span is used for the propulsion nozzle. This is too much of the blade span to use just for propulsion with no lift, so the blade nozzle is adapted to provide propulsion and lift by the addition of the deflector vanes in the trailing edge section of the nozzle. Unlike the inboard and outboard jet-mechanical flaps, the turning vanes are more-or-less mass balanced, so blade flapping should have no adverse effect on this operation. Consequently, the jet nozzle turning vanes are designed as variable angled turning vanes which vary with by-pass air flow and pressure.

The entire span of the rotor blade is an 'active' or propulsive lift blade that incorporates high lift technology adapted from STOL (short take-off and landing) fixed-wing developments. The rotor is designed to operate at coefficients of lift three to four times that of conventional helicopter rotors, and also to operate at lower tip speeds in order to meet low noise requirements.

For this tail-lifter concept to work, the large jump in blade lift coefficient is essential. The concept demands the limitation to two blades, and noise consideration dictates that the blades must have slow tip speeds. Therefore, two slow-moving blades must provide as much lift as six to eight conventional mechanically driven blades moving fast, or four conventional pressure jet rotor blades moving fast. In essence, the rotor operation must be viewed as the equivalent of an STOL aircraft in perpetual take-off configuration with flaps fully extended. The rotor is designed for pure lift, not fast forward speed, for short periods of time, so maximum lift coefficient is the dominant requirement, as required for take-off, and not maximum lift to drag ratio coefficient, as would be required for high speed cruise rotor flight for long-range cruise.

The mid-blade location of the pressure jet nozzle was chosen over the blade tip location for the following reasons:

(1) Better autorotation. Since drag is roughly proportional to the square of the velocity, a blade tip location of such a massive nozzle as required for this quiet tail-lifter VTOL would cause too much drag for adequate autorotation. The mid-blade nozzle location, which is subjected to substantially less slipstream velocity and less drag, offers a better chance of providing adequate autorotation. During autorotation, the mid-blade jet nozzle would act something like a closely spaced biplane wing, with additional drag caused by the windmilling turbo tip driven fans.

Substantial research would be required to determine the amount of lift and drag of the mid-blade jet nozzle during autorotation. Also, the automatic closing of the mechanical-jet flaps when power to the rotor is cut off is a safety feature to instantly insure that the rotor blade will automatically move to the required autorotation position. The closing of the mechanical-jet flaps would be the equivalent to changing the collective pitch to minimum pitch angle of conventional rotor blades.

(2) The mid-blade location of the nozzle permits lower nozzle exit velocity and therefore is an important factor in providing a quiet rotor for the tail-lifter.

(3) The mid-blade nozzle location permits a shorter stowage tube, so the front portion of what would have been part of the stowage tube can be utilized for payload. Some exposed blade tips area is needed to provide the proper streamlining to form the aircraft 'tail cone', and the added exposed blade tip area due to the mid-blade nozzle location should not cause substantial added drag.

(4) The mid-blade nozzle location allows a thinner outer blade for a more optimum thickness-to-cord ratio for a higher Figure of Merit for less drag and more efficient lift.

(5) A partially retracted rotor of the mid-blade nozzle reduces change in center of gravity problems as compared with blade-tip nozzle that would require a fully retracted rotor.

13a. THE PROBLEM OF PROVIDING ADEQUATE GAS DUCT AREA IN ROTOR BLADES

In order to meet minimum noise, folding and stowage requirements, the tail-lifter VTOL system appears to require a two-bladed rotor with a maximum tip speed of about 500 feet per second. If this is so, then conventional rotors would appear inadequate and inappropriate for the tail-lifter VTOL. For example, using conventional pressure jet rotor technology, a rotorcraft in the same proposed size range as the present tail-lifter would require a minimum of four pressure jet rotor blades operating at 700 + feet per second tip speed. If this rotor were slowed to 500 feet per second, lift would be cut by half and eight blades would be required, or four times as many blades as acceptable for the tail-lifter. This means that the maximum blade coefficient of lift of the tail-lifter rotor must be about four times that of 'conventional' pressure jet rotors. This appears possible, but to accomplish this the entire rotor blade must be an 'active' or power lift blade, which means pressurized air must be fed through the rotor blade to power the internally blown flaps (in addition to the downward deflection of the elongated jet nozzle).

This presents a problem of duct space within the rotor blade for operating both the pressure jet nozzle and the jet flaps. With careful and clever design, there is just enough duct space within a 'conventional' pressure jet rotor blade for propulsive nozzle gases only. Jet flap rotor blades, if mechanically driven, require about 50 percent to 75 percent of the available blade space for duct area. But the problem is even more difficult than indicated above because: to take advantage of the higher coefficient of lift of jet flap, blade area is normally reduced by up to one half, so when one tries to combine a jet flap rotor to a pressure jet rotor, the blade duct area requirement is increased by about 50 percent to 75 percent over maximum available duct space; and at the same time blade duct space would normally be cut by up to one half, creating a very large short-fall in blade duct space requirements. In order to overcome such a large short-fall in duct space requirements, a multiple of innovations and design approaches were used, including:

(1) Use a lower by-pass ratio engine (1:1 ratio or less) than would be used for a conventional 'warm' cycle pressure jet rotor. This will provide higher pressures for both by-pass air and hot gas to reduce both hot gas duct area requirements, and by-pass duct area requirements.

(2) Use the special mechanical-jet flap rather than a 'pure' jet flap which substantially reduces by-pass blade duct requirements relative to pure jet flap blade duct requirements. (3) The high pressure by-pass air is used in conjunction with a multiple of mini-ejector nozzles in the mechanical-jet flaps. These mini-ejector nozzles suck air through upper surface flap slots and blow the air out through lower surface trailing edge slots. This ejector nozzle causes the expulsion of about seven times as much air than is ducted through the rotor blade, and multiplies the blade lift per unit of air passing spanwise through the blade ducts, and consequently lowers by-pass air requirements and by-pass blade duct area requirements. This higher mass, lower pressure and lower velocity expelled air also lowers the noise level of the jet flaps.

(4) The mechanical-jet flap is designed to substantially increase (about 30 percent) blade by-pass duct area when the mechanical-jet flap is lowered, and by-pass duct area is needed only when the mechanical jet flaps are lowered.

(5) The multiple turbo tip driven fan nozzle expels about ten times the mass of air from the nozzle than passes through the blade hot gas ducts. This high mass, low velocity expulsion from the blade nozzle greatly increases propulsive efficiency (and lift efficiency of the vectored nozzle gas) and greatly increases propulsion and lift per unit of hot gas passing through the blade hot gas ducts, and therefore reduces hot gas requirements and hot gas duct requirements.

(6) The lowered velocity and increased mass exiting from the blade nozzle, which is brought about by the turbo tip driven fan units, enables the jet nozzle to be brought inward from the blade tip to the mid-blade location while still retaining high propulsive efficiency. This means that only the inside third of the blade span is needed to supply hot gas for the blade nozzle, and only the inside third of the blade has to be excessively 'fat' to accommodate both hot gas and by-pass gas duct area requirements. This inner portion of the blade is subjected to low relative wind with low drag and provides a smaller percentage of the total lift anyway; therefore, an excessively high thickness-to-cord ratio for this portion of the blade would only cause a small penalty in performance and drag. The outboard portion of the blade, beyond the jet nozzle, provides most of the lift, and this portion of the blade can be designed for optimum thickness-to-cord ratio.

(7) The use of re-heat burners in the wing root increases the thrust and lift per unit of hot gas passing through the blade; and therefore decreases the requirement for hot gas and hot gas duct area.

(8) The final method of meeting any remaining blade space requirement for gas duct area is by simple compromise. That is, instead of reducing total blade area by the full amount that the increased lift from jet flaps permits, make only a partial reduction in blade area to allow for the needed gas duct area. For example, a conventional pressure jet rotor with ten percent solidity could be reduced by one-half to five percent solidity with the use of jet flaps if not limited by blade duct area requirements; but to meet blade duct area requirements blade area is reduced by one-third instead of one-half to about 6.5 percent solidity. This approach is consistent with minimum noise requirements, since the larger the blade area, the less rotor noise. In effect, one trades off part of the extra lift of the jet-mechanical flap for a slower rotating but larger rotor blade. The final delicate compromise for the size of the rotor is such that, if the two rotor blades were any bigger, it would be too bulky for practical retraction in the stowage tube and too heavy to carry around as parasitic weight during fixed-wing flight; and if the rotor were any smaller, it could not give adequate lift within the power limitation and noise restriction, and also would not provide adequate autorotation.

It is to be understood that the form of the invention herewith shown and described is to be taken as a preferred example of the same, and that various changes in the shape, size and arrangement of parts may be resorted to, without departing from the spirit of the invention or scope of the subjoined claims.

NOMENCLATURE

1. Fuselage
2. Wing
3. Twin Vertical Stabilizers
4. Drag Reduction Winglet with Rotor Directional Control Jet Nozzle
5. Twin Rudder
6. Lower Deck Passenger Windows
7. Upper Deck Passenger Windows
8. Escape Hatches
9. Forward Door
10. On-Ground Fuselage Stabilizer
    a. Retracted
    b. Extended
11. Fixed-Wing Flight Cockpit Windows
12. Rotor Wing Flight Cockpit Windows
13. Aircraft Arrester Cable
14. Twin Flexible Cable Support Holder
15. Aircraft Arrester Cable Hook
    a. Actuator Unit
    b. Cable Safety Latch
16. Non-By-Pass Engine Air Intake
17. Ambiant By-Pass Air Intake
18. Horizontal Stabilizer
19. Rotor Stowage Tube
20. Rotor Stowage Tube Bulkhead
21. Rear Loading Ramp Door
22. Payload Cable Train
    a. Two Row Passenger Seat Car
    b. One Row Passenger Seat Car
23. Cable Train Passenger Seats
24. Cable Train Slide-Out Baggage Compartment
25. Upper Deck Passenger Seats
26. Upper Deck Steps
27. Attendant Seat
28. Forward Car
29. Rear Baggage or Passenger Car
    a. Top Loading Baggage Only Portion
    b. Partition
    c. Baggage or Passenger Portion
    d. Access Door
    e. Round Back Seat
    f. Tilt-Adjustment Cushions
    g. Compartment Window
30. Transistion Step-Down Car
    a. Non-Slide-Out Baggage Compartment
    b. Steps
31. Cable Train Drive Wheel and Motor
32. Cable Train Cable
33. Cable Train Return Wheel
34. Cable Train Drive Tongue
35. Rotor Blade
    a. Leading Edge
    b. Trailing Edge
36. Turbo-Tip Driven Fan Units
37. Outer Internally Blown Jet-Mechanical Augmenter Flap
    a. Up Position
    b. Down Position
38. Inner Internally Blown Jet-Mechanical Augmenter Flaps
    a. Up Position
    b. Down Position
39. Transition Mini-Flap
    a. Top Portion of Flap
    b. Bottom Portion of Flap
40. Variable Vectored Thrust Turning Vane Units
41. Reheat Burners
42. Rotor Mast
43. Rotor Fold-up Hinges
44. Rotor Fold-up Arms
45. Static Blade Support and First Stage Fold-Up Shock Absorber Mast Extension
46. Last Stage Blade Fold-Up Shock Absorber
47. Parking Rotor Mast Latch
    a. Latch Slot
48. Thrust Deflector-Inboard Elevator Unit
49. Movable Half of Rotor Gas Coupling
50. Stationary Half of Rotor Gas Coupling
51. Flexing Base of Mast Extension Blade Support Damper
52. Pitch Control Valve for Rotor Cyclic Pitch Control
53. Lateral Control Valve for Rotor Cyclic Pitch Control
54. Main Rotor Mast Tilt Hinge
55. Hot Gas Duct
56. By-Pass Gas Duct
57. Seat Tilt Hinge
58. By-Pass Air Blade Root Flexible Duct 59. Hot Gas Blade Root Flexible Duct
60. Elevator
61. Wing Tip Winglet Rotor Directional Control By-Pass Air Nozzles
62. One-Way Flap Valves for Winglet Rotor Directional Control Nozzles
63. Wing Tip Rotor Directional Control Valve
64. By-Pass Duct for Wing Tip Rotor Directional Control
65. Over Tailplane Upper Surface Blowing Semi-Flexible, Thin Wall Tail Pipe
66. Suction Assisted Split Flaps
67. Ailerons
68. Forward Wing Fillet
69. Rear Wing Fillet
70. By-Pass Air Intake Valve in Wing Root Suction Chamber
71. By-Pass Air Intake Valve from Rotor Stowage Tube
72. Low By-Pass Ratio Jet Engine
73. By-Pass, Hot Gas Separator Unit
74. Suction By-Pass Air Inlet Duct
75. Shock Absorbing Landing Nose
76. Tilting Mast Hot Gas Flexible Duct
77. Wash Basin
78. Rear Facing Toilet
79. Stowage Tube Bulkhead Hatch
80. Upper Deck Top Hatch
81. Rotor Retracting Winch
82. Rotor Retracting Winch Cable
83. Reverse Blade Suction through Blade By-Pass Duct System
84. External Suction Duct for Reverse Blade Suction through Blade By-Pass Duct System
85. Ramp Door Open-Close Cables
86. Cable Train Track
87. Airport Terminal Passenger Building
88. Overhead Sliding Door
89. Cable Train Wheels
90. Cable Train Hinges
91. Gas Seal Blocking Plate for Retracted Rotor Hot Gas Duct Coupling
92. Automatic Flip Open and Close Split Gas Seal Valve for Sucked Air through Rotor By-Pass Duct System
    a. Valve in Open Position
    b. Valve in Closed Position
    c. Seal Hinge
93. Laminar Flow Suction Chamber
94. Compliant Suction Surface Skin
95. Rotating Outer Sleeve for Wing Root By-Pass Air Intake Valve
96. Stationary Inner Sleeve for Wing Root By-Pass Air Intake Valve
97. Open-Close Mating Air Slots for a Wing Root By-Pass Air Intake Valve
98. Suction Chamber Valve Actuator for Wing Root By-Pass Air Intake Valve
99. Ambiant By-Pass Air Intake Valve Actuator
100. Valve Actuator for Intake By-Pass Air through Rotor Stowage Tube
101. Fuselage Boundary Layer Stand-off Gap
102. Suction-By-Pass Portion of Low Pressure Engine Compressor or Suction Pump
103. Engine Air Portion of Low Pressure Engine Compressor Bands
104. Seal Bands between Engine Air and By-Pass Air Flows in Low Pressure Compressor
    a. Blade Bands
    b. Stator Bands
105. High Pressure Engine Compressor
106. Suction Pumped Air or By-Pass Air
107. Engine Burner
108. High Pressure Turbine
109. Low Pressure Turbine
110. Hot Engine Exhaust Gas
111. Combination By-Pass Air Pressure Control Valve for Rotor Flight Direction Control and Fine Tuning for Rotor Collective Control
112. Center Blocking-Diverter Valve for By-Pass Air
113. Center Blocking-Diverter Valve for Hot Gas
114. Side Diverter Valve for By-Pass Air
115. Side Diverter Valve for Hot Gas
116. Diverter Valve Connecting Rod Synchronizer
117. By-Pass Diverter Valves Control
118. Hot Gas Diverter Valves Control
119. Hot Gas-By-Pass Air Remixer Pipe
120. Stowage Tube Tracks
121. Rotor Mast Retracting Wheels
122. Variable Area Nozzle Control by Compressing Semi-Flexible Tail Pipe
123. Main Rotor Anchor Hook
124. Main Rotor Anchor Hook Receiver
125. Stationary Cyclic Pitch Control Valve Cables Linkage
126. Stationary Cyclic Lateral Control Valve Cables and Linkage
127. Movable Cyclic Pitch Control Valve Cables and Linkage
128. Movable Cyclic Lateral Control Valve Cables and Linkage
129. Cyclic Control Centering Springs
130. Movable Cyclic Control Female Engaging Coupling
    a. For Pitch Control Valve
    b. For Lateral Control Valve
131. Fixed Cyclic Control Male Matching Engaging Coupling
    a. For Pitch Control Valve
    b. For Lateral Control Valve
132. Main Load-Carrying Support Unit for Rotor System
133. Rear End Stowage Tube Side Wall Extension
134. Up-Stream Collective Control By-Pass Duct (4 in number)
135. Tilting Mast By-Pass Collective Control Flexible Ducts (4 in number)
136. Lead-Into-Mast Rigid Collective Control By-Pass Ducts (4 in number)
137. Flexible Duct Length Stabilizer Cable for Tilting Mast Hot Gas Flexible Duct
138. Laminar Flow Control Sucked Air Intake Slots at Stowage Tube Opening
    a. On side rear extension of stowage tube
    b. On top and bottom of rear end of stowage tube
139. Laminar Flow Sucked Air Passageway
140. Lower Tilting Main Mast
141. Elastomeric Shock Absorber Rotor Mast Mounts (outer plate)
142. Ball-Joint
143. Hinge Connector
144. Alternate Parking Rotor Mast Latch
145. Mating Latch Hook for Alternate Parking Rotor Mast Latch
146. Lower Non-Rotating Main Mast Support 147a. Rotor Mast Tilt Hinge Hydraulic Damper or Hydraulic Lock
147b. Hydraulic Damper Crank Arm
148. Stowage Tube Blade Support Roll-in-Roll-out Rollers
149. Elastomer
150. Flexible Duct Length Stabilizing Cable for Each Pair of Tilting Mast By-Pass Collective and Cyclic Control Flexible Ducts
151. Interconnector Fastener from Cable to Upper and Lower By-Pass Ducts
152a. Mast Latch Down-Lock
152b. Down-Lock Cable Release
153. Mating Latch Hook Receiver for Parking Rotor Mast Latch
154. Upper Non-Rotating Main Mast Support
155. Rotating Portion of Rotor Mast
156. Rotor Mast Brake
157. Elastomeric Protector Heat Insulator
158. Embedded Cables in Elastomeric Sandwich
159. Elastomeric Sandwich Cable Anchor Ends
160. Collective Control By-Pass Air in Peripheral Quadrants around Hot Gas Duct in Non-Rotating Portion of Rotor Mast
161. Blade Root Arms
  a. Leading Edge
  b. Trailing Edge
162. Blade Root Flexible Duct Length Stabilizer Cable
  a. For By-Pass Air
  b. For Hot Gas
163. Connector Between Lower Non-Rotating Main Mast Support (146) and Upper Non-Rotating Main Mast Support (154)
164. Rotor Mast to Rotor Head Support
165. Blade Root Plate
166. Main Rotor Mast Bearing
167. Rotor Mast Seals
168. Rotor Mast to Rotor Head Transforming Duct
  a. Hot Gas
  b. By-Pass Air
169. Inside Duct Flexible Gas Turning Vane
170. Shock Absorber Holder Upper Mast Extension
171. Shock Absorber Base Plate Extension
172. Ring Anchor Holder for Rotor Mast to Rotor Head Transforming Duct (168)
173. Rotor Blade Fold-up Hinge Bushings
174. Hot Gas and By-Pass Air Seal on Rotating Portion of Gas Passage Ducts at the Interface with Non-Rotating Portion of Gas Passage Ducts (the bottom of 168)
175. Outer Rotating Main Rotor Mast
176a. Hot Gas to One Blade
176b. Hot Gas to Other Blade
177a. By-Pass Air to One Blade
177b. By-Pass Air to Other Blade
178. Left Blade-Right Blade Hot Gas Divider
179. Left Blade-Right Blade By-Pass Air Divider
180. Cable Train Intermediate Cargo Container
181. Cable Train Rear Cargo Container
182. Integral Hinged Ramp Toes
183. Fold-Up Passenger Step
184. Hinged Swing-Out Passenger Step-Platform
  a. Hinge Unit
  b. Brace Unit
  c. Roller Unit
185. Top-of-Baggage Compartment Passenger Platform
186. Blade Root Hot Gas Manifold
187. Blade Hot Gas Ducts
188. Passenger Aisle and Fold-Away Seat
189. Blade By-Pass Air Plenum Chamber
  a. Upper Chamber over Nozzle Unit
  b. Lower Chamber Under Nozzle Unit
190. Blade Root Hub Connector Plate
191. Leading Edge Blade Beam of Nozzle Cavity
  a. Upper Portion
  b. Lower Portion
192. Rear Blade Beam of Nozzle Cavity
  a. Upper Portion
  b. Lower Portion
193. Intermediate Blade Beam of Nozzle Cavity
  a. Upper Portion
  b. Lower Portion
194. Blade Duct Stand-Off Guides
195. Rear Hot Gas Duct Anchor Sliding Guides
196. Main Load-Carrying Over-Under Blade Root Suspension Bands
197. Inner Blade Flap-Inboard Flap Seal
198. Augmenter Flap Ejector Nozzles
199. Augmenter Flap Suction Upper Surface Intake Slot
200. Augmenter Flap Ejector Tunnel
201. Augmenter Flap Ejector Tunnel Exit Slot
202. Upper Surface Shroud Blowing Flap Slot or Flap By-Pass Air Sliding Seal
203. Variable Area By-Pass Air Chamber Between Rear Blade Beam and Flap
  a. For Inner Flap (38) that holds Rear Blade Hot Gas Duct
  b. For Outer Flap
204. Augmenter Flap Hinge
205. Augmenter Flap Hinge Torsion Spring
  a. Torsion Spring Blade Anchor End
  b. Torsion Spring Flap Anchor End
206. Semi-Flexible Strip-Flap Seals over Flap Hinges
  a. Inside Seals
  b. Outside Seals
207. Turbine High Pressure Fuel Pump
208. Sound Absorbing Ejector Tunnel Top Plate
209. Ejector Tunnel Top Plate Attachment Partitions
210. Top Plate Fasteners
211. Semi-Flexible Strip-Flap Valve Seal over Ejector Tunnel Exit Slot
212. Transition Mini-Flap Connector to Activate Lower Portion of Transition Mini-Flap
213. Lower Transition Mini-Flap Seal to Outer Augmenter Flap
214. Upper Transition Mini-Flap Anchor Pivot Point
215. Upper Surface Fold-Up Seals between Folded, Exposed Blade Tips
216. Suction Slot to Hold Folded Blade Tips Together and Blowing Slots for Rotor Operation Blade Tip Vortex Dissipators
217. Laminar Flow Suction Slots for Exposed Folded Blade Tips and Blowing Slots for Rotor Operation Blade Tip Vortex Dissipators
218. Inboard Augmenter Flap By-Pass Air Seal for Outer Augmenter Flap
219. Outboard Augmenter Flap By-Pass Air Seal for Outer Augmenter Flap
220. Intermediate Augmenter Flap Air Seal to Maintain By-Pass Air Pressure Differential
221. Blade Tip Vortex Dissipator Nozzle
222. Blade Tip Vortex Dissipator Nozzle One-Way Valve 223. By-Pass Air Turning Vanes Between Blade Structural Support Members
224. By-Pass Air Turning Slots in Web of Blade Structural Support Members
225. Upper Mini-Flap Leading Edge Slot
226. Lower Mini-Flap Leading Edge Slot
227. Transition Flap Blade Cavity Tunnel
228. Jet Nozzle Hot Gas Manifold Unit
229. Hot Gas Manifold Tunnel Partitions Separating Individual Turbo Tip Driven Fan Units
230. Lead-In Ducts to Turbo Tip Driven Fan Unit
  a. From Front Manifold Fed Passages
  b. From Rear Manifold Fed Passages
231. Anchor Bolts for Variable Vectored Thrust Vane Unit (40)
232. Nozzle Unit for Turbo Tip Driven Fan Unit
  a. Nozzle Inlet
  b. Stator Vanes
233. Tip Turbine
234. Fan Unit
235. Shaft Unit
236. Gas Splitter-Silencer with Fluted Gas Mixer
237. Turbo Fan Support Struts
  a. Upper Main Tension Support Strut
  b. Lower Main Tension Support Strut
238. Strut End Female Anchor Fitting for Turbo-Tip Driven Fan Unit
239. Hot Gas Manifold Male Anchor Fitting for Turbo-Tip Driven Fan Unit
240. Turbo-Tip Driven Fan Outer Casing
241. Turning Vanes Synchronizing Linkages
242. Turning Vane Actuator Spring-loaded in Retracted Position
243. Variable Pressure By-Pass Air Line to Actuator
244. Cooling Air Passage (or Insulation) between Hot Gas Nozzle Manifold Unit and Outer Structural Blade Cavity
245. Turbo Tip Driven Fan Nozzle Tunnel
246. Mid-Blade Jet Nozzle Cavity
247. Holes for Hot Gas Ducts in Mid-Blade Cavity and Matching Holes in Jet Nozzle Hot Gas Manifold Unit
248. Anchor Bolts for Blade Hot Gas Manifold Unit
249. Beefed-up Structural Supports for Anchoring Hot Gas Manifold Unit
250. Manifold Unit Hot Gas Guide Vanes
  a. Front Portion of Manifold
  b. Rear Portion of Manifold
251. Upstream Reheat Burner Anchor Point
252. Burner Spray Bar
253. Burner Flame Holder
254. Burner Pilot Lighter
255. By-Pass Air to Pilot Lighter
256. Burner Mixer-Cooling Holes
257. Sliding Positioner for Downstream End of Burner
258. Fuel Line to Reheat Burner
259. Rotor Blade Skin
260. Rotor Blade Nozzle to Stowage Door Seals
261. Sucked Air Passageway between Ramp Door Lips and Mating Fuselage
262. Ramp Door Rotary Screw Actuator Locks
263. Cable Train Track
264. Cable Train Soft-Ground Track Extension Accessory
265. Cable Train Hold-Down Rail
266. Baggage Compartment Roll-In, Roll-Out Rollers
  a. Inner Rollers
  b. Outer Rollers
267. Baggage Compartment Inner Roller Arms
268. Baggage Container Cable Anchor Arm
269. Baggage Compartment Drive Cable
270. Baggage Compartment Drive Motor-Pulley Unit
271. Baggage Compartment Return Pulley
272. Baggage Compartment Roll-In, Roll-Out "Overhead" Support Rail
273. Baggage Compartment High Flotation Wheels
274. Hinged Passenger Step Slide-Up Support Brace
275. Hinged Swing-Out Actuator Arm to Fold Up Passenger Step
276. Guide Rail (and Passenger Train Support Brace) to Activate Actuator Arm (275)
277. Fold-Out Guide Rails for Hinged Passenger Step Platform (and Baggage Compartment Structural Stiffners)
278. Fuselage Fold-Under Guide Rails for Hinged Passenger Step Platform (when Retracting Payload Cable Train)
279. Seat-Tilt Actuator
280. Seat-Tilt Lever Arm
281. Seat-Tilt Connecting Rod Synchronizer
282. Passenger Boarding Hand Holds
283. Stationary Seat Supports
284. Fuselage Skeg
286. Ramp-Door Open-Close Winch
287. Transition Car Seat Tilt Actuator
288. Ramp Door Hinge
289. Ramp Door Cable Train Track
290. Sliding Track Gap Spanner at Ramp Door Hinge
291. Cable Guide Idler Pulleys at Ramp Door Hinge
292. Transition Car to Rear Car Connecting Ramp
293. Shock Mount Unit for Fuselage Nose
294. Pilot and Co-Pilot Seats
  a. Fixed-Wing Flight Position
  b. Rotor Wing Flight Position
295. Cockpit Ramp Walkway
296. Cockpit Fixed-Wing Flight Controls
297. Cockpit Rotor Wing Flight Controls
298. Elevator (60) Hollow Pivot Shaft
299. Suction Duct in Hollow Pivot Shaft
300. Suction Air Entry Holes in Elevator Hollow Shaft
301. Coupled Crank Arms for Elevator
302. Elevator Cables
303. Rudder Hollow Pivot Shaft
304. Suction Duct in Rudder Hollow Pivot Shaft
305. Crank Arm for Rudder
306. Rudder Control Cables
307. Rudder Turn-Around Cable Control Pulley
308. Thrust Deflector Pivot Shaft
309. Thrust Deflector Pivot Arm and Fairing
310. Thrust Deflector Actuator
311. Thrust Deflector Actuator Fairing
312. Thrust Deflector Hinged Transition Bridge Plate
313. Thrust Deflector Stand-Off Ribs
314. Variable Area Tail Pipe Squeezer Mechanism
315. Variable Opening Suction Air Valve for Elevator
  a. Minimum Opening
  b. Maximum Opening
316. Rudder Suction Chamber Divider
317. Variable Opening Sucked Air Valve for Rudder a. Equalized Position for Left and Right Side of Rudder
b. Maximum Opening on Low Pressure Side of Rudder and Closed Position on High Pressure Side of Rudder
318. Vertical Stabilizer to Rudder Seal
319. Suction Split Flap Actuator
320. Split Flap Actuator Arm
321. Split Flap Actuator Hinge
322. Variable Suction Intake Slot for Wing Flap
323. Variable Suction Intake Seal for Wing Flap
324. Variable Suction Intake Seal Control Arm
325. Alternate Suction Double Flap Rotor Directional Control System
   a. Suction Surface Upper Flap
   b. Non-Suction Surface Lower Flap
326. Flap Control Arms
   a. Upper Control Arm with Integral Suction Duct
   b. Lower Control Arm without Suction Duct
327. Directional Flap Pivot Control Crank
328. Flap Control Cable
329. Flap Open Screw Actuator System
   a. Top Screw Actuator Motor Drive
   b. Bottom Driven Screw Actuator
   c. Synchronizer Flexible Shaft
330. Variable Width Suction Slots for Directional Control Flaps
   a. Upper Slot
   b. Lower Slot
331. Slot Opening Control Arm
   a. Upper Control Arm
   b. Lower Control Arm
332. Suction Duct for Rotor Directional Control Suction Flap
333. Partition with Seal Around Control Arm (331) between Flap Suction Duct Chamber (332) and Main Laminar Flow Suction Chamber (93)
334. Pleated or Bellows Type Flexible Duct (Spiral or Unconnected Circular Pleats or Channels)
335. Liner Insert for Folds in Pleated Flexible Duct
   a. Duct Liner Surface
   b. Duct Liner Anchor Flange
   c. Stamped Integral Spring in Anchor Flange
   d. Slits in Anchor Flange for Curving Inserts
   e. Heat and Sound Insulator Material in Liner Sandwich
336. Outer, Thin Fine Pore, Porous Flexible Suction Surface Skin
337. Inner, Thick, Coarse Pore, Porous Flexible Skin
338. Integral, Flexible Non-Porous Barrier Grid
339. Aircraft Skin
340. Threaded, Countersunk Round Holes in Aircraft Skin
341. Integral One-Piece, Semi-Flexible Non-Return Valve Inserts
   a. Cross Diameter By-Valve Lip Support Bridge
   b. Integral, Flexible Bi-Valve Lip Hinge
   c. Non-Return Bi-Valve Lips
342. Tail Plane Strut or Brace
343. Variable Suction Intake Seal for Directional Control Flaps
   a. Upper
   b. Lower

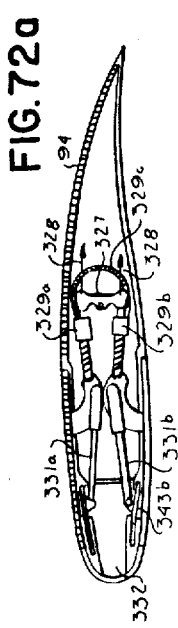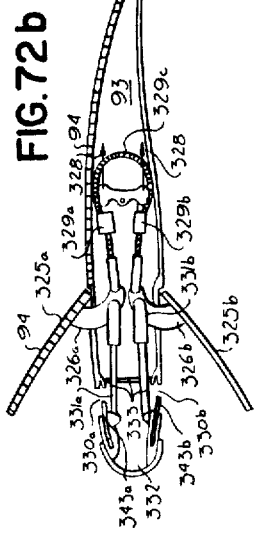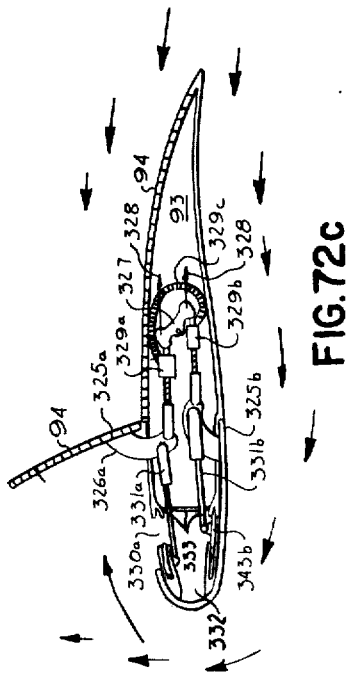
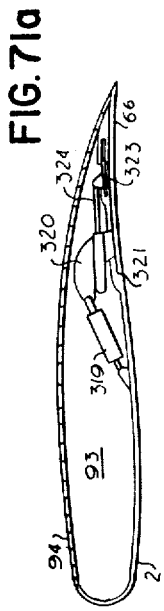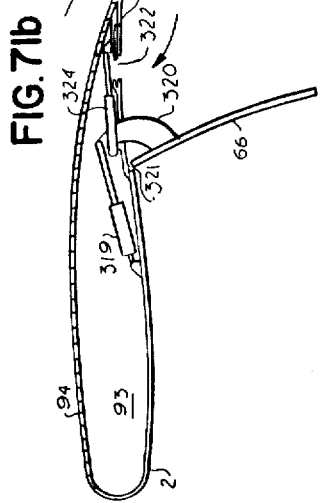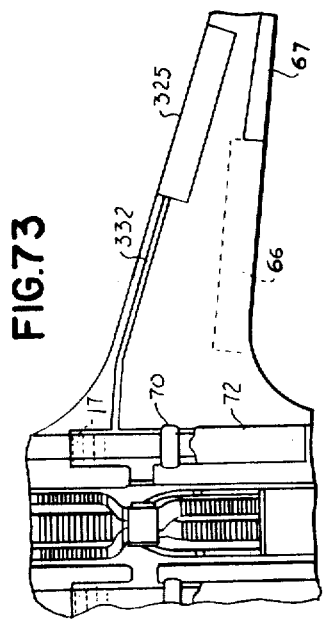

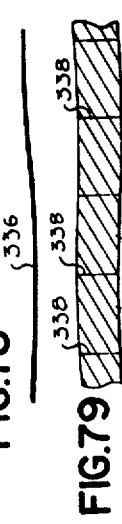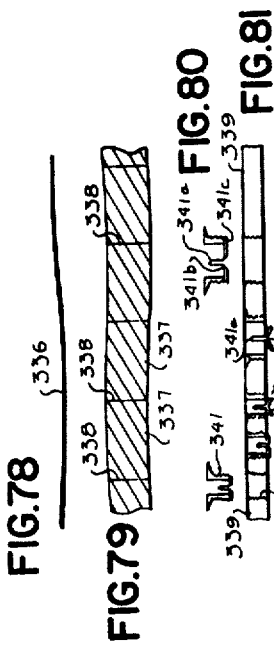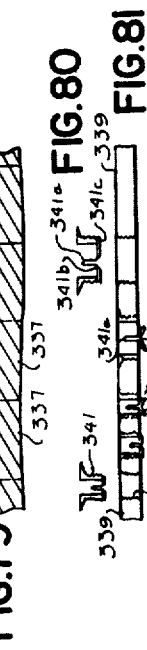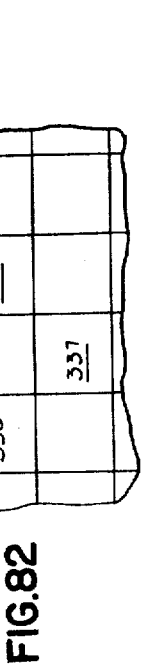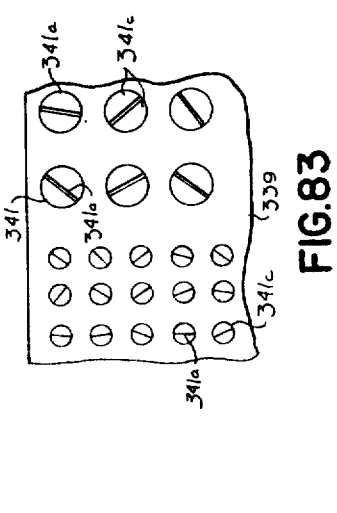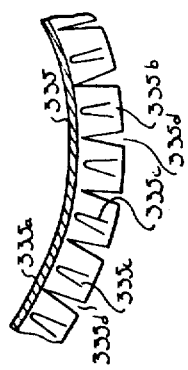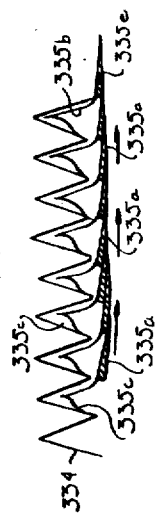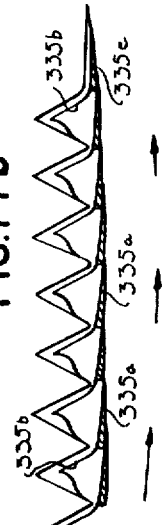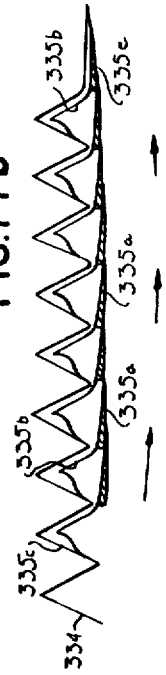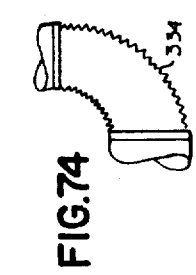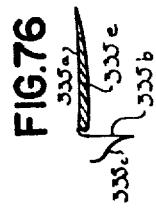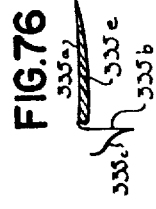

I claim:

1. In an airplane with a retractable rotor system, a pressure jet rotor, a stowage tube for the rotor in the fuselage of the airplane into which the rotor can be retracted and from which it can be deployed, the rotor stowage tube opening through the rear of the airplane fuselage and extending longitudinally forwardly in the fuselage for a major portion of its length, means forming lateral suction slots around the mouth of said stowage tube and operable during fixed wing flight to maintain laminar flow in the area where the rotor blades extend rearwardly of and outside of said stowage tube, said jet rotor having rotor blade nozzles which substantially plug and seal the mouth of the stowage tube when the rotor is retracted therein, and rotor blade end portions then projecting in folded opposed relationship longitudinally rearwardly of and outside of said rotor stowage tube.

2. In an airplane with a retractable rotor system, a pressure jet rotor, a rear opening rotor stowage tube in the fuselage of said airplane, said pressure jet rotor being retractable in said rotor stowage tube for fixed wing flight of the airplane, a by-pass fan system for the airplane adapted to draw air in through the rear opening of the rotor stowage tube, and such air passing over hot parts of the rotor within the stowage tube to cool such parts, and said rotor stowage tube having a suction laminar flow system for fixed wing flight, whereby unoccupied space in said stowage tube may serve as a suction duct for the laminar flow system during fixed wing flight by connection with airplane engine suction pump means.

3. In an airplane with a retractable rotor system, a rotor comprising opposed upwardly folding rotor blades, a pair of hydraulic damper mast extensions above the hub of the rotor, whereby each rotor blade has a pair of rotor fold-up arms, one fold-up arm being at the leading edge of the rotor blade root and the other fold-up arm being at the trailing edge of the blade root, the leading edge fold-up arm of one rotor blade being in the same plane as the trailing edge fold-up arm of the opposing blade, hinges attaching the opposed fold-up arms on the rod ends of piston rods of said hydraulic damper mast extensions, said pair of damper mast extensions and fold-up arms forming a static blade support and allowing variation in coning angle of the rotor, and said damper mast extensions also serving as shock damper means to control the rate of rotor blade fold-up, said damper mast extensions being flexibly attached to the rotor hub whereby the mast extensions can bend somewhat relative to the rotor mast in response to blade flapping, and the pair of piston rods of said damper mast extensions are rigidly connected to each other and move in unison, said opposed pair of fold-up arms being connected to each other at the piston rods and providing a rigid brace means for the rotor blade roots thereby increasing the torsional rigidity of the blade roots.

4. In an airplane with a retractable rotor system, a pressure jet rotor having cordwise slots on the top and bottom sides of the blades forming the rotor near the blade tips, whereby by-pass air from the airplane engine system can be fed through the blades toward their tips during rotor flight, said by-pass air then being expelled through said slots thereby dissipating blade tip vortices to reduce blade tip noise, a pressure chamber in each blade adapted for conversion to a suction chamber by connection with existing airplane ducting when the rotor is being retracted into the fuselage of the airplane for fixed wing flight, air then sucked through said cordwise slots on the undersides of the blade tips serving to maintain laminar flow over curved ends of the blade tips during fixed wing flight, and the air sucked through said blade chambers also serving to cool hot parts of the retracted rotor.

5. In an airplane with a retractable rotor system as defined in claim 4, and flexible strip flap seals on the rotor blades adapted to be sucked closed against said slots to maintain suction in said chambers of the folded rotor blades of said retractable rotor system.

6. In an airplane with a retractable rotor system, a pressure jet rotor comprising two rotor blades which are adapted to fold upwardly toward each other to enable retraction of the rotor into a rear opening longitudinal rotor stowage tube in the airplane fuselage, the rotor blades when folded forming an enlarged substantially rectangular cross section body portion at the pressure jet nozzle zone of the rotor blades, said rectangular cross section body portion entering and substantially closing and sealing the rear open end of said rotor stowage tube when the rotor is retracted therein, and tip portions of the folded rotor blades projecting rearwardly beyond the closed and sealed rotor stowage tube and forming a streamlined tail cone for the airplane.

7. In an airplane with a retractable rotor system as defined in claim 6, and said blade tip portions projecting rearwardly of the rotor stowage tube having substantially flat horizontal upper and lower surfaces in the slipstream of the airplane, said flat upper and lower surfaces forming a supplemental horizontal stabilizer for the airplane during fixed wing flight.

8. In an airplane with a retractable rotor system, a pressure jet rotor having a pair of upwardly folding blades adapted for retraction in opposed parallel relation within a rear opening longitudinal stowage tube in the airplane fuselage, said fuselage having side vertical surfaces extending rearwardly of the stowage tube opening, and said surfaces acting as seals for rotor blade transition flap tunnels when the rotor system is partly retracted into said rotor stowage tube for fixed wing flight.

* * * * *

UNITED STATES PATENT AND TRADEMARK OFFICE
CERTIFICATE OF CORRECTION

PATENT NO. : 4,109,885
DATED : August 29, 1978
INVENTOR(S) : David R. Pender

It is certified that error appears in the above-identified patent and that said Letters Patent are hereby corrected as shown below:

The attached Figures 57 thru 83, sheets 21 thru 30, should be inserted following Figure 56b as part of the above-identified patent.

Signed and Sealed this

Eleventh Day of December 1979

[SEAL]

Attest:

SIDNEY A. DIAMOND

Attesting Officer      Commissioner of Patents and Trademarks

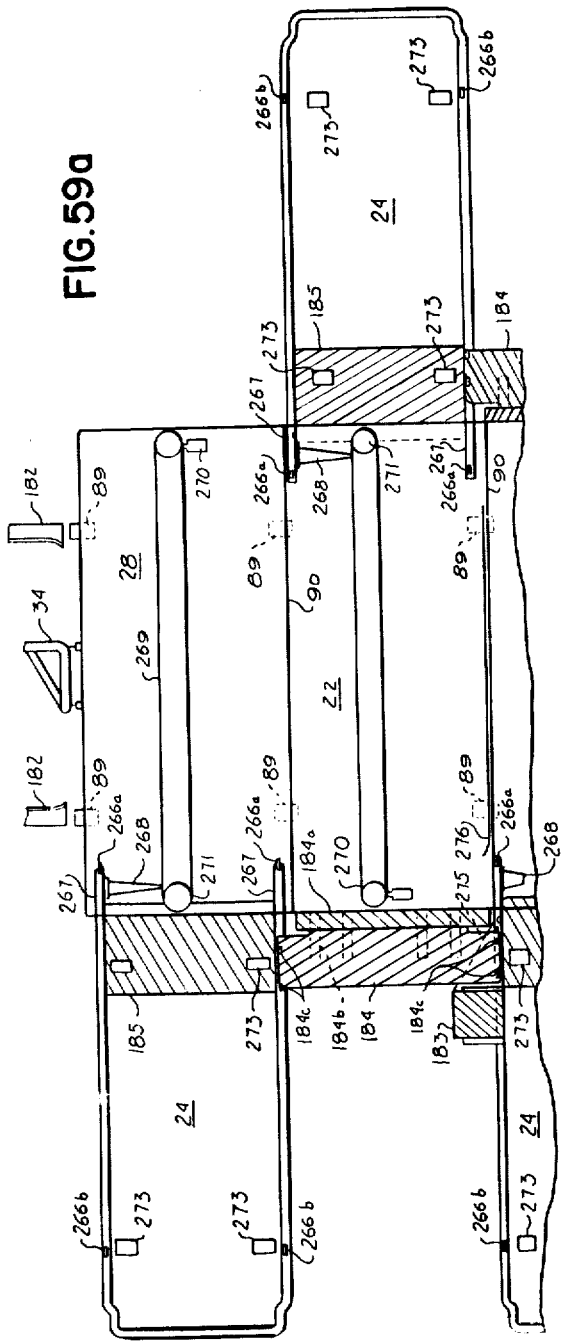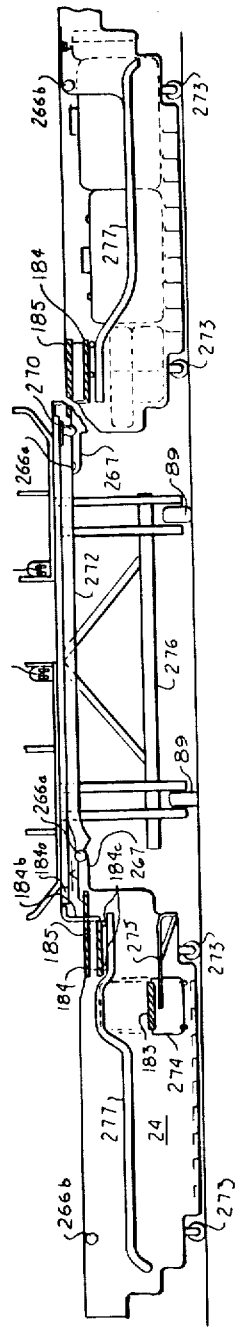

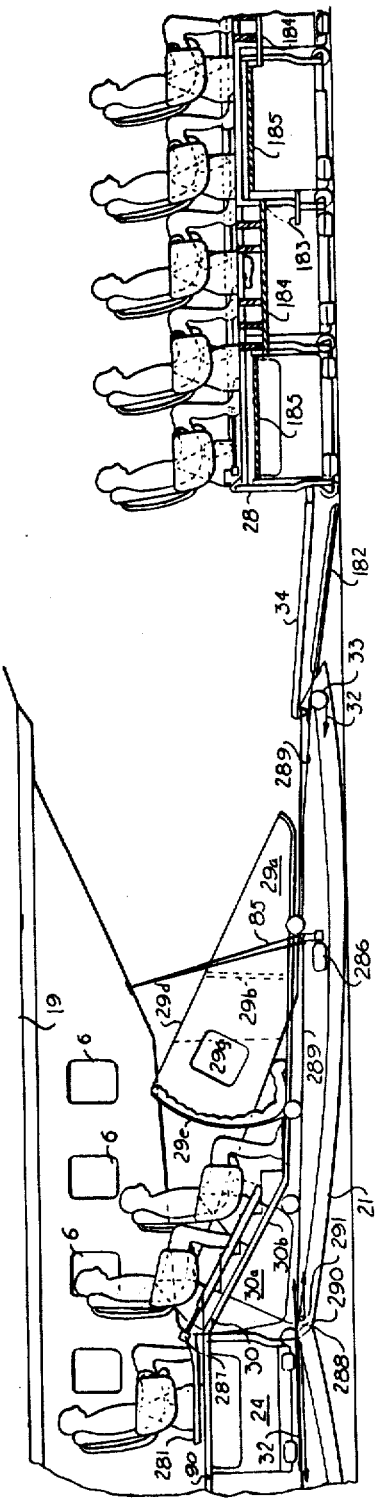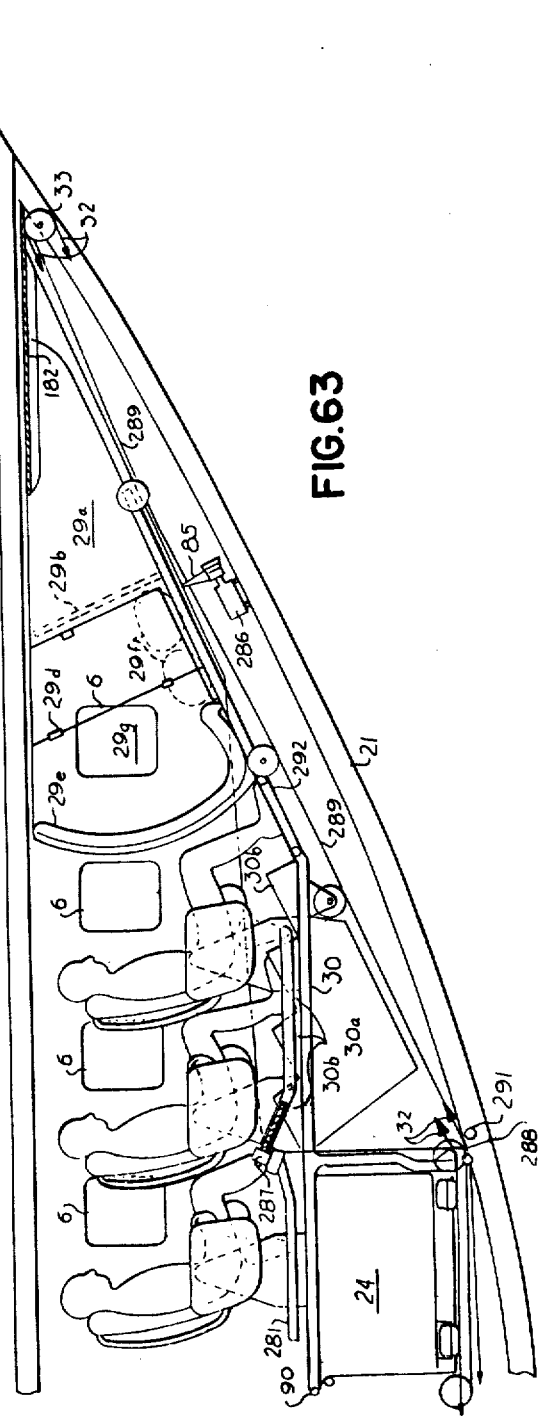
FIG.62
FIG.63

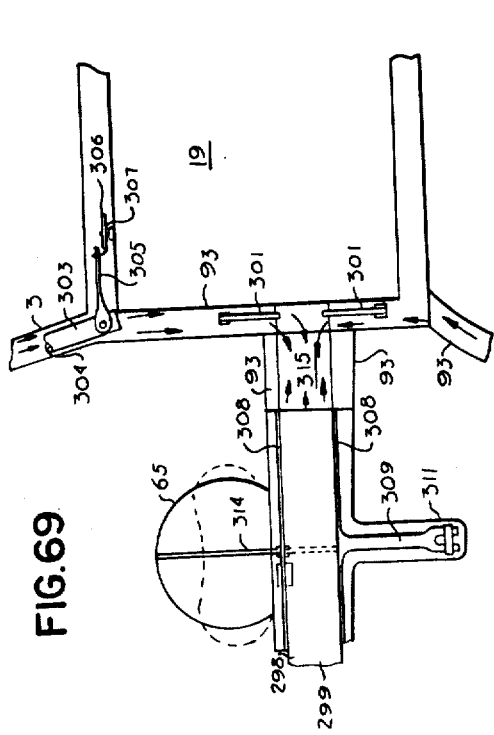
FIG.69
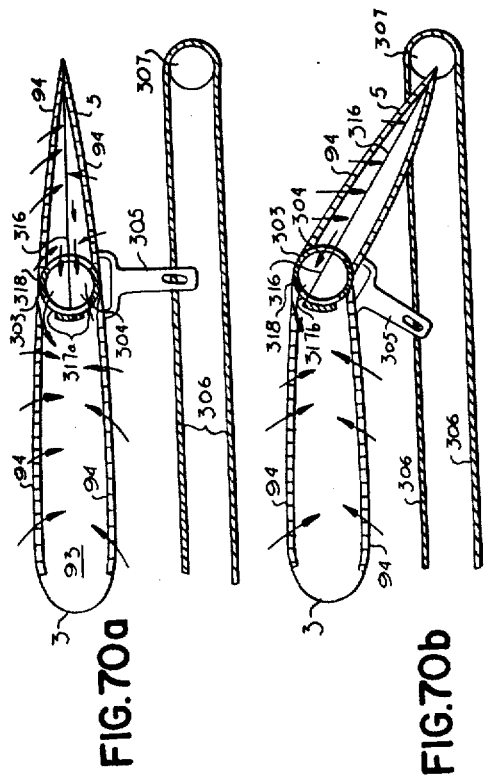
FIG.70a
FIG.70b
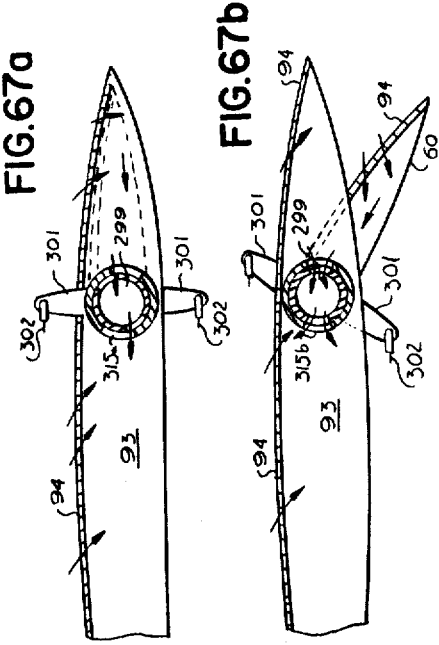
FIG.67a
FIG.67b
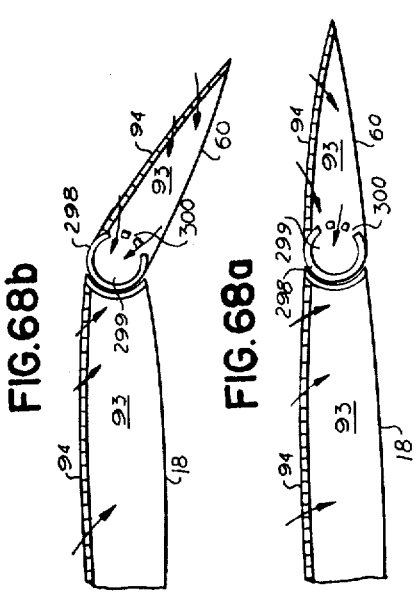
FIG.68b
FIG.68a